(12) United States Patent
Doberenz

(10) Patent No.: US 11,596,140 B2
(45) Date of Patent: Mar. 7, 2023

(54) VINE REMOVAL DEVICE

(71) Applicant: X-Tirp, Inc., Tigard, OR (US)

(72) Inventor: Philip W. Doberenz, Tigard, OR (US)

(73) Assignee: X-Tirp, Inc., Tigard, OR (US)

( * ) Notice: Subject to any disclaimer, the term of this patent is extended or adjusted under 35 U.S.C. 154(b) by 631 days.

(21) Appl. No.: 16/658,140

(22) Filed: Oct. 20, 2019

(65) Prior Publication Data

US 2020/0120918 A1    Apr. 23, 2020

Related U.S. Application Data

(60) Provisional application No. 62/748,417, filed on Oct. 20, 2018, provisional application No. 62/772,616, filed on Nov. 28, 2018.

(51) Int. Cl.
*A01M 21/02*    (2006.01)
*A01B 1/16*    (2006.01)
*B25G 1/04*    (2006.01)

(52) U.S. Cl.
CPC .............. *A01M 21/02* (2013.01); *A01B 1/16* (2013.01); *B25G 1/04* (2013.01)

(58) Field of Classification Search
CPC ............ B25G 1/04; A01M 21/02; A01B 1/16
USPC .......................................................... 7/114
See application file for complete search history.

(56) References Cited

U.S. PATENT DOCUMENTS

| | | | | |
|---|---|---|---|---|
| 59,168 A * | 10/1866 | Bender | .................. | A01G 3/025 30/249 |
| 224,936 A * | 2/1880 | Merine | .................. | A01G 3/025 30/249 |
| 418,720 A * | 1/1890 | Hess | ....................... | B26B 13/22 30/146 |
| 1,150,718 A * | 8/1915 | Taylor | .................... | A01G 3/025 30/249 |
| 1,293,588 A * | 2/1919 | Webber | ................ | A01D 46/247 30/249 |
| 2,285,780 A | 6/1942 | Newman | | |
| 3,293,674 A | 12/1966 | Sapia | | |
| 4,096,630 A * | 6/1978 | Honick | ................ | A01G 3/0255 30/296.1 |
| 5,084,975 A * | 2/1992 | Melter | ................... | A01G 3/025 30/249 |

(Continued)

FOREIGN PATENT DOCUMENTS

JP    2016015951    2/2016

OTHER PUBLICATIONS

Philip W. Doberenz, https://youtu.be/PHftF3H8hlk. Video originally made public on Youtu.be in Dec. 2016, possibly as early as Dec. 1, 2016. (Original posting is not available. Re-uploaded to Youtu.be on Apr. 27, 2020.).

(Continued)

*Primary Examiner* — Hadi Shakeri
(74) *Attorney, Agent, or Firm* — Enterprise Patent LLC

(57) ABSTRACT

A vine removal device may include a shaft connected to a hook with a pocket. An actuation mechanism, such as a line connected to a user's belt, can actuate a movable jaw having a jaw projection configured to at least partly fit within the pocket. The hook has blade that supports a vine slide surface that facilitates collection of vines in the pocket where they can be gripped by the projection of the movable jaw. The blade may employ a surface skimmer to limit how deep the blade can penetrate the soil.

27 Claims, 29 Drawing Sheets

(56) References Cited

U.S. PATENT DOCUMENTS

| | | | |
|---|---|---|---|
| 5,452,767 A | | 9/1995 | Smotherman |
| 5,613,301 A | * | 3/1997 | Sheu ................. A01G 3/08 |
| | | | 30/144 |
| 6,694,621 B1 | * | 2/2004 | Boley ................ A01G 3/08 |
| | | | 30/211 |
| 2003/0177644 A1 | * | 9/2003 | Cheng .............. A01G 3/0255 |
| | | | 30/249 |
| 2003/0230420 A1 | | 12/2003 | Brown |
| 2006/0288588 A1 | | 12/2006 | Morabito |
| 2007/0119057 A1 | | 5/2007 | Chen |
| 2009/0119929 A1 | | 5/2009 | Monnig et al. |
| 2010/0095532 A1 | | 4/2010 | Fidgen et al. |

OTHER PUBLICATIONS

Philip W. Doberenz, https://youtu.be/V5BR38CDXdo. Video originally made public on Youtu.be, possibly as early as Feb. 10, 2018. (Original posting is not available. Re-uploaded to Youtu.be on Apr. 27, 2020.).

Philip W. Doberenz, an ivy removal tool, similar to the one shown in FIG. 11 of U.S. Appl. No. 62/748,417, was demonstrated nine times under verbal or written nondisclosure agreements to individuals and small groups between Feb. 1, 2018 and Sep. 7, 2018.

English translation of JP 2016015951 downloaded from Google Patents on Dec. 12, 2019.

\* cited by examiner

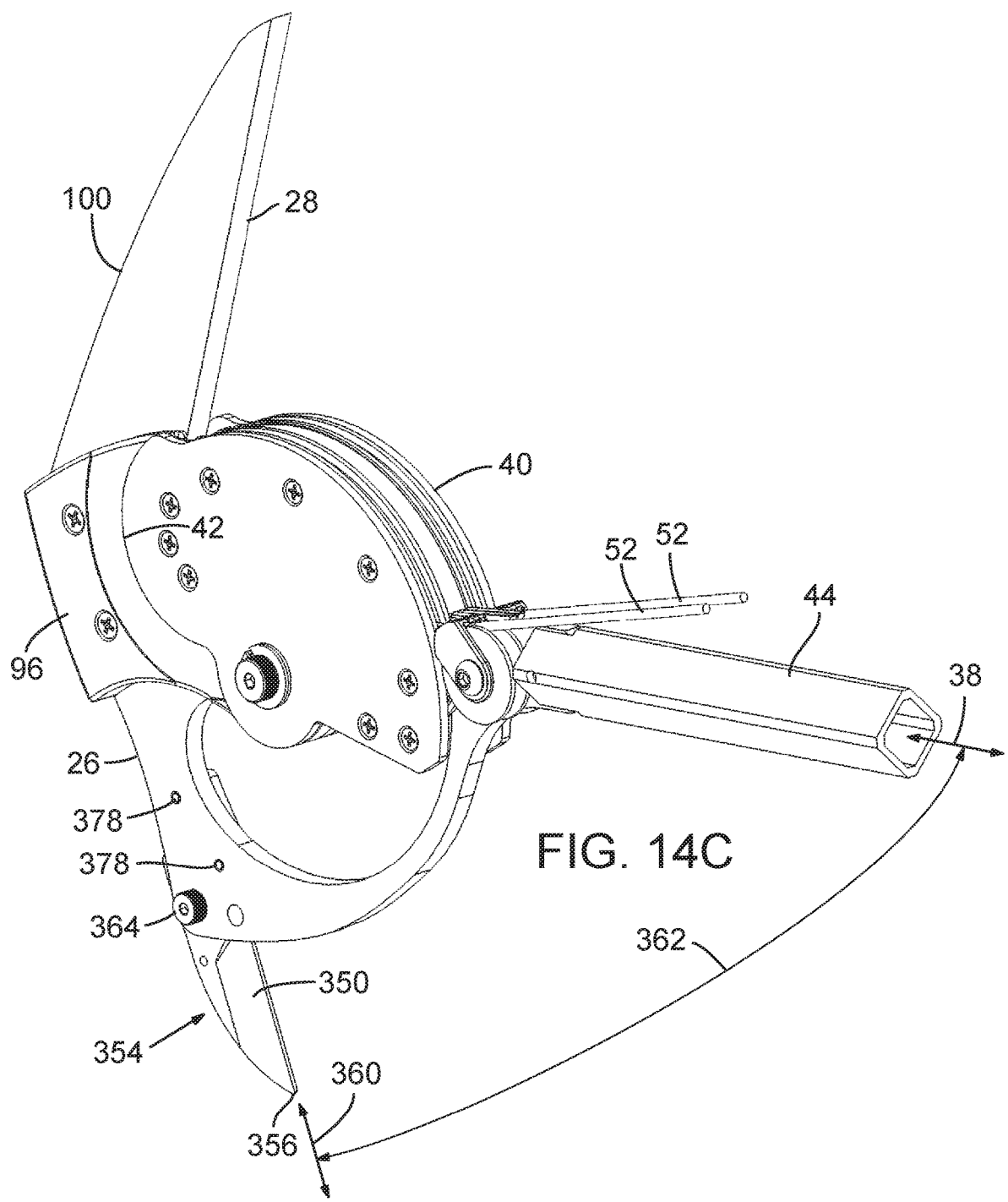

VINE REMOVAL DEVICE

CROSS REFERENCE TO RELATED APPLICATION

This application is a non-provisional application of, and claims priority under 35 U.S.C. 119(e) to, U.S. Provisional Application No. 62/748,417, which was filed on Oct. 20, 2018, and is a non-provisional application of, and claims priority under 35 U.S.C. 119(e) to, U.S. Provisional Application No. 62/772,616, which was filed on Nov. 28, 2018, the contents of both of which are herein incorporated by reference in their entirety for all purposes.

TECHNICAL FIELD

This application relates to systems and methods for removing vines and, in particular, to systems and methods for gripping, ripping, pulling, and/or cutting vines, including ground-cover vines, such as ivy.

BACKGROUND INFORMATION

Vines are often categorized as woody or herbaceous twining or climbing plants with relatively long stems. For purposes of this disclosure, the term "vine" is predominantly used to refer to the type of plant and includes both the thinner offshoots of such plants as well as the thicker roots of such plants.

The Invasive Plant Atlas lists 145 species vines invasive to U.S. natural areas. These vines are considered to be invasive if present in areas well outside their natural ranges due to human activity. Nuisance vines can be primarily climbing vines such as wisteria, ground-cover vines such as vinca, or both ground-cover and climbing such as ivy. A short list of highly invasive vines includes, but is not limited to, English ivy, Himalayan blackberry, and morning glory.

Nuisance vines are presented herein only by way of example to English ivy (*Hedera helix*). English ivy is an invasive plant species now found in many temperate parts of the world, including the United States. It is destructive to the environment because it outcompetes and grows over native plants forming an "ivy desert" where ivy becomes the dominant, or only, plant species in the area.

Besides covering the ground, it also grows up trees. Even though ivy uses trees only as a structure to grow upon, ivy will damage trees when it grows high enough for the ivy leaves to block out light to the trees' own leaves. The added weight and span of the ivy can break branches and cause trees to topple over, especially in windstorms. Moreover, the ivy takes nutrients and water from the soil the trees might need, potentially weakening the trees and make them more prone to disease.

English ivy has been a popular cultivar because it's fast growing, hardy, grows in very low light conditions, and is an evergreen plant. Ivy has also been planted as a ground cover for erosion control; however, the root system of ivy is relatively shallow (about 10-13 cm), so it's actually poor for erosion control. Because ivy is abundantly cultivated, birds have easy access to its berries and then distribute the seeds to wild areas where the ivy is unwanted.

Because ivy growing on the ground surface may not root very deeply, ivy can be fairly easy to pull up from soft soil. The green ivy vines growing on the ground may grow to only 0.6 cm diameter, and this thinner ivy can be fairly easy to cut. However, ivy can be difficult to remove from harder soils, and the vines can become hard and woody with age becoming as large as 3.2 cm in diameter or larger. Moreover, ivy vines spread out in all directions, become interwoven with other vines and debris, and are tough to break by hand.

People have tried to use various tools to cut ivy: pruning loppers, hedge clippers, spades, brush axes, etc. with hard work and limited success. Because English ivy is so difficult to remove, people often resort to using toxic chemicals to kill it. Unfortunately, toxic chemicals present their own problems, including destruction of nearby flora and contamination of soil and ground water. Accordingly, a better method for ivy removal, and vine removal in general, is desirable.

OVERVIEW OF DISCLOSURE

This overview is provided to introduce a selection of concepts in a simplified form that are further described in greater detail below. This overview is not intended to identify key or essential inventive concepts of the claimed subject matter, nor is it intended for limiting the scope of the claimed subject matter.

Conventional tools are not specifically designed for removing vines, particularly bush-like or ground-cover vines such as ivy. Such tools are often unsafe, with exposed sharp edges, and are not meant for operation (such as cutting or pulling) near one's feet. Many of these tools cut inconsistently, missing individual vines or cutting them multiple times. Moreover, these tools either don't deal with the roots, or they cut them while underground (making broken pieces more difficult to detect and remove, thereby leaving pieces to keep growing and re-establish the vine structures). Finally, these tools are inefficient, requiring lots of effort per vine cut, often with an operator in stooped over or uncomfortable positions.

In some embodiments, a vine removal tool comprises: a hook having a distal hook end, a proximal hook base, and a vine slide surface positioned between the distal hook end and the proximal hook base; a vine collection area formed around the proximal hook base and in proximity to the vine slide surface, wherein the vine slide surface is operable to direct one or more vines into the vine collection area; a movable jaw having a jaw projection operable to move toward and away from the vine collection area; a shaft that is directly or indirectly connected to the hook; and a jaw actuation mechanism operable to cause the jaw projection to move toward the vine collection area to grip the one or more vines.

In some additional, alternative, or selectively cumulative embodiments, a vine removal tool comprises: a hook having a distal hook end, a proximal hook base, and a vine slide surface positioned between the distal hook end and the proximal hook base; a vine collection area formed around the proximal hook base and in proximity to the vine slide surface, wherein the vine slide surface is operable to direct one or more vines into the vine collection area; a movable jaw having a jaw projection operable to move toward and away from the vine collection area; a shaft that is directly or indirectly connected to the hook; a jaw actuation mechanism operable to cause the jaw projection to move toward the vine collection area to grip the one or more vines; and a belt operable for fastening about a person, wherein the belt is connected indirectly to the shaft, hook, or jaw actuation mechanism such that force applied to the belt, in a direction away from the hook, is operable to pull the hook in a direction toward the person.

In some additional, alternative, or selectively cumulative embodiments, a vine removal tool comprises: a hook having a distal hook end, a proximal hook base, and a vine slide surface positioned between the distal hook end and the proximal hook base, wherein a portion of the vine slide surface lies along a vine slide axis, and wherein the vine slide surface has a vine slide length that is longer than or equal to 4 inches; a vine collection area formed around the proximal hook base and in proximity to the vine slide surface, the vine collection area has a vine collection surface with a vine collection surface width that is perpendicular to the vine slide axis, and wherein the vine slide surface is operable to direct one or more vines into the vine collection area; a movable jaw having a jaw projection operable to move toward and away from the vine collection area, wherein the jaw projection comprises a jaw projection surface having a jaw projection surface width that is perpendicular to the vine slide axis, wherein the jaw projection surface width is greater than the vine collection surface width; a shaft that is directly or indirectly connected to the hook; and a jaw actuation mechanism operable to cause the jaw projection to move toward the vine collection area to grip the one or more vines.

In some additional, alternative, or selectively cumulative embodiments, a vine removal tool comprises: a hook having a distal hook end, a proximal hook base, and a vine slide surface positioned between the distal hook end and the proximal hook base; a vine collection area or a pocket formed at the proximal hook base and in proximity to the vine slide surface; a movable jaw having a jaw projection configured to at least partly fit within dimensions of the vine collection area or the pocket; a shaft that is directly or indirectly connected to the hook; a jaw actuation mechanism operable to cause the jaw projection to enter, or to extend beside, the vine collection area or the pocket.

In some additional, alternative, or selectively cumulative embodiments, a vine removal tool comprises: a hook having a distal hook end, a proximal hook base, a spine, and a vine slide surface positioned between the distal hook end and the proximal hook base and positioned opposite the spine; a vine collection area or a pocket formed at the proximal hook base and in proximity to the vine slide surface; a shaft that is directly or indirectly connected to the hook; and a belt connected directly or indirectly to the shaft or the hook such that force applied to the belt in a direction away from the hook is operable to cause movement of the hook in the direction that is away from the hook and toward the belt.

In some additional, alternative, or selectively cumulative embodiments, a vine removal tool comprises: a hook having a distal hook end, a proximal hook base, a spine, and a vine slide surface positioned between the distal hook end and the proximal hook base and positioned opposite the spine; a vine collection area or a pocket formed at the proximal hook base and in proximity to the vine slide surface; a movable jaw having a jaw projection configured to at least partly fit within dimensions of the vine collection area or the vine collection area or the pocket; a shaft that is directly or indirectly connected to the hook; a jaw actuation mechanism operable to cause the jaw projection to enter, or to extend beside, the vine collection area or the pocket; and a belt connected indirectly to the shaft, hook, or jaw actuation mechanism such that force applied to the belt, in a direction away from the hook, is operable to cause movement of the hook in the direction that is away from the hook and toward the belt.

In some additional, alternative, or selectively cumulative embodiments, the vine removal tool includes a belt operable for fastening about a person.

In some additional, alternative, or selectively cumulative embodiments, the hook is configured to slide above or beneath a soil surface exposing vines.

In some additional, alternative, or selectively cumulative embodiments, the hook is configured to slide above or beneath a soil surface to gather vines on the vine slide surface.

In some additional, alternative, or selectively cumulative embodiments, force applied by a person directly or indirectly to the jaw actuation mechanism, in a direction away from the hook, is operable to pull one or more vines in a direction toward the person.

In some additional, alternative, or selectively cumulative embodiments, the jaw actuation mechanism includes a line that is operatively connected to the movable jaw, wherein the line is operable, in response to being pulled toward a person operating the vine removal tool when the distal hook end is below a soil surface, to pull the distal hook end in a direction toward the person before causing the jaw projection to move toward the vine collection area.

In some additional, alternative, or selectively cumulative embodiments, the jaw actuation mechanism directly or indirectly operatively connects to the belt and to the movable jaw.

In some additional, alternative, or selectively cumulative embodiments, the jaw actuation mechanism comprises at least one line that directly or indirectly operatively connects to the belt and to the movable jaw.

In some additional, alternative, or selectively cumulative embodiments, the jaw actuation mechanism comprises at least one line that directly or indirectly operatively connects to the belt and to the movable jaw, wherein the line has a line length that is adjustable.

In some additional, alternative, or selectively cumulative embodiments, the jaw actuation mechanism includes a line that is operable to connect, at an effective distance that is variable, the movable jaw to a belt operable for fastening about a person, and wherein the line has a line length from the movable jaw to the belt, and wherein the line length is re-adjustable to provide the effective distance.

In some additional, alternative, or selectively cumulative embodiments, the jaw actuation mechanism employs a line that is directly or indirectly connected to the movable jaw, wherein a pulley and a sheave are operable to guide the line, wherein the sheave is distinct from the pulley, and wherein a mud scraper is mounted in proximity to the pulley and is operable to block an amount of debris from entering a furrow on the sheave In some additional, alternative, or selectively cumulative embodiments, the jaw actuation mechanism comprises at least one line that directly or indirectly operatively connects to the belt and to the movable jaw, wherein the line includes a primary actuation line operatively connected directly or indirectly to the movable jaw and a tether operatively connected directly or indirectly to the belt.

In some additional, alternative, or selectively cumulative embodiments, the belt is operatively connected to the shaft.

In some additional, alternative, or selectively cumulative embodiments, the shaft comprises a first shaft segment having a first shaft length, and the shaft comprises a second shaft segment having a second shaft length, wherein the shaft is operable to have an operating shaft length that is greater than or equal to either of the first shaft length or the second shaft length, and wherein a shaft length-adjusting mechanism is operable to facilitate reversibly adjusting and maintaining the operating shaft length to be greater than either of the first shaft length or the second shaft length.

In some additional, alternative, or selectively cumulative embodiments, the vine slide surface is positioned opposite the spine.

In some additional, alternative, or selectively cumulative embodiments, the shaft has a shaft major axis, wherein a portion of the vine slide surface lies along a vine slide axis, and wherein the vine slide axis and the shaft major axis form a hook angle that is less than or equal to 90 degrees.

In some additional, alternative, or selectively cumulative embodiments, the shaft has a shaft major axis, wherein a portion of the vine slide surface lies along a vine slide axis, and wherein the vine slide axis and the shaft major axis form a hook angle that is less than or equal to 85 degrees.

In some additional, alternative, or selectively cumulative embodiments, the shaft has a shaft major axis, wherein a portion of the vine slide surface lies along a vine slide axis, and wherein the vine slide axis and the shaft major axis form a hook angle that is less than or equal to 80 degrees.

In some additional, alternative, or selectively cumulative embodiments, the shaft has a shaft major axis, wherein a portion of the vine slide surface lies along a vine slide axis, and wherein the vine slide axis and the shaft major axis form a hook angle that is less than or equal to 75 degrees.

In some additional, alternative, or selectively cumulative embodiments, the shaft has a shaft major axis, wherein a portion of the vine slide surface lies along a vine slide axis, and wherein the vine slide axis and the shaft major axis form a hook angle that is less than or equal to 70 degrees.

In some additional, alternative, or selectively cumulative embodiments, the shaft has a shaft major axis, wherein a portion of the vine slide surface lies along a vine slide axis, and wherein the vine slide axis and the shaft major axis form a hook angle that is less than or equal to 60 degrees.

In some additional, alternative, or selectively cumulative embodiments, the shaft has a shaft major axis, wherein a portion of the vine slide surface lies along a vine slide axis, and wherein the vine slide axis and the shaft major axis form a hook angle that is greater than or equal to 45 degrees.

In some additional, alternative, or selectively cumulative embodiments, the shaft has a shaft major axis, wherein a portion of the vine slide surface lies along a vine slide axis, and wherein the vine slide axis and the shaft major axis form a hook angle that is greater than or equal to 60 degrees.

In some additional, alternative, or selectively cumulative embodiments, the shaft has a shaft major axis, wherein a portion of the vine slide surface lies along a vine slide axis, and wherein the vine slide axis and the shaft major axis form a hook angle that is greater than or equal to 65 degrees.

In some additional, alternative, or selectively cumulative embodiments, the vine slide surface is smooth.

In some additional, alternative, or selectively cumulative embodiments, the vine slide surface comprises a flat surface.

In some additional, alternative, or selectively cumulative embodiments, the vine slide surface comprises a rounded surface.

In some additional, alternative, or selectively cumulative embodiments, the vine slide surface comprises a flat surface that is rounded at its edges.

In some additional, alternative, or selectively cumulative embodiments, the distal hook end is rounded.

In some additional, alternative, or selectively cumulative embodiments, the distal hook end is pointed.

In some additional, alternative, or selectively cumulative embodiments, the vine collection area comprises a pocket.

In some additional, alternative, or selectively cumulative embodiments, the vine collection area or the pocket comprises a smooth collection surface.

In some additional, alternative, or selectively cumulative embodiments, the vine collection area or the pocket comprises a rough collection surface.

In some additional, alternative, or selectively cumulative embodiments, the vine collection area or the pocket comprises a collection surface with a gripping feature.

In some additional, alternative, or selectively cumulative embodiments, the vine collection area or the pocket comprises a collection surface with a gripping feature, wherein the gripping feature comprises one or more ridges and/or grooves.

In some additional, alternative, or selectively cumulative embodiments, a portion of the vine slide surface lies along a vine slide axis, wherein the vine collection area or the pocket comprises a collection surface with ridges or grooves, wherein the one or more of the ridges or grooves lies in a respective ridge plane or groove plane that is parallel to the vine slide axis.

In some additional, alternative, or selectively cumulative embodiments, the vine collection area or the pocket comprises a collection surface with ridges and/or grooves, wherein the one or more of the ridges or the grooves lies in a respective ridge plane or groove plane, wherein a portion of the vine slide surface lies along a vine slide axis, and wherein the ridge plane or groove plane and the vine slide axis form a groove angle that is less than or equal to 45 degrees.

In some additional, alternative, or selectively cumulative embodiments, the vine collection area or the pocket comprises a collection surface with ridges and/or grooves, wherein the one or more of the ridges or the grooves lies in a respective ridge plane or groove plane, wherein a portion of the vine slide surface lies along a vine slide axis, and wherein the ridge plane or groove plane and the vine slide axis form a groove angle that is less than or equal to 30 degrees.

In some additional, alternative, or selectively cumulative embodiments, the vine collection area or the pocket comprises a collection surface with ridges and/or grooves, wherein the one or more of the ridges or the grooves lies in a respective ridge plane or groove plane, wherein a portion of the vine slide surface lies along a vine slide axis, and wherein the ridge plane or groove plane and the vine slide axis form a groove angle that is less than or equal to 15 degrees.

In some additional, alternative, or selectively cumulative embodiments, the vine collection area or the pocket comprises a collection surface with ridges and/or grooves, wherein the one or more of the ridges or the grooves lies in a respective ridge plane or groove plane, wherein a portion of the vine slide surface lies along a vine slide axis, and wherein the ridge plane or groove plane and the vine slide axis form a groove angle that is less than or equal to 7.5 degrees.

In some additional, alternative, or selectively cumulative embodiments, the vine collection area or the pocket comprises a collection surface with ridges and/or grooves, wherein the ridge or groove has an elevation dimension with respect to the collection surface that is less than or equal to 4 mm.

In some additional, alternative, or selectively cumulative embodiments, the vine collection area or the pocket comprises a collection surface with ridges and/or grooves, wherein the ridge or groove has an elevation dimension with respect to the collection surface that is less than or equal to 3 mm.

In some additional, alternative, or selectively cumulative embodiments, the vine collection area or the pocket comprises a collection surface with ridges and/or grooves, wherein the ridge or groove has an elevation dimension with respect to the collection surface that is less than or equal to 2.5 mm.

In some additional, alternative, or selectively cumulative embodiments, the vine collection area or the pocket comprises a collection surface with ridges and/or grooves, wherein the ridge or groove has an elevation dimension with respect to the collection surface that is greater than or equal to 0.5 mm.

In some additional, alternative, or selectively cumulative embodiments, the vine collection area or the pocket comprises a collection surface with ridges and/or grooves, wherein the ridge or groove has an elevation dimension with respect to the collection surface that is greater than or equal to 1 mm.

In some additional, alternative, or selectively cumulative embodiments, the vine collection area or the pocket comprises a collection surface with ridges and/or grooves, wherein the ridge or groove has an elevation dimension with respect to the collection surface that is greater than or equal to 2 mm.

In some additional, alternative, or selectively cumulative embodiments, the vine collection area or the pocket comprises a collection surface with one or more ridges wherein the ridge has an edge radius of less than 0.05 mm.

In some additional, alternative, or selectively cumulative embodiments, the vine collection area or the pocket comprises a collection surface with one or more ridges wherein the ridge has an edge radius of less than 0.025 mm.

In some additional, alternative, or selectively cumulative embodiments, the vine collection area or the pocket comprises a collection surface with one or more ridges wherein the ridge has an edge radius of less than 0.01 mm.

In some additional, alternative, or selectively cumulative embodiments, the vine collection area or the pocket comprises a collection surface with ridges and/or grooves, wherein at least two ridges or two grooves have nonparallel planes.

In some additional, alternative, or selectively cumulative embodiments, the vine collection area or the pocket comprises a collection surface with ridges and/or grooves, wherein at least two ridges or two grooves have different elevation dimensions with respect to the collection surface.

In some additional, alternative, or selectively cumulative embodiments, the vine collection area or the pocket comprises a collection surface with multiple ridges and/or multiple grooves, wherein at least two ridges and/or grooves have different elevation dimensions with respect to the collection surface.

In some additional, alternative, or selectively cumulative embodiments, the vine collection area or the pocket comprises a collection surface with multiple ridges and/or multiple grooves, wherein a ridge and/or groove has more than one elevation dimension with respect to the collection surface.

In some additional, alternative, or selectively cumulative embodiments, the vine collection area or the pocket comprises a collection surface with multiple ridges and/or multiple grooves, wherein a ridge and/or groove has a uniform elevation dimension with respect to the collection surface.

In some additional, alternative, or selectively cumulative embodiments, the vine collection area or the pocket comprises a collection surface with multiple ridges and/or multiple grooves, wherein at least some of the ridges and/or grooves are spaced apart by a spacing dimension that is greater than or equal to 1 mm.

In some additional, alternative, or selectively cumulative embodiments, the vine collection area or the pocket comprises a collection surface with multiple ridges and/or multiple grooves, wherein at least some of the ridges and/or grooves are spaced apart by a spacing dimension that is greater than or equal to 1.5 mm.

In some additional, alternative, or selectively cumulative embodiments, the vine collection area or the pocket comprises a collection surface with multiple ridges and/or multiple grooves, wherein at least some of the ridges and/or grooves are spaced apart by a spacing dimension that is greater than or equal to 2 mm.

In some additional, alternative, or selectively cumulative embodiments, the vine collection area or the pocket comprises a collection surface with multiple ridges and/or multiple grooves, wherein at least some of the ridges and/or grooves are spaced apart by a spacing dimension that is greater than or equal to 4 mm.

In some additional, alternative, or selectively cumulative embodiments, the vine collection area or the pocket comprises a collection surface with multiple ridges and/or multiple grooves, wherein at least some of the ridges and/or grooves are spaced apart by a spacing dimension that is greater than or equal to 3 mm.

In some additional, alternative, or selectively cumulative embodiments, the vine collection area or the pocket comprises a collection surface with multiple ridges and/or multiple grooves, wherein at least some of the ridges and/or grooves are spaced apart by a spacing dimension that is greater than or equal to 2.5 mm.

In some additional, alternative, or selectively cumulative embodiments, the vine collection area or the pocket comprises a collection surface with multiple ridges and/or multiple grooves, wherein a ridge and/or groove is uniformly linear with respect to a groove axis.

In some additional, alternative, or selectively cumulative embodiments, the vine collection area or the pocket comprises a collection surface with multiple ridges and/or multiple grooves, wherein a ridge and/or groove is curved in a plane of the collection surface.

In some additional, alternative, or selectively cumulative embodiments, the vine collection area or the pocket comprises a collection surface that is curved.

In some additional, alternative, or selectively cumulative embodiments, the vine collection area or the pocket comprises a shape of complex curvature.

In some additional, alternative, or selectively cumulative embodiments, the vine collection area or the pocket comprises a shape of simple curvature.

In some additional, alternative, or selectively cumulative embodiments, the vine collection area or the pocket comprises a linear segment.

In some additional, alternative, or selectively cumulative embodiments, the vine collection area or the pocket comprises a shape with circular curvature.

In some additional, alternative, or selectively cumulative embodiments, the vine collection area or the pocket comprises a shape with oblong curvature.

In some additional, alternative, or selectively cumulative embodiments, the vine collection area or the pocket comprises a shape with parabolic curvature.

In some additional, alternative, or selectively cumulative embodiments, a portion of the vine slide surface lies along a vine slide axis, wherein the vine collection area or the pocket comprises a collection surface having a collection surface width perpendicular to the vine slide axis, wherein the collection surface width is greater than or equal to 5 mm.

In some additional, alternative, or selectively cumulative embodiments, a portion of the vine slide surface lies along a vine slide axis, wherein the vine collection area or the pocket comprises a collection surface having a collection surface width perpendicular to the vine slide axis, wherein the collection surface width is greater than or equal to 6 mm.

In some additional, alternative, or selectively cumulative embodiments, a portion of the vine slide surface lies along a vine slide axis, wherein the vine collection area or the pocket comprises a collection surface having a collection surface width perpendicular to the vine slide axis, wherein the collection surface width is greater than or equal to 6.25 mm.

In some additional, alternative, or selectively cumulative embodiments, the vine collection area or the pocket comprises a collection surface with multiple ridges and/or multiple grooves, wherein at least some of the ridges and/or grooves are sufficiently sharp to bite into a vine without severing it.

In some additional, alternative, or selectively cumulative embodiments, the jaw projection comprises a projection shape that is mated to a pocket shape of the pocket.

In some additional, alternative, or selectively cumulative embodiments, the jaw projection comprises a projection contour that is unmated to a pocket contour of the pocket.

In some additional, alternative, or selectively cumulative embodiments, the jaw projection is in a closed position whenever the jaw projection is fully extended into the vine collection area or the pocket, wherein the jaw projection comprises a projection surface with a projection shape that is mated to a collection shape of a collection surface of the vine collection area or the pocket, and wherein at least a projection surface portion of the projection surface is spaced apart from a collection surface portion of the collection surface when the jaw projection is in the closed position.

In some additional, alternative, or selectively cumulative embodiments, the jaw projection is in a closed position whenever the jaw projection is fully extended into the vine collection area or the pocket, wherein the jaw projection comprises a projection surface with a projection shape that is mated to a collection shape of a collection surface of the vine collection area or the pocket, and wherein at least a projection surface portion of the projection surface is spaced apart from a collection surface portion of the collection surface by less than or equal to 4 mm when the jaw projection is in the closed position.

In some additional, alternative, or selectively cumulative embodiments, the jaw projection is in a closed position whenever the jaw projection is fully extended into vine collection area or the pocket, wherein the jaw projection comprises a projection surface with a projection shape that is mated to a collection shape of a collection surface of the vine collection area or the pocket, and wherein at least a projection surface portion of the projection surface is spaced apart from a collection surface portion of the collection surface by less than or equal to 3 mm when the jaw projection is in the closed position.

In some additional, alternative, or selectively cumulative embodiments, the jaw projection is in a closed position whenever the jaw projection is fully extended into the vine collection area or the pocket, wherein the jaw projection comprises a projection surface with a projection shape that is mated to a collection shape of a collection surface of the vine collection area or the pocket, and wherein at least a projection surface portion of the projection surface is spaced apart from a collection surface portion of the collection surface by less than or equal to 2.5 mm when the jaw projection is in the closed position.

In some additional, alternative, or selectively cumulative embodiments, the jaw projection is in a closed position whenever the jaw projection is fully extended into the vine collection area or the pocket, wherein the jaw projection comprises a projection surface with a projection shape that is mated to a collection shape of a collection surface of the vine collection area or the pocket, and wherein at least a projection surface portion of the projection surface is spaced apart from a collection surface portion of the collection surface by greater than or equal to 0.1 mm when the jaw projection is in the closed position.

In some additional, alternative, or selectively cumulative embodiments, the jaw projection is in a closed position whenever the jaw projection is fully extended into the pocket, wherein the jaw projection comprises a projection surface with a projection shape that is mated to a pocket shape of a collection surface of the vine collection area or the pocket, and wherein at least a projection surface portion of the projection surface is spaced apart from a collection surface portion of the collection surface by greater than or equal to 0.5 mm when the jaw projection is in the closed position.

In some additional, alternative, or selectively cumulative embodiments, the jaw projection is in a closed position whenever the jaw projection is fully extended into the vine collection area or the pocket, wherein the jaw projection comprises a projection surface with a projection shape that is mated to a pocket shape of a collection surface of the vine collection area or the pocket, and wherein at least a projection surface portion of the projection surface is spaced apart from a collection surface portion of the collection surface by greater than or equal to 1 mm when the jaw projection is in the closed position.

In some additional, alternative, or selectively cumulative embodiments, the jaw projection is in a closed position whenever the jaw projection is fully extended into the vine collection area or the pocket, wherein the jaw projection comprises a projection surface with a projection shape that is mated to a pocket shape of a collection surface of the vine collection area or the pocket, and wherein at least a projection surface portion of the projection surface is spaced apart from a collection surface portion of the collection surface by greater than or equal to 2 mm when the jaw projection is in the closed position.

In some additional, alternative, or selectively cumulative embodiments, the jaw projection comprises a smooth jaw projection surface.

In some additional, alternative, or selectively cumulative embodiments, the jaw projection comprises a rough jaw projection surface.

In some additional, alternative, or selectively cumulative embodiments, the jaw projection comprises a jaw projection surface having multiple surface features with different respective elevations.

In some additional, alternative, or selectively cumulative embodiments, the vine collection area comprises a vine collection surface having multiple surface features with different respective elevations or wherein the jaw projection comprises a jaw projection surface having multiple surface features with different respective elevations.

In some additional, alternative, or selectively cumulative embodiments, a portion of the vine slide surface lies along a vine slide axis, wherein one or more of the multiple features has a feature major axis, wherein the feature major axis and the vine slide axis form a feature angle that is less than or equal to 45 degrees.

In some additional, alternative, or selectively cumulative embodiments, the vine collection area comprises a vine collection surface having multiple surface features or wherein the jaw projection comprises a jaw projection surface having multiple surface features, wherein the multiple surface features are configured to minimize severing a vine while gripping it between the jaw projection and the vine collection area.

In some additional, alternative, or selectively cumulative embodiments, the vine collection surface comprises multiple vine collection surface features, wherein the jaw projection surface comprises multiple jaw projection surface features that are configured to mesh with the multiple vine collection surface features.

In some additional, alternative, or selectively cumulative embodiments, a portion of the vine slide surface lies along a vine slide axis, and the vine collection area has a vine collection surface with a vine collection surface width that is perpendicular to the vine slide axis, wherein the jaw projection comprises a jaw projection surface having a jaw projection surface width that is perpendicular to the vine slide axis, wherein the jaw projection surface width is greater than the vine collection surface width.

In some additional, alternative, or selectively cumulative embodiments, the jaw projection comprises a jaw projection surface with a gripping feature.

In some additional, alternative, or selectively cumulative embodiments, the jaw projection comprises a jaw projection surface with a gripping feature, wherein the gripping feature comprises one or more ridges and/or grooves.

In some additional, alternative, or selectively cumulative embodiments, a portion of the vine slide surface lies along a vine slide axis, wherein the jaw projection comprises a jaw projection surface with ridges or grooves, wherein the one or more of the ridges or grooves lies in a respective ridge plane or groove plane that is parallel to the vine slide axis.

In some additional, alternative, or selectively cumulative embodiments, the jaw projection comprises a jaw projection surface with ridges and/or grooves, wherein the one or more of the ridges or the grooves lies in a respective ridge plane or groove plane, wherein a portion of the vine slide surface lies along a vine slide axis, and wherein the ridge plane or groove plane and the vine slide axis form a groove angle that is less than or equal to 45 degrees.

In some additional, alternative, or selectively cumulative embodiments, the jaw projection comprises a jaw projection surface with ridges and/or grooves, wherein the one or more of the ridges or the grooves lies in a respective ridge plane or groove plane, wherein a portion of the vine slide surface lies along a vine slide axis, and wherein the ridge plane or groove plane and the vine slide axis form a groove angle that is less than or equal to 30 degrees.

In some additional, alternative, or selectively cumulative embodiments, the jaw projection comprises a jaw projection surface with ridges and/or grooves, wherein the one or more of the ridges or the grooves lies in a respective ridge plane or groove plane, wherein a portion of the vine slide surface lies along a vine slide axis, and wherein the ridge plane or groove plane and the vine slide axis form a groove angle that is less than or equal to 15 degrees.

In some additional, alternative, or selectively cumulative embodiments, the jaw projection comprises a jaw projection surface with ridges and/or grooves, wherein the one or more of the ridges or the grooves lies in a respective ridge plane or groove plane, wherein a portion of the vine slide surface lies along a vine slide axis, and wherein the ridge plane or groove plane and the vine slide axis form a groove angle that is less than or equal to 7.5 degrees.

In some additional, alternative, or selectively cumulative embodiments, the jaw projection comprises a jaw projection surface with ridges and/or grooves, wherein the ridge or groove has an elevation dimension with respect to the jaw projection surface that is less than or equal to 4 mm.

In some additional, alternative, or selectively cumulative embodiments, the jaw projection comprises a jaw projection surface with ridges and/or grooves, wherein the ridge or groove has an elevation dimension with respect to the jaw projection surface that is less than or equal to 3 mm.

In some additional, alternative, or selectively cumulative embodiments, the jaw projection comprises a jaw projection surface with ridges and/or grooves, wherein the ridge or groove has an elevation dimension with respect to the jaw projection surface that is less than or equal to 2.5 mm.

In some additional, alternative, or selectively cumulative embodiments, the jaw projection comprises a jaw projection surface with ridges and/or grooves, wherein the ridge or groove has an elevation dimension with respect to the jaw projection surface that is greater than or equal to 0.5 mm.

In some additional, alternative, or selectively cumulative embodiments, the jaw projection comprises a jaw projection surface with ridges and/or grooves, wherein the ridge or groove has an elevation dimension with respect to the jaw projection surface that is greater than or equal to 1 mm.

In some additional, alternative, or selectively cumulative embodiments, the jaw projection comprises a jaw projection surface with ridges and/or grooves, wherein the ridge or groove has an elevation dimension with respect to the jaw projection surface that is greater than or equal to 2 mm.

In some additional, alternative, or selectively cumulative embodiments, the jaw projection comprises a jaw projection surface with one or more ridges wherein the ridge has an edge radius of less than 0.05 mm.

In some additional, alternative, or selectively cumulative embodiments, the jaw projection comprises a jaw projection surface with one or more ridges wherein the ridge has an edge radius of less than 0.025 mm.

In some additional, alternative, or selectively cumulative embodiments, the jaw projection comprises a jaw projection surface with one or more ridges wherein the ridge has an edge radius of less than 0.01 mm.

In some additional, alternative, or selectively cumulative embodiments, the jaw projection comprises a jaw projection surface with ridges and/or grooves, wherein at least two ridges or grooves have nonparallel gripping planes.

In some additional, alternative, or selectively cumulative embodiments, the jaw projection comprises a jaw projection surface with ridges and/or grooves, wherein at least two ridges or grooves have different elevation dimensions with respect to the jaw projection surface.

In some additional, alternative, or selectively cumulative embodiments, the jaw projection comprises a jaw projection surface with multiple ridges and/or multiple grooves, wherein at least two ridges and/or grooves have different elevation dimensions with respect to the jaw projection surface.

In some additional, alternative, or selectively cumulative embodiments, the jaw projection comprises a jaw projection surface with multiple ridges and/or multiple grooves, wherein a ridge and/or groove has more than one elevation dimension with respect to the jaw projection surface.

In some additional, alternative, or selectively cumulative embodiments, the jaw projection comprises a jaw projection surface with multiple ridges and/or multiple grooves, wherein a ridge and/or groove has a uniform elevation dimension with respect to the jaw projection surface.

In some additional, alternative, or selectively cumulative embodiments, the jaw projection comprises a jaw projection surface with multiple ridges and/or multiple grooves, wherein at least some of the ridges and/or grooves are spaced apart by a spacing dimension that is greater than or equal to 1 mm.

In some additional, alternative, or selectively cumulative embodiments, the jaw projection comprises a jaw projection surface with multiple ridges and/or multiple grooves, wherein at least some of the ridges and/or grooves are spaced apart by a spacing dimension that is greater than or equal to 1.5 mm.

In some additional, alternative, or selectively cumulative embodiments, the jaw projection comprises a jaw projection surface with multiple ridges and/or multiple grooves, wherein at least some of the ridges and/or grooves are spaced apart by a spacing dimension that is greater than or equal to 2 mm.

In some additional, alternative, or selectively cumulative embodiments, the jaw projection comprises a jaw projection surface with multiple ridges and/or multiple grooves, wherein at least some of the ridges and/or grooves are spaced apart by a spacing dimension that is greater than or equal to 4 mm.

In some additional, alternative, or selectively cumulative embodiments, the jaw projection comprises a jaw projection surface with multiple ridges and/or multiple grooves, wherein at least some of the ridges and/or grooves are spaced apart by a spacing dimension that is greater than or equal to 3 mm.

In some additional, alternative, or selectively cumulative embodiments, the jaw projection comprises a jaw projection surface with multiple ridges and/or multiple grooves, wherein at least some of the ridges and/or grooves are spaced apart by a spacing dimension that is greater than or equal to 2.5 mm.

In some additional, alternative, or selectively cumulative embodiments, the jaw projection comprises a jaw projection surface with multiple ridges and/or multiple grooves, wherein a ridge and/or groove is uniformly linear with respect to a groove axis.

In some additional, alternative, or selectively cumulative embodiments, the jaw projection comprises a jaw projection surface with multiple ridges and/or multiple grooves, wherein a ridge and/or groove is curved in a plane of the jaw projection surface.

In some additional, alternative, or selectively cumulative embodiments, the vine collection area or the pocket comprises a collection surface with collection ridges or collection grooves, wherein the jaw projection comprises a jaw projection surface with jaw ridges and/or jaw grooves, and wherein at least one jaw groove or one jaw ridge is in the same plane as at least one respective collection ridge or collection groove.

In some additional, alternative, or selectively cumulative embodiments, the vine collection area or the pocket comprises a collection surface with collection ridges or collection grooves, wherein the jaw projection comprises a jaw projection surface with jaw ridges and/or jaw grooves, wherein a jaw groove is in the same plane as a collection ridge or a jaw ridge is in the same plane as a collection groove.

In some additional, alternative, or selectively cumulative embodiments, the jaw projection is in a closed position whenever the jaw projection is fully extended into the pocket, wherein the jaw projection comprises a projection surface with a projection shape that is mated to a pocket shape of a pocket surface of the pocket, and wherein at least a projection surface portion of the projection surface is spaced apart from a pocket surface portion of the pocket surface when the jaw projection is in the closed position, wherein the pocket comprises a pocket surface with pocket ridges or pocket grooves, wherein the jaw projection comprises a jaw projection surface with jaw ridges and/or jaw grooves, wherein a jaw groove is in the same plane as a pocket ridge or jaw ridge is in the same plane as a pocket groove, wherein the groove is spaced apart from the corresponding ridge when the jaw projection is in the closed position.

In some additional, alternative, or selectively cumulative embodiments, the jaw projection is in a closed position whenever the jaw projection is fully extended into the pocket, wherein the jaw projection comprises a projection surface with a projection shape that is mated to a pocket shape of a pocket surface of the pocket, and wherein at least a projection surface portion of the projection surface is operable to contact a pocket surface portion of the pocket surface when the jaw projection is in the closed position.

In some additional, alternative, or selectively cumulative embodiments, the jaw projection is in a closed position whenever the jaw projection is fully extended into the pocket, wherein the jaw projection comprises a projection surface with a projection shape that is mated to a pocket shape of a pocket surface of the pocket, and wherein at least a projection surface portion of the projection surface is operable to contact a pocket surface portion of the pocket surface when the jaw projection is in the closed position, wherein the pocket comprises a pocket surface with pocket ridges or pocket grooves, wherein the jaw projection comprises a jaw projection surface with jaw ridges and/or jaw grooves, wherein a jaw groove is in the same plane as a pocket ridge or jaw ridge is in the same plane as a pocket groove, wherein the groove is spaced apart from the corresponding ridge when the jaw projection is in the closed position.

In some additional, alternative, or selectively cumulative embodiments, the jaw projection is in a closed position whenever the jaw projection is fully extended into the pocket, wherein the jaw projection comprises a projection surface with a projection shape that is mated to a pocket shape of a pocket surface of the pocket, and wherein at least a projection surface portion of the projection surface is operable to contact a pocket surface portion of the pocket surface when the jaw projection is in the closed position, wherein the pocket comprises a pocket surface with pocket ridges or pocket grooves, wherein the jaw projection comprises a jaw projection surface with jaw ridges and/or jaw grooves, wherein a jaw groove is in the same plane as a pocket ridge or jaw ridge is in the same plane as a pocket groove, wherein the groove is operable to contact the corresponding ridge when the jaw projection is in the closed position.

In some additional, alternative, or selectively cumulative embodiments, the jaw projection is curved.

In some additional, alternative, or selectively cumulative embodiments, the jaw projection comprises a shape of complex curvature.

In some additional, alternative, or selectively cumulative embodiments, the jaw projection comprises a shape of simple curvature.

In some additional, alternative, or selectively cumulative embodiments, the jaw projection comprises a linear segment.

In some additional, alternative, or selectively cumulative embodiments, the jaw projection comprises a shape with circular curvature.

In some additional, alternative, or selectively cumulative embodiments, the jaw projection comprises a shape with oblong curvature.

In some additional, alternative, or selectively cumulative embodiments, the jaw projection comprises a shape with parabolic curvature.

In some additional, alternative, or selectively cumulative embodiments, the jaw projection has a major jaw projection dimension, wherein the vine slide surface has a vine slide length, and wherein the vine slide length is longer than the major jaw projection dimension of the jaw projection or longer than two times the major jaw projection dimension of the jaw projection.

In some additional, alternative, or selectively cumulative embodiments, a portion of the vine slide surface lies along a vine slide axis, wherein the jaw projection comprises a jaw projection surface having a surface width of greater than or equal to 5 mm.

In some additional, alternative, or selectively cumulative embodiments, a portion of the vine slide surface lies along a vine slide axis, wherein the jaw projection comprises a jaw projection surface having a surface width of greater than or equal to 6 mm.

In some additional, alternative, or selectively cumulative embodiments, a portion of the vine slide surface lies along a vine slide axis, wherein the jaw projection comprises a jaw projection surface having a surface width of greater than or equal to 6.25 mm.

In some additional, alternative, or selectively cumulative embodiments, a portion of the vine slide surface lies along a vine slide axis, wherein the jaw projection comprises a jaw projection surface having a surface jaw projection surface width that is perpendicular to the vine slide axis, wherein the jaw projection surface width is greater than or equal to 0.5 inches.

In some additional, alternative, or selectively cumulative embodiments, the jaw projection comprises a jaw projection surface with multiple ridges and/or multiple grooves, wherein at least some of the ridges and/or grooves are sufficiently sharp to bite into a vine without severing it.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket depth (optionally relative to the slide surface) between the distal pocket end and the proximal pocket end that is less than or equal to 125 mm.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket depth (optionally relative to the slide surface) between the distal pocket end and the proximal pocket end that is less than or equal to 100 mm.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket depth (optionally relative to the slide surface) between the distal pocket end and the proximal pocket end that is less than or equal to 75 mm.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket depth (optionally relative to the slide surface) between the distal pocket end and the proximal pocket end that is greater than or equal to 25 mm.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket depth (optionally relative to the slide surface) between the distal pocket end and the proximal pocket end that is less than or equal to 50 mm.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket depth (optionally relative to the slide surface) between the distal pocket end and the proximal pocket end that is less than or equal to 75 mm.

In some additional, alternative, or selectively cumulative embodiments, the pocket has a pocket length, and the vine slide length is longer than the pocket length.

In some additional, alternative, or selectively cumulative embodiments, the pocket has a pocket length, and the vine slide length is longer than 1.5 times the pocket length.

In some additional, alternative, or selectively cumulative embodiments, the pocket has a pocket length, and the vine slide length is longer than 2 times the pocket length.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket length between the distal pocket end and the proximal pocket end that is less than or equal to 125 mm.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket length between the distal pocket end and the proximal pocket end that is less than or equal to 100 mm.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket length between the distal pocket end and the proximal pocket end that is less than or equal to 75 mm.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket length between the distal pocket end and the proximal pocket end that is greater than or equal to 25 mm.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket length between the distal pocket end and the proximal pocket end that is less than or equal to 50 mm.

In some additional, alternative, or selectively cumulative embodiments, the pocket has a proximal pocket end and a distal pocket end, wherein the distal pocket end is closer to the vine slide surface than is the proximal pocket end, wherein the pocket has a pocket length between the distal pocket end and the proximal pocket end that is less than or equal to 75 mm.

In some additional, alternative, or selectively cumulative embodiments, the jaw projection is in a closed position whenever the jaw projection is fully extended toward the pocket, wherein a portion of the jaw projection extends beyond a pocket surface portion of the pocket surface when the jaw projection is in the closed position.

In some additional, alternative, or selectively cumulative embodiments, the movable jaw is rotatable.

In some additional, alternative, or selectively cumulative embodiments, the movable jaw is rotatable about a pivot point.

In some additional, alternative, or selectively cumulative embodiments, the movable jaw is tensioned in an open position such that the jaw projection is tensioned away from the pocket.

In some additional, alternative, or selectively cumulative embodiments, the movable jaw is tensioned in an open position such that the jaw projection is tensioned away from the pocket by a torsion spring.

In some additional, alternative, or selectively cumulative embodiments, the movable jaw is tensioned in an open position such that the jaw projection is tensioned away from the pocket by a clock spring.

In some additional, alternative, or selectively cumulative embodiments, the movable jaw is tensioned in an open position such that the jaw projection is tensioned away from the pocket by a tension spring.

In some additional, alternative, or selectively cumulative embodiments, the jaw projection is in a closed position whenever the jaw projection is fully extended toward the pocket, wherein the jaw projection is levered into a closed position by a line.

In some additional, alternative, or selectively cumulative embodiments, the jaw projection is in a closed position whenever the jaw projection is fully extended toward the pocket, wherein the jaw projection is levered into a closed position by a line attached directly or indirectly to the movable jaw.

In some additional, alternative, or selectively cumulative embodiments, the jaw projection is in a closed position whenever the jaw projection is fully extended toward the pocket, wherein the jaw projection is levered into a closed position by multiple lines attached directly or indirectly to the movable jaw.

In some additional, alternative, or selectively cumulative embodiments, the jaw projection is in a closed position whenever the jaw projection is fully extended toward the pocket, wherein the jaw projection is levered into a closed position by two lines attached directly or indirectly to the movable jaw.

In some additional, alternative, or selectively cumulative embodiments, the movable jaw has opposing side surfaces, wherein the jaw projection is in a closed position whenever the jaw projection is fully extended toward the pocket, wherein the jaw projection is levered into a closed position by two lines attached directly or indirectly to opposing side surfaces of the movable jaw.

In some additional, alternative, or selectively cumulative embodiments, the movable jaw has opposing side surfaces, wherein the jaw projection is in a closed position whenever the jaw projection is fully extended toward the pocket, wherein the jaw projection is levered into a closed position by one or more lines attached directly or indirectly to a bar on one or more of the opposing side surfaces of the movable jaw.

In some additional, alternative, or selectively cumulative embodiments, the movable jaw has opposing side surfaces, wherein the jaw projection is in a closed position whenever the jaw projection is fully extended toward the pocket, wherein the jaw projection is levered into a closed position by one or more lines attached directly or indirectly to a bar on one or more of the opposing side surfaces of the movable jaw, wherein the one or more lines are threaded around one or more respective sheaves.

In some additional, alternative, or selectively cumulative embodiments, the movable jaw has opposing side surfaces, wherein the jaw projection is in a closed position whenever the jaw projection is fully extended toward the pocket, wherein the jaw projection is levered into a closed position by one or more lines attached directly or indirectly to a bar on one or more of the opposing side surfaces of the movable jaw, wherein the one or more lines are threaded around one or more respective sheaves to facilitate uniform mechanical leverage throughout rotation of the movable jaw.

In some additional, alternative, or selectively cumulative embodiments, the movable jaw has opposing side surfaces, wherein the jaw projection is in a closed position whenever the jaw projection is fully extended toward the pocket, wherein the jaw projection is levered into a closed position by one or more lines attached directly or indirectly to a bar on one or more of the opposing side surfaces of the movable jaw, wherein the one or more lines are threaded around one or more respective sheaves to facilitate uniform mechanical leverage throughout full rotation of the movable jaw, wherein full rotation of the movable jaw is greater than or equal to 80 degrees.

In some additional, alternative, or selectively cumulative embodiments, the movable jaw has opposing side surfaces, wherein the jaw projection is in a closed position whenever the jaw projection is fully extended toward the pocket, wherein the jaw projection is levered into a closed position by one or more lines attached directly or indirectly to a bar on one or more of the opposing side surfaces of the movable jaw, wherein the one or more lines are threaded around one or more respective sheaves to facilitate uniform mechanical leverage throughout full rotation of the movable jaw, wherein full rotation of the movable jaw is greater than or equal to 90 degrees.

In some additional, alternative, or selectively cumulative embodiments, the movable jaw has opposing side surfaces, wherein the jaw projection is in a closed position whenever the jaw projection is fully extended toward the pocket, wherein the jaw projection is levered into a closed position by one or more lines attached directly or indirectly to a bar on one or more of the opposing side surfaces of the movable jaw, wherein the one or more lines are threaded around one or more respective sheaves to facilitate uniform mechanical leverage throughout full rotation of the movable jaw, wherein full rotation of the movable jaw is greater than or equal to 100 degrees.

In some additional, alternative, or selectively cumulative embodiments, the movable jaw has opposing side surfaces, wherein the jaw projection is in a closed position whenever the jaw projection is fully extended toward the pocket, wherein the jaw projection is levered into a closed position by one or more lines attached directly or indirectly to a bar on one or more of the opposing side surfaces of the movable jaw, wherein the one or more lines are threaded around one or more respective sheaves to facilitate uniform mechanical leverage throughout full rotation of the movable jaw, wherein full rotation of the movable jaw is greater than or equal to 110 degrees.

In some additional, alternative, or selectively cumulative embodiments, the movable jaw has opposing side surfaces, wherein the jaw projection is in a closed position whenever the jaw projection is fully extended toward the pocket, wherein the jaw projection is levered into a closed position by one or more lines attached directly or indirectly to a bar on one or more of the opposing side surfaces of the movable jaw, wherein the one or more lines are threaded around one or more respective sheaves to facilitate uniform mechanical leverage throughout full rotation of the movable jaw, wherein full rotation of the movable jaw is less than or equal to 130 degrees.

In some additional, alternative, or selectively cumulative embodiments, the movable jaw has opposing side surfaces, wherein the jaw projection is in a closed position whenever the jaw projection is fully extended toward the pocket, wherein the jaw projection is levered into a closed position by one or more lines attached directly or indirectly to a bar on one or more of the opposing side surfaces of the movable jaw, wherein the one or more lines are threaded around one or more respective sheaves to facilitate uniform mechanical leverage throughout full rotation of the movable jaw, wherein full rotation of the movable jaw is less than or equal to 120 degrees.

In some additional, alternative, or selectively cumulative embodiments, the movable jaw has opposing side surfaces, wherein the jaw projection is in a closed position whenever the jaw projection is fully extended toward the pocket, wherein the jaw projection is levered into a closed position by one or more lines attached directly or indirectly to a bar on one or more of the opposing side surfaces of the movable jaw, wherein the one or more lines are threaded around one or more respective sheaves to facilitate uniform mechanical leverage throughout full rotation of the movable jaw, wherein full rotation of the movable jaw is less than or equal to 110 degrees.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines is directly or indirectly connected to the belt.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the tether has a tether length that is adjustable.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the tether is connected to the primary actuation line by a snap clip.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein an auxiliary shaft line directly or indirectly connects the one or more of the lines to the shaft.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein an auxiliary shaft line directly or indirectly connects the one or more of the lines to the shaft, wherein the auxiliary shaft line comprises and elastic component.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein an auxiliary shaft line directly or indirectly connects the one or more of the lines to the shaft, wherein the auxiliary shaft line is connected to the shaft by a clam cleat.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein an auxiliary shaft line is operable to directly or indirectly connect the tether to the shaft.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the primary actuation line comprises multiple spaced-apart loops, wherein the tether is operable to connect directly or indirectly to one of the spaced apart loops.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the tether comprises multiple spaced-apart loops, wherein primary actuation line is operable to connect directly or indirectly to one of the spaced apart loops.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the primary actuation line or tether comprises multiple spaced-apart loops, wherein the tether and primary actuation line are operable to connect directly or indirectly to each other through one of the spaced-apart loops.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the primary actuation line or tether comprises multiple spaced-apart loops, wherein the tether and primary actuation line are operable to connect directly or indirectly to each other through one of the spaced-apart loops.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the primary actuation line or tether comprises multiple spaced-apart loops, wherein the tether and primary actuation line are operable to connect directly or indirectly to each other through one of the spaced-apart loops, wherein the spaced-apart loops are attached to the line at less than or equal to 0.3 meters apart.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the primary actuation line or tether comprises multiple spaced-apart loops, wherein the tether and primary actuation line are operable to connect directly or indirectly to each other through one of the spaced-apart loops, wherein the spaced-apart loops are attached to the line at less than or equal to 0.15 meters apart.

In some additional, alternative, or selectively cumulative embodiments, the line has a line length from the movable jaw to the belt.

In some additional, alternative, or selectively cumulative embodiments, the line has a line length from the movable jaw to the belt, wherein the line length is adjustable.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the primary actuation line or tether comprises multiple spaced-apart loops, wherein the tether and primary actuation line are operable to connect directly or indirectly to each other through one of the spaced-apart loops, wherein the line has a line length from the movable jaw to the belt, wherein the line length is operable to be adjusted by selection of different ones of the spaced-apart loops.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the primary actuation line or tether comprises multiple spaced-apart loops, wherein the tether and primary actuation line are operable to connect directly or indirectly to each other through one of the spaced-apart loops, wherein the line has a line length from the movable jaw to the belt, wherein the line length is operable to be adjusted by selection of different ones of the spaced-apart loops and/or by adjustment of a tether length of the tether.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the primary actuation line or tether comprises multiple spaced-apart loops including a selected loop operable for selection and remaining unselected loops, wherein the tether and primary actuation line are operable to connect directly or indirectly to each other through the selected loop, wherein the tether is operable to be threaded through some of the unselected loops on the primary actuation line.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein the primary actuation line or tether comprises multiple spaced-apart loops including a selected loop operable for selection and remaining unselected loops, wherein the tether and primary actuation line are operable to connect directly or indirectly to each other through the selected loop, wherein the primary actuation lined is operable to be threaded through some of the unselected loops on the tether.

In some additional, alternative, or selectively cumulative embodiments, the line has an elastic component.

In some additional, alternative, or selectively cumulative embodiments, the tether has an elastic component.

In some additional, alternative, or selectively cumulative embodiments, the line is relatively inelastic.

In some additional, alternative, or selectively cumulative embodiments, a portion of the line has a line diameter, wherein the line diameter in a range of 2 mm to 51 mm.

In some additional, alternative, or selectively cumulative embodiments, a portion of the line has a line diameter, wherein the line diameter in a range of 3.175 mm to 51 mm.

In some additional, alternative, or selectively cumulative embodiments, a portion of the line has a line diameter, wherein the line diameter in a range of 3.175 mm to 10 mm.

In some additional, alternative, or selectively cumulative embodiments, the shaft has a shaft hook end close to the hook, wherein shaft has a shaft operator end further from the hook than is the shaft hook end, wherein the jaw projection is in a closed position whenever the jaw projection is fully extended toward the pocket, wherein the jaw projection is levered into a closed position by one or more lines attached directly or indirectly to the movable jaw, wherein one or more of the lines includes a primary actuation line operatively connected directly or indirectly to the movable jaw and a tether operatively connected directly or indirectly to the belt and directly or indirectly to the primary actuation line, wherein an auxiliary shaft line is operable to directly or indirectly connect the tether to the shaft closer to the shaft operator end than to the shaft hook end.

In some additional, alternative, or selectively cumulative embodiments, the hook comprises a tang or a shank directly or indirectly connected to the proximal hook base.

In some additional, alternative, or selectively cumulative embodiments, the hook comprises a tang or a shank directly or indirectly connected to the proximal hook base, wherein the tang or shank is connected directly or indirectly to the shaft.

In some additional, alternative, or selectively cumulative embodiments, the shaft has a shaft hook end and a shaft operator end, wherein the shaft hook end is closer to the hook than is the shaft operator end, wherein the hook comprises a tang or a shank directly or indirectly connected to the proximal hook base, wherein the tang or shank inserted into the shaft hook end of the shaft.

In some additional, alternative, or selectively cumulative embodiments, the shaft comprises an extension pole.

In some additional, alternative, or selectively cumulative embodiments, the shaft comprises metal tubing.

In some additional, alternative, or selectively cumulative embodiments, the shaft comprises circular metal tubing.

In some additional, alternative, or selectively cumulative embodiments, the shaft comprises rectangular metal tubing.

In some additional, alternative, or selectively cumulative embodiments, the shaft comprises square metal tubing.

In some additional, alternative, or selectively cumulative embodiments, the belt is configured for fastening about a waist of the person.

In some additional, alternative, or selectively cumulative embodiments, the belt is configured for fastening about a torso of the person.

In some additional, alternative, or selectively cumulative embodiments, the belt is padded.

In some additional, alternative, or selectively cumulative embodiments, the vine removal tool includes an attachment mechanism for securing the belt about a person.

In some additional, alternative, or selectively cumulative embodiments, the belt is adjustable.

In some additional, alternative, or selectively cumulative embodiments, the vine removal tool includes an attachment mechanism for securing the belt about a person, wherein the belt comprises a first belt end and a second belt end having mated end connectors.

In some additional, alternative, or selectively cumulative embodiments, the vine removal tool includes an attachment mechanism for securing the belt about a person, wherein the belt comprises a first belt end and a second belt end having mated end connectors, wherein the belt comprises an adjustment mechanism, wherein the attachment mechanism and the adjustment mechanism resist slippage during use of the vine removal tool.

In some additional, alternative, or selectively cumulative embodiments, the shaft comprises an extension pole, wherein the extension pole has a pole length range that includes 1 to 3 meters.

In some additional, alternative, or selectively cumulative embodiments, the shaft comprises an extension pole, wherein the extension pole has a pole length range that includes 1 to 4 meters.

In some additional, alternative, or selectively cumulative embodiments, the shaft comprises an extension pole, wherein the extension pole has a pole length range that includes 1.2 to 3.1 meters.

In some additional, alternative, or selectively cumulative embodiments, the shaft comprises an extension pole, wherein the extension pole has a pole length range that includes 1.2 to 2.6 meters.

In some additional, alternative, or selectively cumulative embodiments, the shaft comprises an extension pole, wherein the extension pole has a pole length range that includes 1.5 to 3.1 meters.

In some additional, alternative, or selectively cumulative embodiments, the shaft comprises an extension pole, wherein the extension pole has a quick-release extension mechanism.

In some additional, alternative, or selectively cumulative embodiments, the shaft comprises an extension pole, wherein the extension pole has a quick-release extension mechanism that employs a quick-release detent pin and multiple holes.

In some additional, alternative, or selectively cumulative embodiments, the shaft comprises an extension pole, wherein the extension pole has a quick-release extension mechanism that employs a quick-release detent pin and multiple holes, wherein the holes comprise slots.

In some additional, alternative, or selectively cumulative embodiments, the shaft comprises an extension pole, wherein the extension pole has a quick-release extension mechanism that employs a quick release detent pin and multiple holes, wherein the holes are spaced apart by a distance of about 8 cm to 30 cm.

In some additional, alternative, or selectively cumulative embodiments, the shaft comprises an extension pole, wherein the extension pole has a quick-release extension mechanism that employs a quick release detent pin and multiple holes, wherein the holes are spaced apart by a distance of about 12 cm to 25 cm.

In some additional, alternative, or selectively cumulative embodiments, the shaft comprises an extension pole, wherein the extension pole has a quick-release extension mechanism that employs a quick release detent pin and multiple holes, wherein the holes are spaced apart by a distance of about 12 cm to 18 cm.

In some additional, alternative, or selectively cumulative embodiments, the jaw projection is in a closed position whenever the jaw projection is fully extended toward the pocket, wherein the jaw projection is levered into a closed position by one or more lines attached directly or indirectly to the movable jaw, wherein force applied to belt in a direction away from the hook is operable to engage the jaw actuation mechanism to bring the jaw projection into a closed position.

In some additional, alternative, or selectively cumulative embodiments, the line comprises a cord.

In some additional, alternative, or selectively cumulative embodiments, the line comprises a wire.

In some additional, alternative, or selectively cumulative embodiments, the hook is in the same plane as is the shaft.

In some additional, alternative, or selectively cumulative embodiments, the hook is in a different plane from that of the shaft.

In some additional, alternative, or selectively cumulative embodiments, a portion of the vine slide surface lies along a vine slide axis, wherein the pocket comprises a pocket surface having a pocket surface width that is perpendicular to the vine slide axis, wherein the jaw projection comprises a jaw projection surface having a jaw projection surface width that is perpendicular to the vine slide axis, and wherein the jaw projection surface width is greater than or equal to the pocket surface width.

In some additional, alternative, or selectively cumulative embodiments, a portion of the vine slide surface lies along a vine slide axis, wherein the pocket comprises a pocket surface having a pocket surface width that is perpendicular to the vine slide axis, wherein the jaw projection comprises a jaw projection surface having a jaw projection surface width that is perpendicular to the vine slide axis, and wherein the jaw projection surface width is greater than or equal to the pocket surface width, wherein in the jaw projection surface is bordered by a jaw wall.

In some additional, alternative, or selectively cumulative embodiments, a portion of the vine slide surface lies along a vine slide axis, wherein the pocket comprises a pocket surface having a pocket surface width that is perpendicular to the vine slide axis, wherein the jaw projection comprises a jaw projection surface having a jaw projection surface width that is perpendicular to the vine slide axis, and wherein the jaw projection surface width is greater than or equal to the pocket surface width, wherein in the jaw projection surface is bordered by a wall, wherein the jaw projection is in a closed position whenever the jaw projection is fully extended toward the pocket, wherein the jaw wall extends beyond the pocket surface when the jaw projection is in the closed position.

In some additional, alternative, or selectively cumulative embodiments, the vine removal tool is configured for gripping one or more vines.

In some additional, alternative, or selectively cumulative embodiments, the vine removal tool is configured for gripping one or more vines, and wherein the vines include one or more of the vines invasive to U.S natural areas.

In some additional, alternative, or selectively cumulative embodiments, the vine removal tool is configured for gripping one or more vines, and wherein the vines include one or more of the vines listed in The Invasive Plant Atlas.

In some additional, alternative, or selectively cumulative embodiments, the vine removal tool is configured for gripping one or more vines, and wherein the vines include one or more of the vines falling within a category of ground-cover vines.

In some additional, alternative, or selectively cumulative embodiments, the vine removal tool is configured for gripping one or more vines, and wherein the vines include one or more of English ivy or Himalayan blackberry.

In some additional, alternative, or selectively cumulative embodiments, a portion of the vine slide surface lies along a vine slide axis, wherein the hook has a hook spine opposite the vine slide surface.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook spine includes a spine tip segment that forms a hook tip angle with the vine slide axis, and wherein the hook tip angle is greater than or equal to 20 degrees.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook spine includes a spine tip segment that forms a hook tip angle with the vine slide axis, and wherein the hook tip angle is greater than or equal to 30 degrees.

In some additional, alternative, or selectively cumulative embodiments, wherein a portion of the vine slide surface lies along a vine slide axis, wherein the hook has a hook spine opposite the vine slide surface that extends from a hook point at the distal hook end to the proximal hook base, wherein the hook spine includes a spine tip segment that forms a hook tip angle with the vine slide axis, and wherein the hook tip angle is greater than or equal to 40 degrees.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook spine includes a spine tip segment that forms a hook tip angle with the vine slide axis, wherein the hook spine includes a medial spine portion between the spine tip segment and the proximal hook base, wherein the medial spine portion forms a medial spine angle with the vine slide surface, and wherein the medial slide angle is less than the hook tip angle.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook spine includes a spine tip segment that forms a hook tip angle with the vine slide axis, wherein the hook spine includes a medial spine portion between the spine tip segment and the proximal hook base, wherein the medial spine portion forms a medial spine angle with the vine slide surface, and wherein the medial slide angle is less than or equal to 40 degrees.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook spine includes a spine tip segment that forms a hook tip angle with the vine slide axis, wherein the hook spine includes a medial spine portion between the spine tip segment and the proximal hook base, wherein the medial spine portion forms a medial spine angle with the vine slide surface, and wherein the medial slide angle is less than or equal to 30 degrees.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook spine includes a spine tip segment that forms a hook tip angle with the vine slide axis, wherein the hook spine includes a medial spine portion between the spine tip segment and the proximal hook base, wherein the medial spine portion forms a medial spine angle with the vine slide surface, and wherein the medial slide angle is less than or equal to 20 degrees.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook spine includes a spine tip segment that forms a hook tip angle with the vine slide axis, wherein the hook spine includes a medial spine portion between the spine tip segment and the proximal hook base, wherein the medial spine portion forms a medial spine angle with the vine slide surface, wherein the spine tip segment comprises a spine tip curve and the hook tip angle is an average of angles formed by the spine tip curve.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook spine includes a spine tip segment that forms a hook tip angle with the vine slide axis, wherein the hook spine includes a medial spine portion between the spine tip segment and the proximal hook base, wherein the medial spine portion forms a medial spine angle with the vine slide surface, wherein the medial spine portion comprises a medial spine curve and the medial spine angle is an average of angles formed by the medial spine curve.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook spine includes a spine tip segment that forms a hook tip angle with the vine slide axis, wherein the hook spine includes a medial spine portion between the spine tip segment and the proximal hook base, wherein the medial spine portion forms a medial spine angle with the vine slide surface, wherein the shaft has a shaft major axis, wherein the vine slide axis and the shaft major axis form a hook angle, and wherein the hook angle is greater than the medial spine angle.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook spine includes a spine tip segment that forms a hook tip angle with the vine slide axis, wherein the hook spine includes a medial spine portion between the spine tip segment and the proximal hook base, wherein the medial spine portion forms a medial spine angle with the vine slide surface, wherein the shaft has a shaft major axis, wherein the vine slide axis and the shaft major axis form a hook angle, and wherein the hook angle is greater than the medial spine angle, wherein the medial spine portion comprises a medial spine curve and the medial spine angle is an average of angles formed by the medial spine curve.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook includes a hook projection surface between the vine slide surface and the hook spine.

In some additional, alternative, or selectively cumulative embodiments, a surface skimmer mounted directly or indirectly to the hook, wherein the hook has a hook spine opposite the vine slide surface, wherein the surface skimmer has a skimmer edge that extends from the vine collection area or the vine slide surface toward the hook spine.

In some additional, alternative, or selectively cumulative embodiments, the skimmer edge is operable to resist sinking below a soil surface as the distal hook end is below the soil surface and pulled toward a person operating the vine removal tool.

In some additional, alternative, or selectively cumulative embodiments, herein a portion of the vine slide surface lies along a vine slide axis, wherein the hook has a hook spine opposite the vine slide surface that extends from a hook point at the distal hook end to the proximal hook base, wherein the hook includes a hook projection surface between the vine slide surface and the hook spine, wherein the pocket comprises a pocket surface having a pocket surface width perpendicular to the vine slide axis, wherein a surface skimmer is directly or indirectly attached to the proximal hook base and extends beyond the pocket surface width of the hook.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook includes a hook projection surface between the vine slide surface and the hook spine, wherein the pocket comprises a pocket surface having a pocket surface width perpendicular to the vine slide axis, wherein a surface skimmer is directly or indirectly attached to the proximal hook base and extends beyond the hook projection surface and/or the pocket surface width of the hook.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook includes a hook projection surface between the vine slide surface and the hook spine, wherein the pocket comprises a pocket surface having a pocket surface width perpendicular to the vine slide axis, wherein a surface skimmer is directly or indirectly attached to the proximal hook base and extends beyond the hook projection surface and/or the pocket surface width of the hook, wherein the surface skimmer has a skimming edge that is transverse to the hook projection surface.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook includes a hook projection surface between the vine slide surface and the hook spine, wherein the pocket comprises a pocket surface having a pocket surface width perpendicular to the vine slide axis, wherein a surface skimmer is directly or indirectly attached to the proximal hook base and extends beyond the hook projection surface and/or the pocket surface width of the hook, wherein the surface skimmer has a skimming edge that is transverse to the hook projection surface, wherein the skimming edge extends at least partly between the hook spine and the vine slide surface.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook includes a hook projection surface between the vine slide surface and the hook spine, wherein the pocket comprises a pocket surface having a pocket surface width perpendicular to the vine slide axis, wherein a surface skimmer is directly or indirectly attached to the proximal hook base and extends beyond the hook projection surface and/or the pocket surface width of the hook, wherein the surface skimmer has a skimming edge that is transverse to the hook projection surface, wherein the skimming edge extends at least partly between the hook spine and the vine slide surface, wherein the surface skimmer is contoured to extend at least partly around the pocket and match its contour, thereby adding to the pocket width.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook includes a hook projection surface between the vine slide surface and the hook spine, wherein the pocket comprises a pocket surface having a pocket surface width perpendicular to the vine slide axis, wherein a surface skimmer is directly or indirectly attached to the proximal hook base and extends beyond the hook projection surface and/or the pocket surface width of the hook, wherein the surface skimmer has a skimming edge that is transverse to the hook projection surface, wherein the skimming edge extends at least partly between the hook spine and the vine slide surface, wherein the surface skimmer edge is operable to at least partly limit depth penetration of the hook projection surface into the ground.

In some additional, alternative, or selectively cumulative embodiments, a portion of the vine slide surface lies along a vine slide axis, wherein the hook has a hook spine opposite the vine slide surface that extends from a hook point at the distal hook end to the proximal hook base, wherein the hook includes a hook projection surface between the vine slide surface and the hook spine, wherein the pocket comprises a pocket surface having a pocket surface width perpendicular to the vine slide axis, wherein a surface skimmer is directly or indirectly attached to the proximal hook base and extends beyond the hook projection surface and/or the pocket surface width of the hook, wherein the surface skimmer has a skimming edge that is transverse to the hook projection surface, wherein the skimming edge extends at least partly between the hook spine and the vine slide surface, wherein the skimmer edge has a skimmer width that is greater than or equal to the width of the vine slide surface.

In some additional, alternative, or selectively cumulative embodiments, movement of the vine slide surface in a hook movement direction toward the shaft is operable to collect vines.

In some additional, alternative, or selectively cumulative embodiments, movement of the vine slide surface in a hook movement direction from the hook toward the shaft or the user is operable to collect vines.

In some additional, alternative, or selectively cumulative embodiments, movement of the belt in a belt movement direction away from the movable jaw is operable to move the jaw projection toward the pocket.

In some additional, alternative, or selectively cumulative embodiments, movement of the belt in a belt movement direction away from the movable jaw and toward the shaft or the user is operable to move the jaw projection toward the pocket.

In some additional, alternative, or selectively cumulative embodiments, the vine slide surface is distinct from the pocket.

In some additional, alternative, or selectively cumulative embodiments, the pocket has a proximal pocket edge closer to the shaft than is a distal pocket edge, wherein the pocket depth has a pocket depth that is measured from a deepest point in the pocket to a midpoint of a geometric line connecting the proximal pocket edge to the distal pocket edge.

In some additional, alternative, or selectively cumulative embodiments, the pocket has a proximal pocket edge closer to the shaft than is a distal pocket edge, wherein the hook has a hook tip that is farther from the shaft than is the distal pocket edge.

In some additional, alternative, or selectively cumulative embodiments, a portion of the vine slide surface lies along a vine slide axis, wherein the pocket has a pocket surface that concave with respect to the vine slide axis.

In some additional, alternative, or selectively cumulative embodiments, the pocket has a proximal pocket edge closer to the shaft than is a distal pocket edge, wherein the pocket depth has a pocket depth that is measured from a deepest point in the pocket to a midpoint of a geometric line connecting the proximal pocket edge to the distal pocket edge, wherein the vine slide surface has a vine slide length, and wherein the vine slide length is longer than the pocket depth.

In some additional, alternative, or selectively cumulative embodiments, the pocket has a proximal pocket edge closer to the shaft than is a distal pocket edge, wherein a geometric line connecting the proximal pocket edge to the distal pocket edge defines a pocket length, wherein the vine slide surface has a vine slide length, and wherein the vine slide length is longer than the pocket length.

In some additional, alternative, or selectively cumulative embodiments, the pocket has a proximal pocket edge closer to the shaft than is a distal pocket edge, wherein a geometric line connecting the proximal pocket edge to the distal pocket edge defines a pocket length, wherein the vine slide surface has a vine slide length, and wherein the vine slide length is longer than at least twice the pocket length.

In some additional, alternative, or selectively cumulative embodiments, the pocket has a proximal pocket edge closer to the shaft than is a distal pocket edge, wherein a geometric line connecting the proximal pocket edge to the distal pocket edge defines a pocket length, wherein the vine slide surface has a vine slide length, and wherein the vine slide length is longer than three times the pocket length.

In some additional, alternative, or selectively cumulative embodiments, the pocket has a proximal pocket edge closer to the shaft than is a distal pocket edge, wherein a geometric line connecting the proximal pocket edge to the distal pocket edge defines a pocket length, wherein the shaft has a shaft major axis, wherein the hook has a hook tip, wherein a geometric line from the hook tip intersects the shaft major axis at 90 degrees and defines a hook tip distance, and wherein the hook tip distance is greater than the pocket length.

In some additional, alternative, or selectively cumulative embodiments, the pocket has a proximal pocket edge closer to the shaft than is a distal pocket edge, wherein a geometric line connecting the proximal pocket edge to the distal pocket edge defines a pocket length, wherein the shaft has a shaft major axis, wherein the hook has a hook tip, wherein a geometric line from the hook tip intersects the shaft major axis at 90 degrees and defines a hook tip distance, and wherein the hook tip distance is greater than at least twice the pocket length.

In some additional, alternative, or selectively cumulative embodiments, the pocket has a proximal pocket edge closer to the shaft than is a distal pocket edge, wherein a geometric line connecting the proximal pocket edge to the distal pocket edge defines a pocket length, wherein the shaft has a shaft major axis, wherein the hook has a hook tip, wherein a geometric line from the hook tip intersects the shaft major axis at 90 degrees and defines a hook tip distance, and wherein the hook tip distance is greater than at least three times the pocket length.

In some additional, alternative, or selectively cumulative embodiments, the pocket has a proximal pocket edge closer to the shaft than is a distal pocket edge, wherein a geometric line connecting the proximal pocket edge to the distal pocket edge defines a pocket length, wherein the shaft has a shaft major axis, wherein the hook has a hook tip, wherein a geometric line from the hook tip intersects the shaft major axis at 90 degrees and defines a hook tip distance, and wherein the hook tip distance is greater than at least four times the pocket length.

In some additional, alternative, or selectively cumulative embodiments, the movable jaw has a jaw projection that fits within the pocket, wherein the vine slide surface has a vine slide length, and wherein the vine slide length is longer than any dimension of the jaw projection.

In some additional, alternative, or selectively cumulative embodiments, the movable jaw has a jaw projection that fits within the pocket, wherein the vine slide surface has a vine slide length, and wherein the vine slide length is longer than at least twice any dimension of the jaw projection.

In some additional, alternative, or selectively cumulative embodiments, the movable jaw has a jaw projection that fits within the pocket and is configured to grip vines without completely severing them.

In some additional, alternative, or selectively cumulative embodiments, the vine slide surface has a vine slide axis, wherein the vine slide surface has a vine slide width that is perpendicular to the vine slide axis, wherein the shaft has a shaft cross-section dimension, and wherein the vine slide width is smaller than the shaft cross-section dimension.

In some additional, alternative, or selectively cumulative embodiments, the vine removal tool includes a de-tensioning mechanism to reduce tension on the jaw actuation mechanism.

In some additional, alternative, or selectively cumulative embodiments, the vine removal tool a de-tensioning mechanism to reduce tension on the jaw actuation mechanism to inhibit premature closure of the movable jaw.

In some additional, alternative, or selectively cumulative embodiments, the jaw actuation mechanism or the line includes a de-tensioning mechanism to reduce tension on the jaw actuation mechanism.

In some additional, alternative, or selectively cumulative embodiments, the line includes a de-tensioning mechanism to reduce tension on the jaw actuation mechanism.

In some additional, alternative, or selectively cumulative embodiments, the de-tensioning mechanism comprises a retractable tether component.

In some additional, alternative, or selectively cumulative embodiments, the retractable tether component directly or indirectly connects the belt to the hook.

In some additional, alternative, or selectively cumulative embodiments, the retractable tether component directly or indirectly connects the belt to the movable jaw.

In some additional, alternative, or selectively cumulative embodiments, the retractable tether component directly or indirectly connects to the line going to the hook or to the movable jaw.

In some additional, alternative, or selectively cumulative embodiments, the retractable tether component directly or indirectly connects to the tether going to belt.

In some additional, alternative, or selectively cumulative embodiments, the retractable tether component directly or indirectly connects to the line going to the hook or the movable jaw and to the tether connected to the belt.

In some additional, alternative, or selectively cumulative embodiments, the retractable tether component includes a retractable tether locking mechanism.

In some additional, alternative, or selectively cumulative embodiments, the retractable tether locking mechanism can be configured to be held open by a fairly strong spring or other tension device.

In some additional, alternative, or selectively cumulative embodiments, the retractable tether locking mechanism can be configured to be closed by pulling a strong cord attached to a hand strap configured for pulling by a hand of a user.

In some additional, alternative, or selectively cumulative embodiments, the retractable tether component can be configured to remain locked as long as the hand strap remains pulled.

In some additional, alternative, or selectively cumulative embodiments, the retractable tether component can be configured to remain locked as long as tension is maintained on the line going to the hook or the movable jaw.

In some additional, alternative, or selectively cumulative embodiments, whenever the retractable tether component is in an unlocked state or condition, the movable jaw is prevented from moving into a closed state or condition.

In some additional, alternative, or selectively cumulative embodiments, the spring or tensioning device holding the movable jaw open is stronger than the spring or tension device that retracts the retractable tether.

In some additional, alternative, or selectively cumulative embodiments, the spring or tensioning device that keeps the retracting mechanism unlocked is strong enough so that the weight of mechanism, and the tension off the retracting spring, is insufficient to lock it.

In some additional, alternative, or selectively cumulative embodiments, the de-tensioning mechanism comprises a retraction reel.

In some additional, alternative, or selectively cumulative embodiments, a jaw retraction mechanism is operable to cause the jaw projection to move away from the vine collection area, wherein the jaw retraction mechanism provides a minimum of 8'/pounds torque.

In some additional, alternative, or selectively cumulative embodiments, a jaw retraction mechanism comprises a reel.

In some additional, alternative, or selectively cumulative embodiments, the retraction reel is operable for connection to the belt, wherein the retraction reel is operable to re-adjust the line length and operable to maintain the line at a re-adjusted line length In some additional, alternative, or selectively cumulative embodiments, the retraction reel has locking switch or button.

In some additional, alternative, or selectively cumulative embodiments, the retraction reel is attached directly or indirectly to the belt.

In some additional, alternative, or selectively cumulative embodiments, the locking switch or button is positioned in proximity to where the webbing spools out.

In some additional, alternative, or selectively cumulative embodiments, the locking switch or button is positioned in proximity to where the webbing spools out.

In some additional, alternative, or selectively cumulative embodiments, the jaw actuation mechanism comprises at least one line that directly or indirectly operatively connects to the belt and to the movable jaw, wherein the line has a stretch characteristic.

In some additional, alternative, or selectively cumulative embodiments, the jaw actuation mechanism comprises at least one line that directly or indirectly operatively connects to the belt and to the movable jaw, wherein the line comprises a braided cord.

In some additional, alternative, or selectively cumulative embodiments, the jaw actuation mechanism comprises at least one line that directly or indirectly operatively connects to the belt and to the movable jaw, wherein the line comprises a synthetic braided cord.

In some additional, alternative, or selectively cumulative embodiments, the jaw actuation mechanism comprises at least one line that directly or indirectly operatively connects to the belt and to the movable jaw, wherein the line comprises a braided cord and a foam core.

In some additional, alternative, or selectively cumulative embodiments, the jaw actuation mechanism comprises at least one line that directly or indirectly operatively connects to the belt and to the movable jaw, wherein the line comprises a braided cord and a closed cell foam core.

In some additional, alternative, or selectively cumulative embodiments, the jaw actuation mechanism comprises at least one line that directly or indirectly operatively connects to the belt and to the movable jaw, wherein the line comprises a braided cord and a foam core, and wherein the line performs better in a drop-load test than the braided cord without the foam core.

In some additional, alternative, or selectively cumulative embodiments, the vine selection tool of any preceding claim, further comprising a belt operable for fastening about a person.

In some additional, alternative, or selectively cumulative embodiments, the hook has a hook spine opposite the vine slide surface, wherein the hook spine extends from the distal hook end to a hook projection base, wherein the vine slide surface and the hook spine define a hook projection between the vine slide surface and the hook spine, and wherein the hook projection is configured for subterranean movement.

In some additional, alternative, or selectively cumulative embodiments, the hook has a hook spine opposite the vine slide surface that extends from a hook point at the distal hook end to the proximal hook base, wherein the hook includes a hook projection surface between the vine slide surface and the hook spine, wherein a surface skimmer is directly or indirectly attached to the proximal hook base or hook projection surface.

In some additional, alternative, or selectively cumulative embodiments, a portion of the vine slide surface lies along a vine slide axis, wherein the vine slide surface has a vine slide surface width that is perpendicular to the vine slide axis, wherein the hook has a hook spine opposite the vine slide surface that extends from a hook point at the distal hook end to the proximal hook base, wherein the hook includes a hook projection surface between the vine slide surface and the hook spine, wherein a surface skimmer is directly or indirectly attached to the proximal hook base or the hook projection surface and extends beyond the vine slide surface width.

In some additional, alternative, or selectively cumulative embodiments, the shaft has a bend.

In some additional, alternative, or selectively cumulative embodiments, the shaft includes a primary shaft attached closest to the hook and a secondary shaft attached directly or indirectly to the primary shaft and farther from the hook.

In some additional, alternative, or selectively cumulative embodiments, the shaft includes a primary shaft attached closest to the hook and a secondary shaft attached directly or indirectly to the primary shaft and farther from the hook, wherein the primary and secondary shafts are connected at an angle.

In some additional, alternative, or selectively cumulative embodiments, the shaft includes a primary shaft attached closest to the hook and a secondary shaft attached directly or indirectly to the primary shaft and farther from the hook, wherein the primary and secondary shafts are pivotally connected at an angle.

In some additional, alternative, or selectively cumulative embodiments, a saw handle is operable to facilitate transport of the vine removal tool when the vine removal tool is in a folded and locked condition.

In some additional, alternative, or selectively cumulative embodiments, the hook tip comprises a harder material than the hook projection.

In some additional, alternative, or selectively cumulative embodiments, a cutting blade is directly or indirectly attached to the hook.

In some additional, alternative, or selectively cumulative embodiments, the cutting blade is retractable.

In some additional, alternative, or selectively cumulative embodiments, the retractable cutting blade is distinct from the hook, wherein the retractable cutting blade is directly or indirectly mounted to the hook in a manner that prevents the retractable blade from entering the vine collection area.

In some additional, alternative, or selectively cumulative embodiments, force applied by a person directly or indirectly to the jaw actuation mechanism, in a direction away from the hook, is operable to enhance force applied by the retractable cutting blade against an object to be cut.

In some additional, alternative, or selectively cumulative embodiments, the cutting blade comprises saw teeth.

Selectively cumulative embodiments are embodiments that include any combination of multiple embodiments that are not mutually exclusive.

Additional aspects and advantages will be apparent from the following detailed description of exemplary embodiments, which proceeds with reference to the accompanying drawings.

BRIEF DESCRIPTION OF THE DRAWINGS

FIG. 14C is a front and left side of the hook-end portion, showing the movable jaw in a full closed position with the cutting blade in an extended position.

DETAILED DESCRIPTION OF EXEMPLARY EMBODIMENTS

Figure 1A:
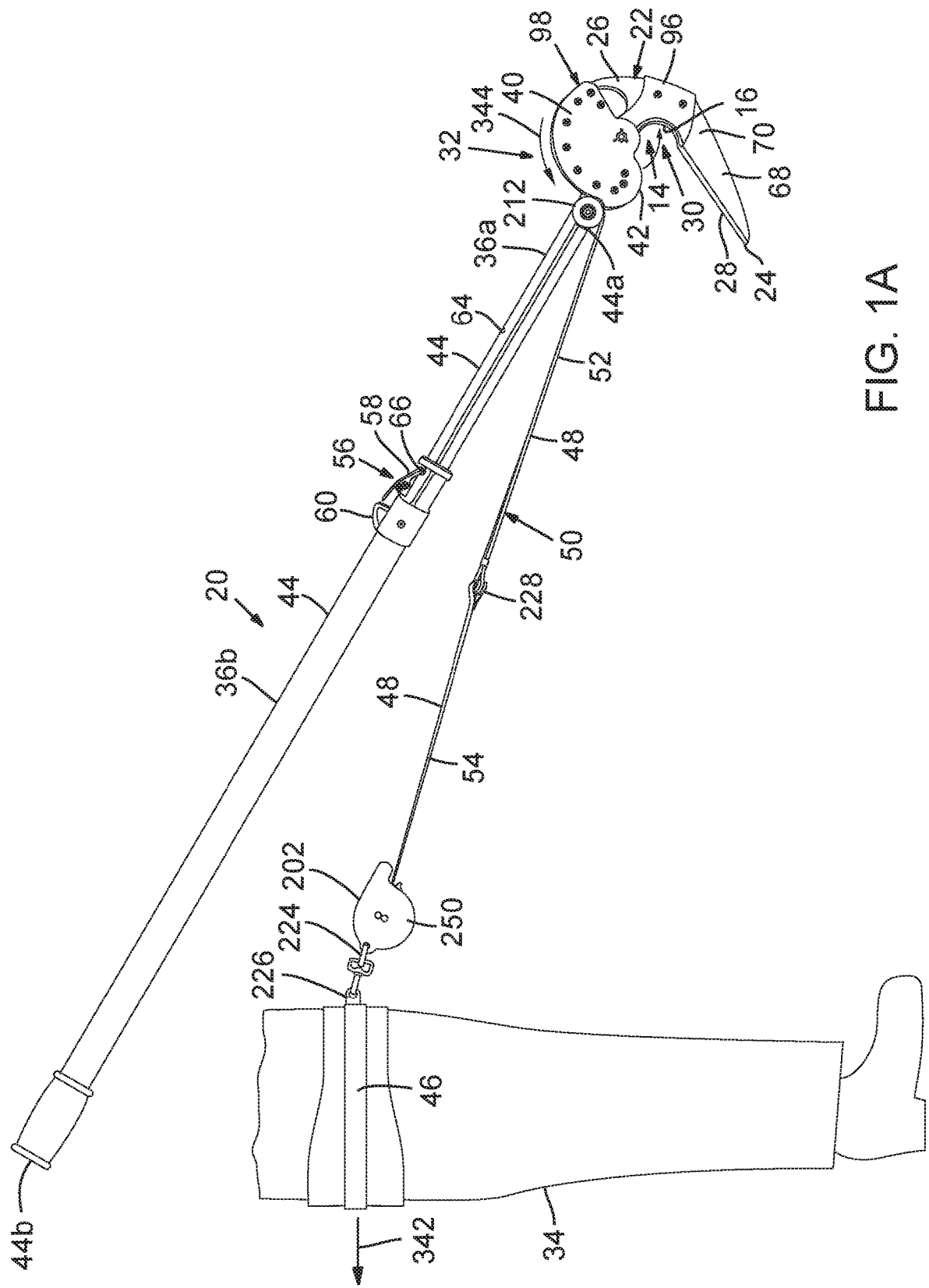
FIG. 1A is a right side elevation view of an embodiment of a vine removal tool.

Example embodiments are described below with reference to the accompanying drawings. Unless otherwise expressly stated, in the drawings the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element", or vice versa. The section headings used herein are for organizational purposes only and are not to be construed as limiting the subject matter described.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "below," "beneath," "lower," "above," and "upper," and the like, may be used herein for ease of description to describe one element or feature's relationship to another element or feature, as illustrated in the figures. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Figure 1B:
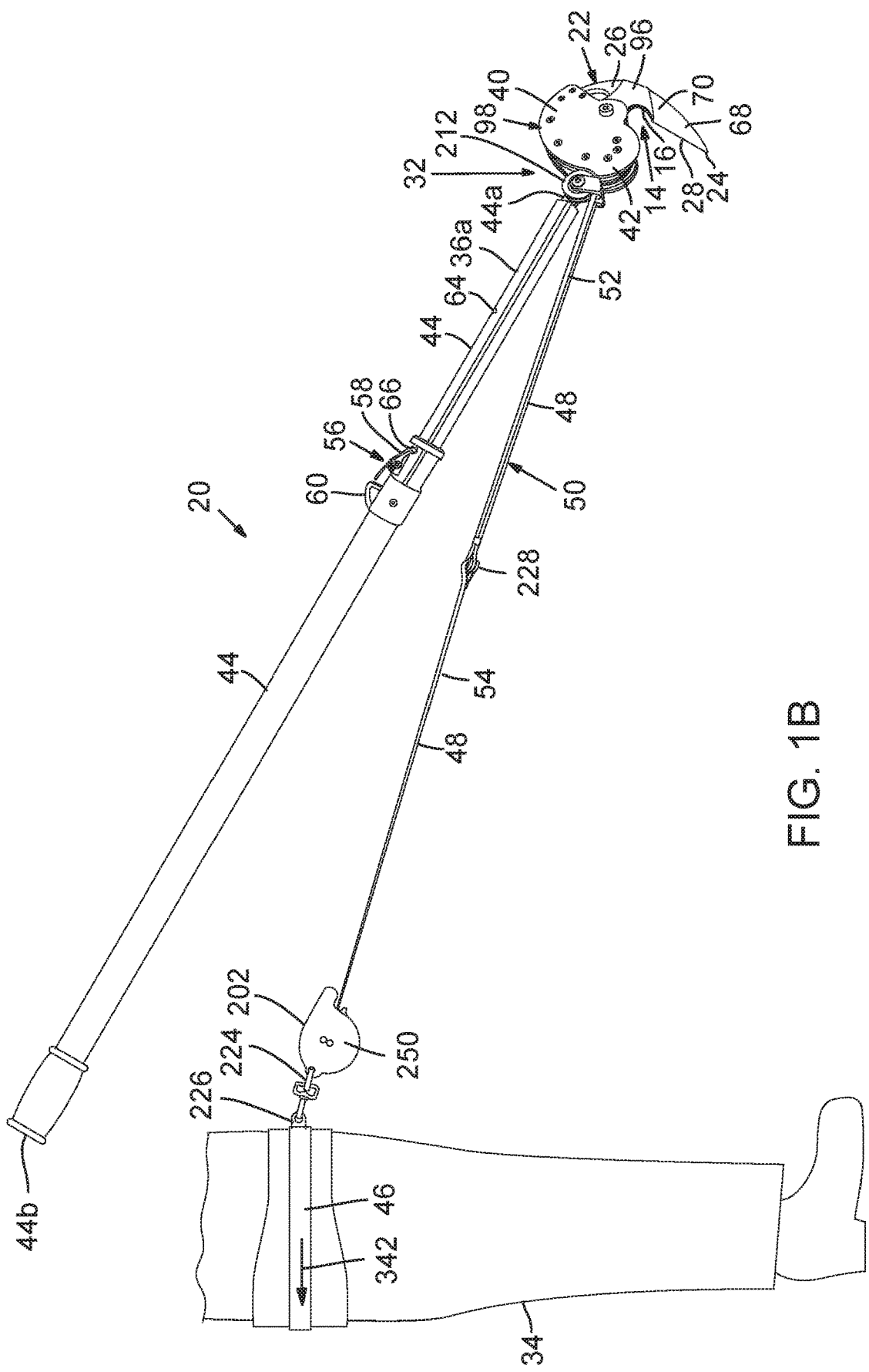
FIG. 1B is a right rear perspective view of an embodiment of the vine removal tool.
Figure 1C:
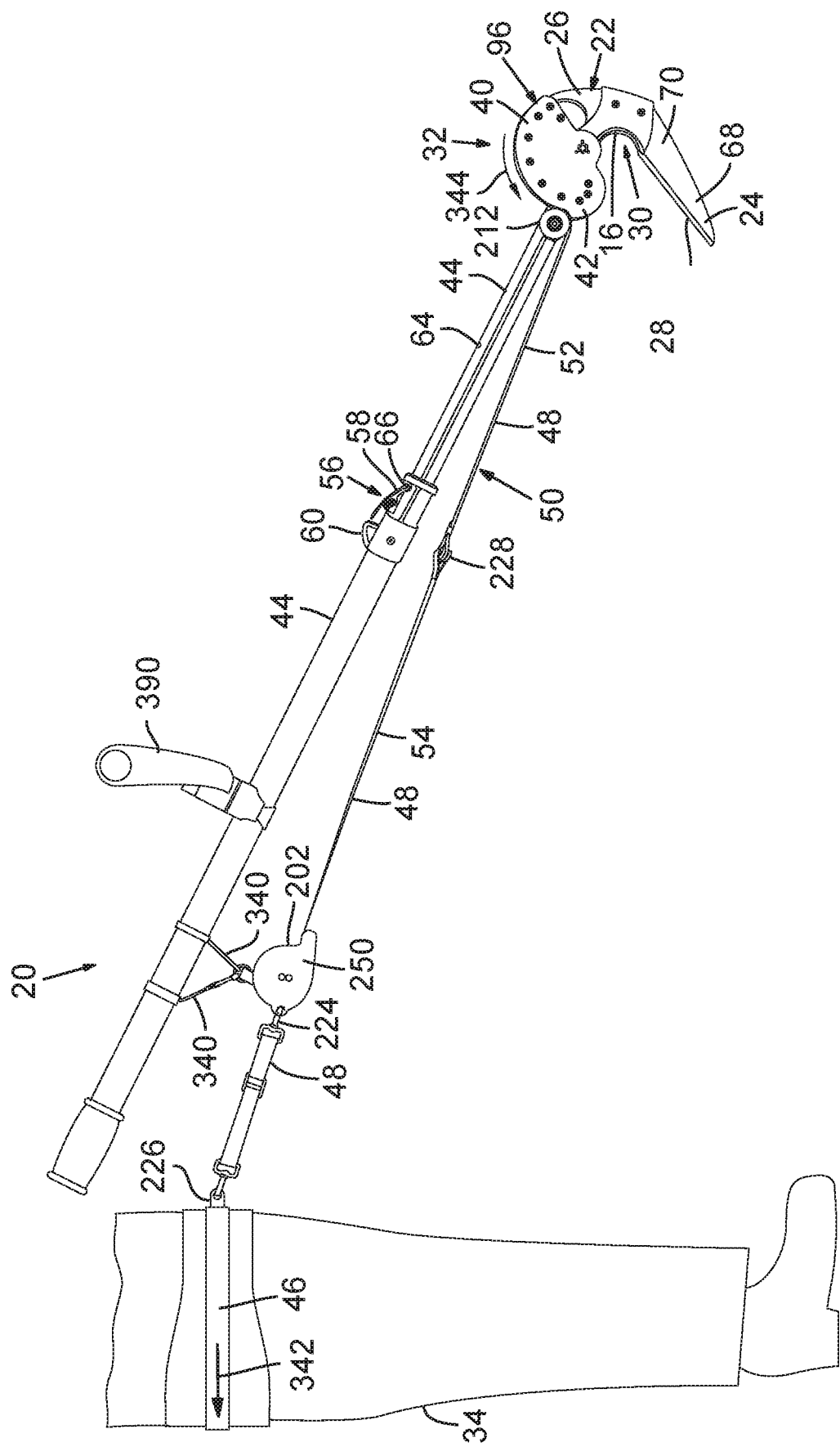
FIG. 1C is a left side elevation view of an embodiment of the vine removal tool, showing some optional features.
Figure 2:
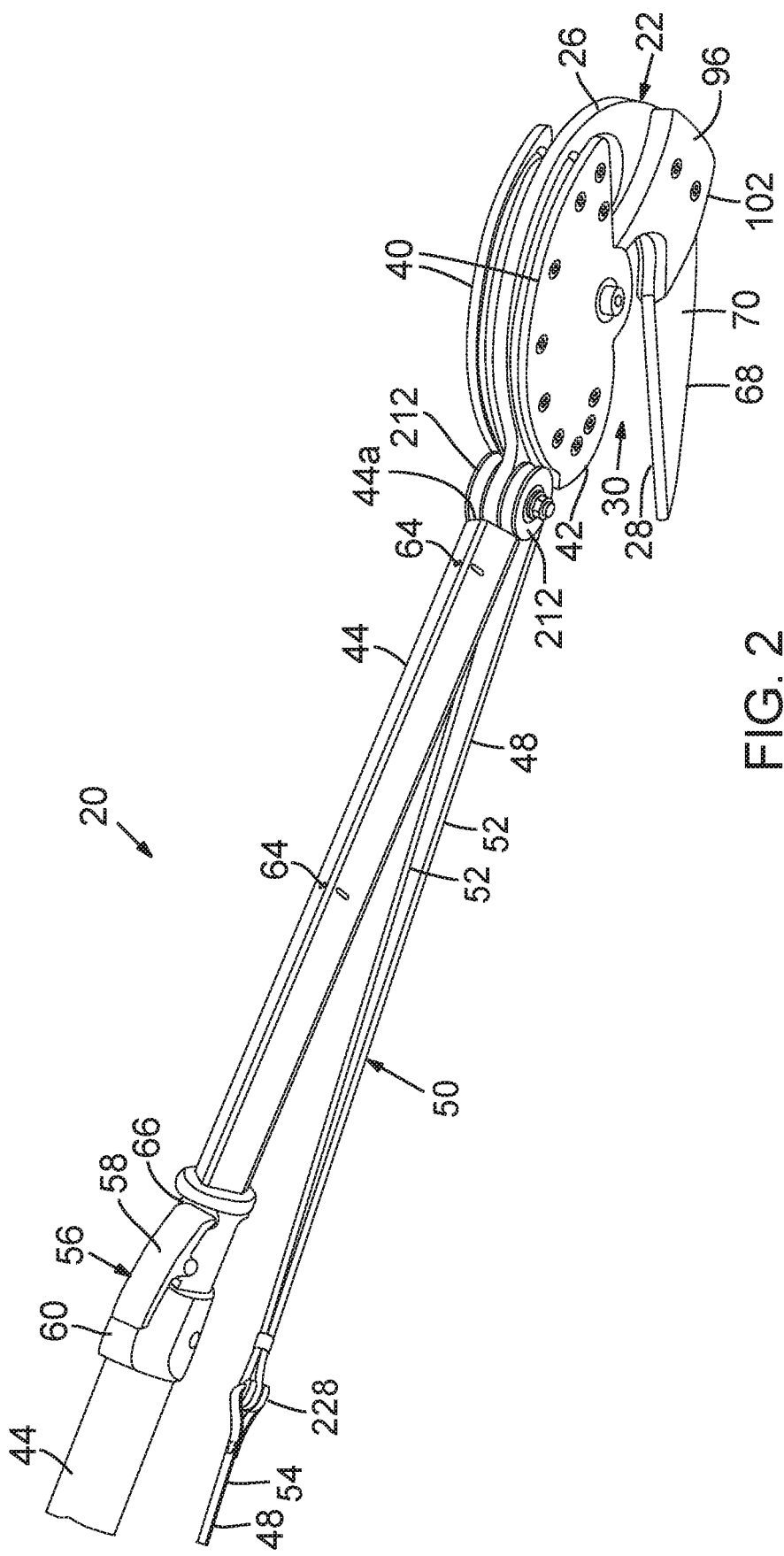
FIG. 2 is a top and right side perspective view of a hook-end half of the vine removal tool.
Figure 3:
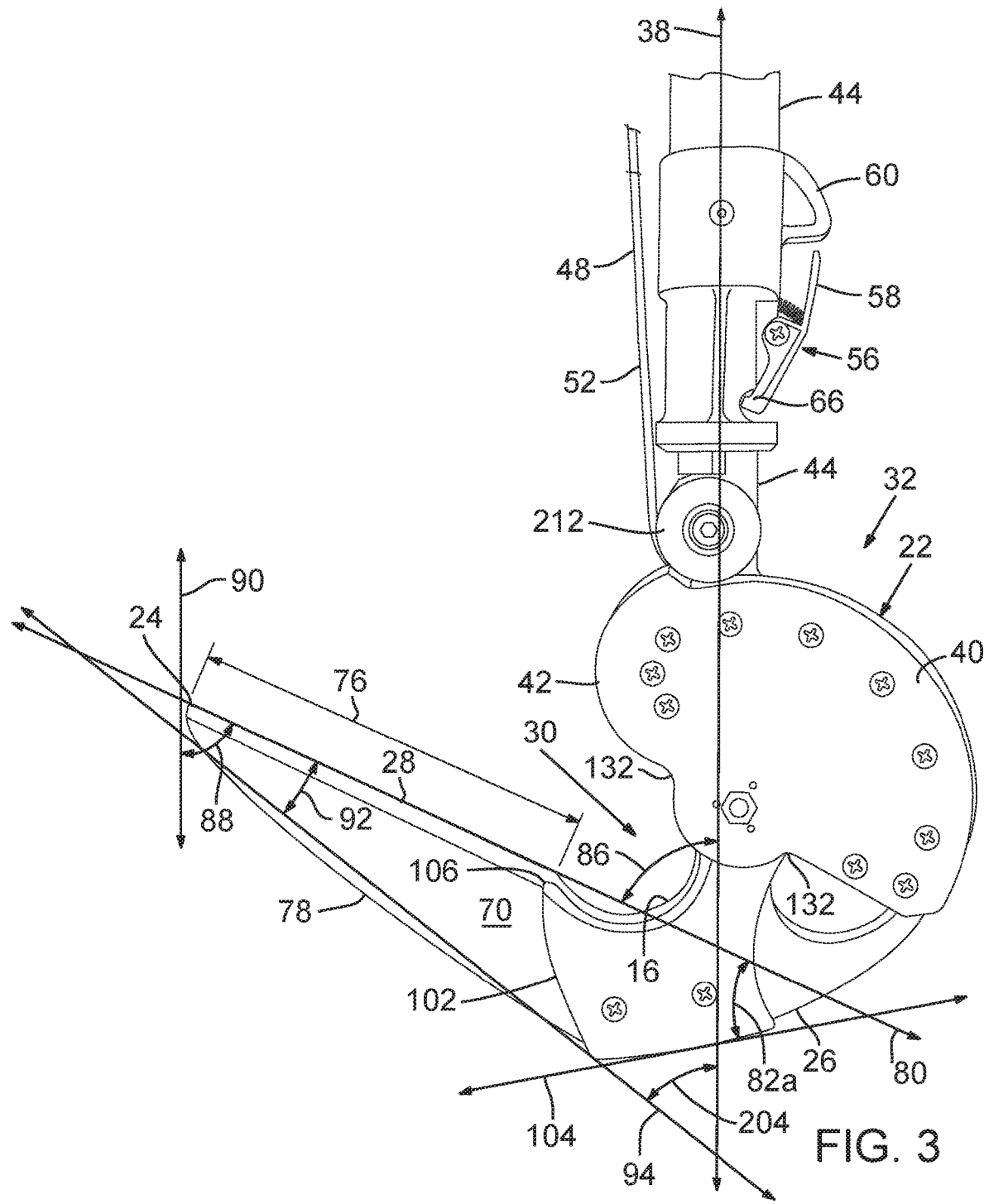
FIG. 3 is a right side elevation view of a hook-end portion of the vine removal tool, showing angular relationships between various elements.
Figure 4:
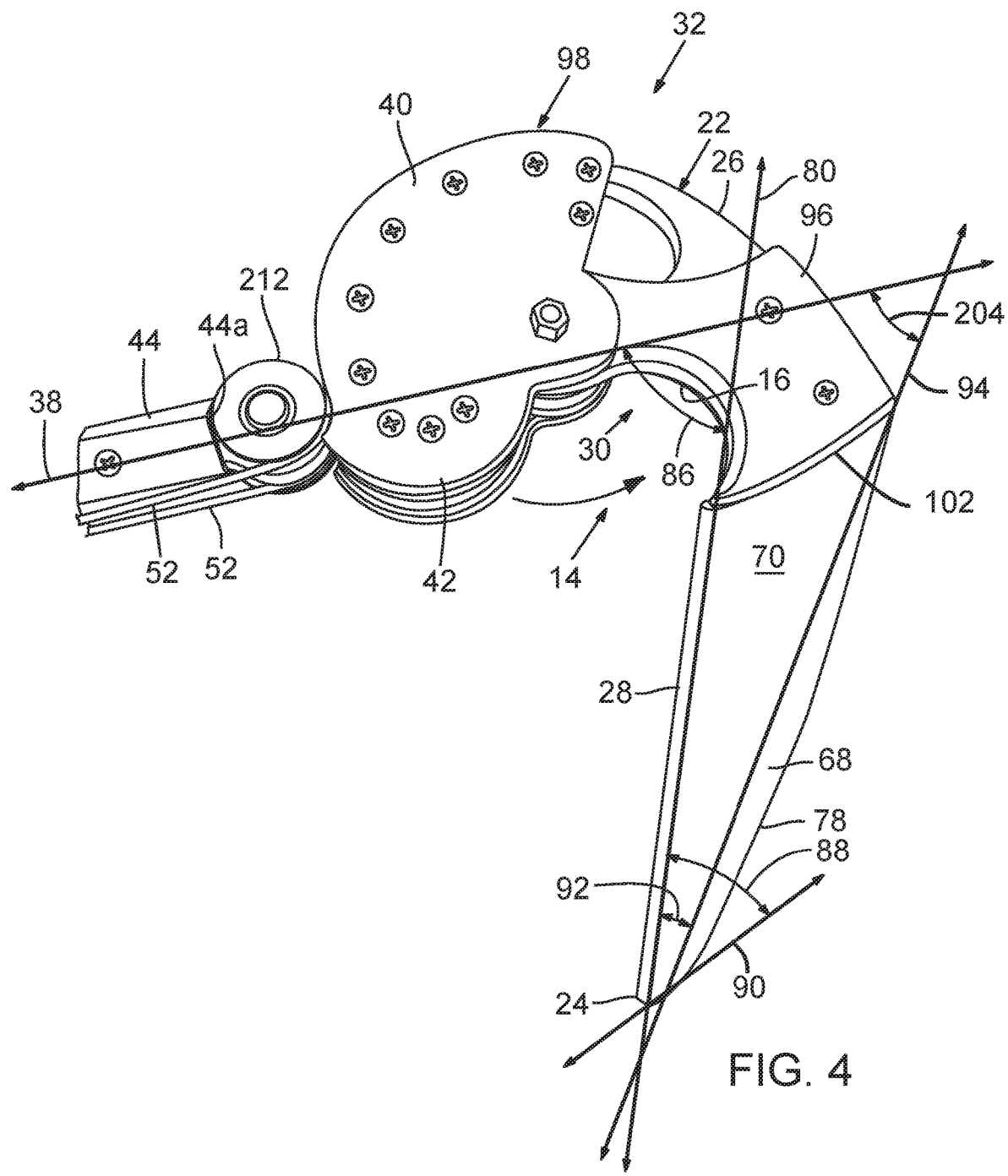
FIG. 4 is a bottom right perspective view of the hook-end portion, showing a movable jaw in the fully open position.
Figure 5:
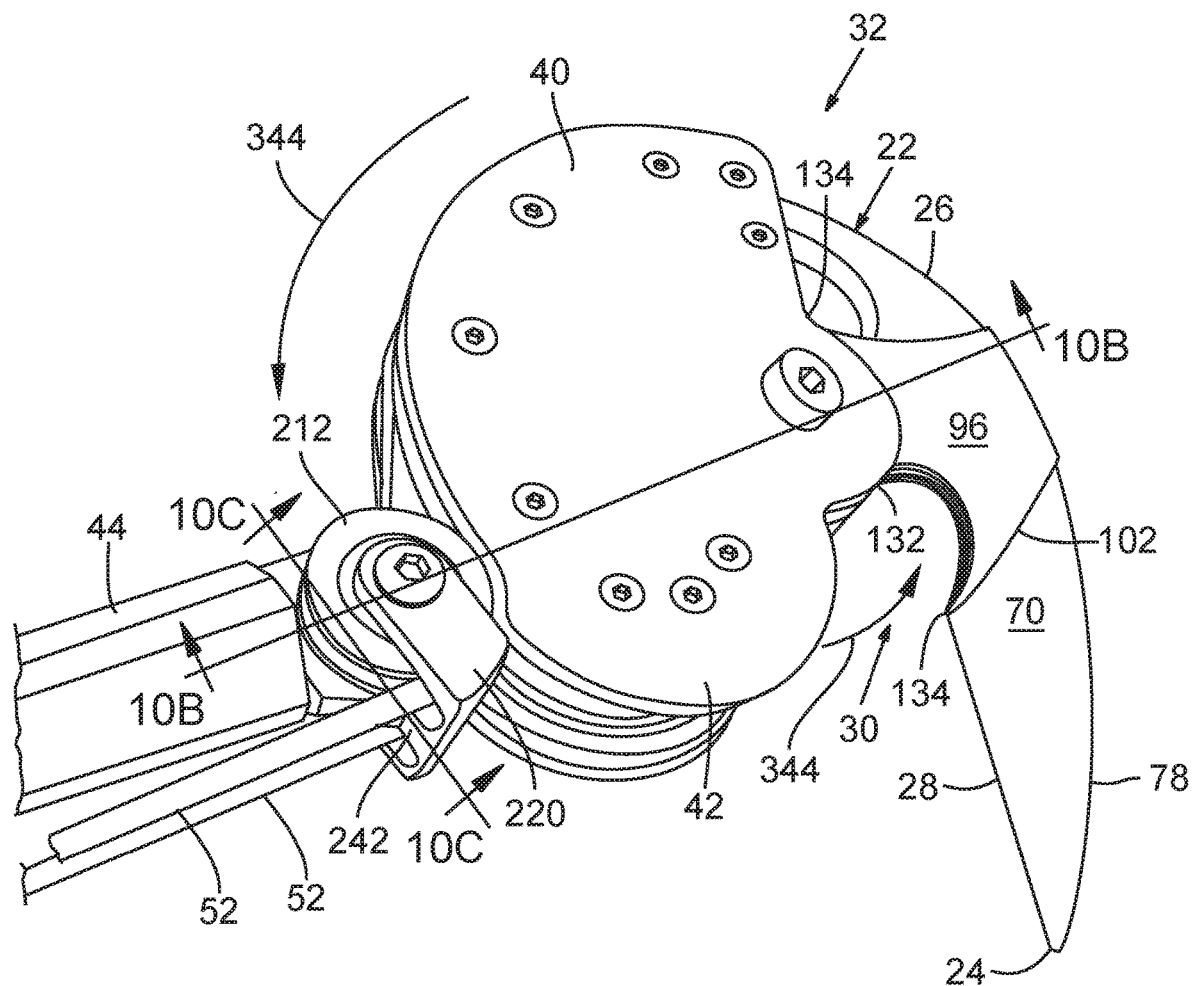
FIG. 5 is a right rear perspective view of the hook-end portion, showing the movable jaw in the fully open position.
Figure 6:
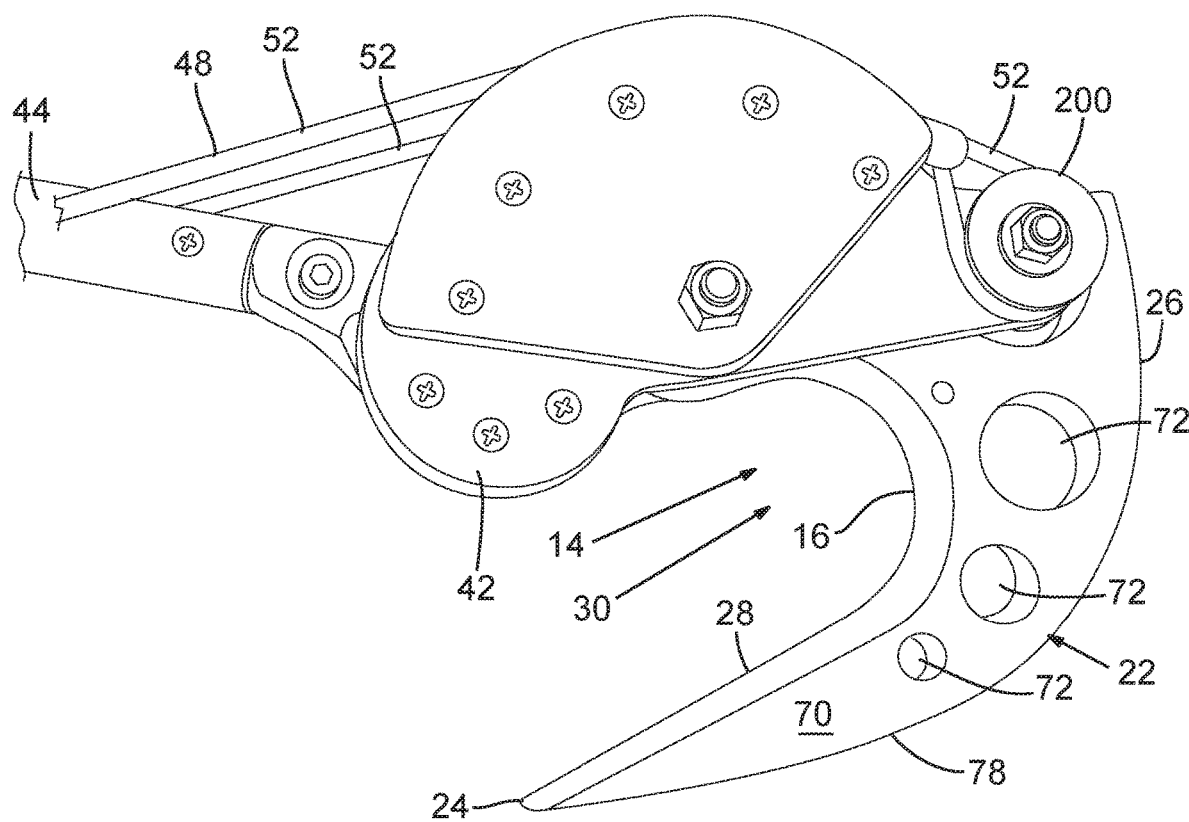
FIG. 6 is another bottom right perspective view of the hook end portion in a different orientation, showing the movable jaw in the fully open position.
Figure 7:
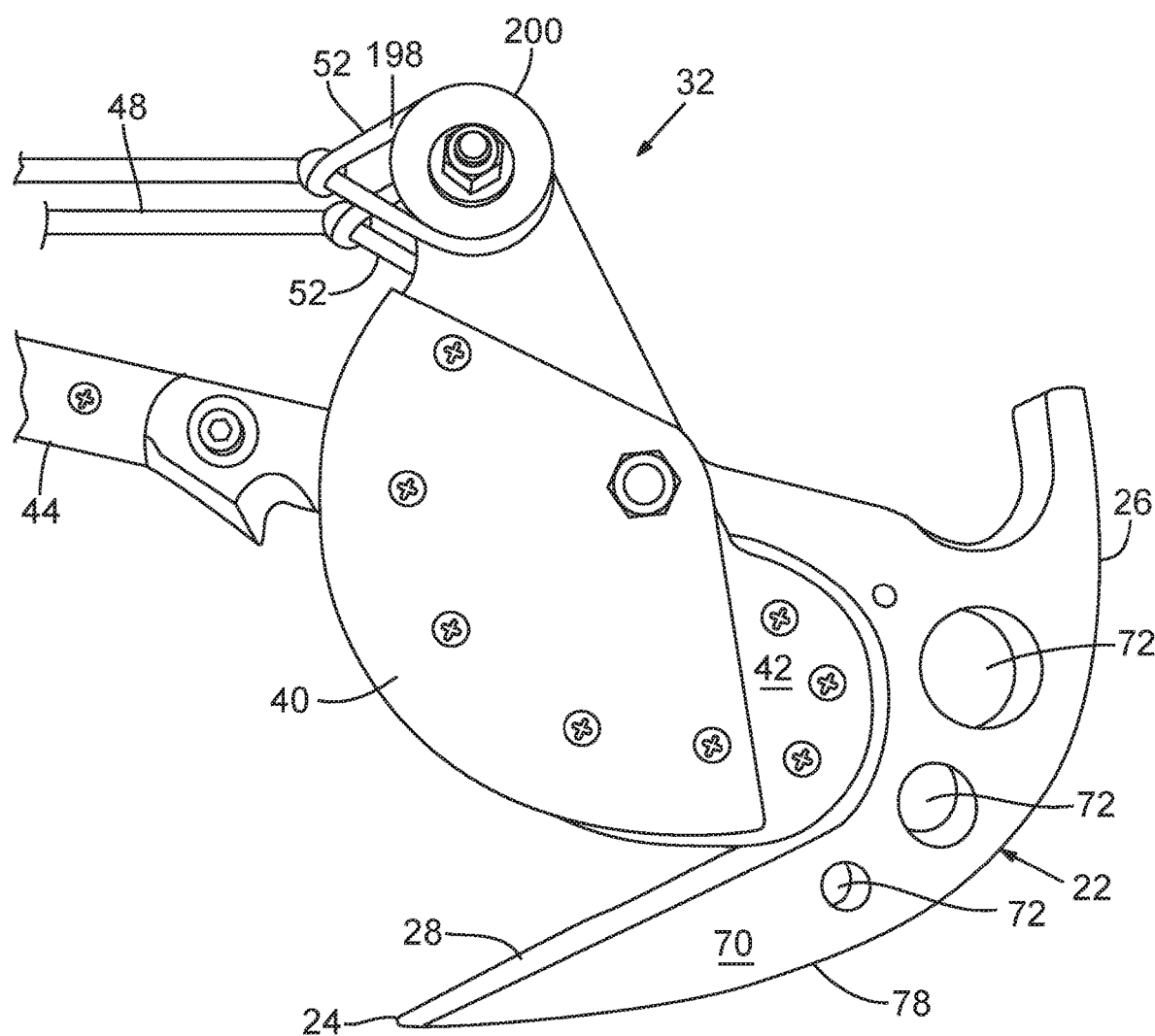
FIG. 7 is a left side perspective view of the hook-end portion, showing the movable jaw in a closed position.

FIG. 1A is a right side elevation view of an embodiment of a vine removal tool 20, such as a Vine Ripper, Ivy Ripper™, Vine Gripper, or Ivy Gripper, which can be used to grab and pull vines for easier removal. FIG. 1B is a right rear perspective view of the vine removal tool 20. FIG. 1C is a side elevation view of an alternative embodiment of the vine removal tool 20. FIG. 2 is a top and right side perspective view of a hook-end half of the vine removal tool 20. FIG. 3 is a right side elevation view of a hook-end portion 32 including a hook head assembly 98 of the vine removal tool 20, showing angular relationships between various elements. FIG. 4 is a bottom-right perspective view of the hook-end portion 32 including a hook head assembly 98, showing a jaw projection 42 of a movable jaw 40 (or jaw assembly 40) in a fully open position. FIG. 5 is a right-rear perspective view of the hook-end portion 32 including a hook head assembly 98, showing the jaw projection 42 of the movable jaw 40 in the fully open position. FIG. 6 is bottom-right perspective view of an alternative embodiment of the hook-end portion 32 in a different orientation, showing the jaw projection 42 of the movable jaw 40 in the fully open position. FIG. 7 is a left side perspective view of an alternative embodiment of the hook-end portion 32 including a hook head assembly 98, showing the jaw projection 42 of the movable jaw 40 in a fully closed position.

With reference to FIGS. 1-7, the vine removal tool 20 may include a hook 22 having a distal hook end 24 (or tip), a proximal hook base 16, and a vine slide surface 28 positioned generally between the distal hook end 24 and the proximal hook base 16. The proximal hook base 16 may be located on an internal side of the hook 22 that may oppose a hook base spine 26 that is on an external side of the hook 22. The proximal hook base may be located at or near the lowest internal point of a hook projection 68 (or prong 68) (as discussed later).

The proximal hook base 16 may be located on the internal side of the hook 22 at, or in proximity to, a shaft major axis 38. For example, the proximal hook base 16 may be located at a distance of less than or equal to 2", 1.5", 1", 0.5", 0.25 from the shaft major axis 38. The proximal hook base 16 may be located at a distance of less than or equal to 7.5", 6", or 5" from a shaft hook end 44a of a shaft 44 (as later described).

A vine collection area 14 may be located at, near, or toward the proximal hook base 16 on the internal side of the hook 22. The vine collection area 14 may include a pocket 30 may formed at or near the proximal hook base 16 and in proximity to the vine slide surface 28.

The vine collection area 14 may be presented herein by way of example to a pocket 30, which may constitute an embodiment of an entire vine collection area or only a portion of the vine collection area 14. Any of the disclosure herein with respect to the pocket 30 may be applied to the vine collection area 14 irrespective of whether the vine collection area 30 includes a pocket 30 unless such disclosure is mutually exclusive to a pocket 30.

A movable jaw 40 having a jaw projection 42 may be configured to at least partly fit within pocket dimensions of the pocket 30. A jaw actuation mechanism 50, connected directly or indirectly to the jaw may be operable to cause the jaw projection 42 to enter, and/or extend beside the pocket 30. The jaw actuation mechanism 50 may utilize any conventional assembly that is operable to move the jaw projection 42 into the pocket 30 to achieve a fully closed position. For example, jaw movement can be effected by a motor controlled by a switch on the shaft 44.

In another example, the jaw actuation mechanism 50 may include an actuation line 48 directly or indirectly operatively connected to the jaw projection 42 and to a belt 46 operable for fastening about a person 34 (or user 34 or operator 34), such as fastening around the waist or torso of the person 34.

The line 48 may be is operable to connect, at an effective distance that is variable, the movable jaw 40 to the belt 46, wherein the line 48 has a line length from the movable jaw 40 to the belt, and wherein the line length is re-adjustable to provide the effective distance. The line 48 may include a primary actuation line 52 and an adjustable (or nonadjustable) tether 54. The line 48 may also be directly or indirectly connected to a shaft 44 (or handle 44 or pole 44) that is directly or indirectly connected to the hook 22. The vine slide surface 28 of the hook 22 at the end of the shaft 44 is configured to gather vines into the pocket 30 at the root of the hook 22, and the jaw projection 42 of the movable jaw 40 is operable to clamp tightly against the vines for pulling them out.

The shaft 44 may include one or more shaft segments 36a and 36b (generically shaft segments 36) that may cooperate to provide a fixed length or an adjustable length along a shaft major axis 38 (FIGS. 3 and 4) for the shaft 44. An adjustable version of the shaft 44 may form an extension pole or telescoping pole with one or more of the shaft segments 36 configured to slide within (and out from) other of the shaft segments 36. The length of the shaft 44 may be adjustable so that the shaft 44 can be extended far enough forward so that the direct pull angle, from the attach point of the tether 54 on the belt all the way to the hook rotation point (in the ground) is a shallow enough angle so that the hook 22 can be pulled through the soil. Moreover, users 34 may have considerably different heights.

In some embodiments, the shaft segment 36a may have a first shaft length and the shaft segment 36b may have a second shaft length, and the shaft 44 may be operable to have an operating shaft length that is greater than or equal to either of the first shaft length or the second shaft length. Accordingly, the shaft 44 may support shaft length-adjusting mechanism 56 that is operable to facilitate reversibly adjusting and maintaining the operating shaft length to be greater than either of the first shaft length or the second shaft length. Moreover, the shaft 44 may support a shaft length-adjusting mechanism 56, such as a button or a pole clip 58 (perhaps protected by a clip guard 60), that permits the relative positions of the shaft segments 36 to be adjusted to any obtainable length and/or to pre-set fixed lengths of any regular or irregular spacing. The shaft length-adjusting mechanism 56 may constitute a quick-release mechanism.

In one example, the fixed lengths are determined by notches 64 spaced apart on the inner shaft segment 36a that can be engaged into a locking position by a clip protrusion 66. In another example, the shaft length-adjusting mechanism 56 employs a quick-release detent pin and multiple holes or slots. The notches or holes may be spaced apart by a distance of about 3 to 12 inches, 5 to 10 inches, or 5 to 7 inches. For example, a 6" spacing may be employed. One will appreciate that shaft length-adjusting mechanism 56 can employ any commercially available or conventional shaft length-adjusting means, such as a spring tensioned about a hinge.

The shaft segments 36 can be of any nested lengths. In some embodiments, the shaft segments 36 are shorter than or equal to 5' long, or shorter than or equal to 4' long, with the shaft having a maximum length of about 10' or about 8'. In embodiments, the shaft may have a shaft length range of within about 3' to 9', 3' to 12', 4' to 8.5', or 5' to 10'.

The shaft segments 44 may be made of the same or different materials, such as a metal, a polymer, a composite, fiberglass, polycarbonate, steel, or aluminum. In FIGS. 1-2, the shaft 44 is shown with an inner shaft segment 36a partly extended from an outer shaft segment 36b. In FIG. 3, the shaft 44 is shown in a fully closed or collapsed condition with the shaft length-adjusting mechanism 56 positioned close to the hook 22.

The hook 22 may comprise a single piece or multiple pieces that are welded or connected together in a conventional manner. In some examples, the hook 22 can be formed as single piece, such as molded or casted to a desired size and shape or cut from a larger piece of material. The hook 22 may include one or more non-metallic materials, one or more metallic materials, or both one or more metallic and nonmetallic materials. Moreover, the hook projection 68 may be made of materials suitable for, and may be configured for, subterranean travel. The hook 22 can act like a plow to lift the vine roots above the ground surface 84 where the roots can be pulled out after being grabbed by the jaw projection 42 or cut later by a sharp blade, such by a separate hand tool or by an attached auxiliary blade 350 (or saw blade) as later described.

In one example, the hook 22 is mostly formed from a lightweight aluminum plate having a thickness 18 of 0.25" or greater, but the distal hook end 24 may be formed from stainless steel or other harder material that is able to take more abuse than the aluminum. The distal hook end 24 may be a user replaceable part. In general, the hook 22 may have a hook projection 68 with a thickness 18 of greater than or equal to 0.15", 0.20", 0.25", 0.30", 0.35", 0.40", 0.45", or 0.50" between its hook projection surfaces 70. The hook projection 68 may be thin so that pulling it through the ground has less resistance. However, the hook projection 68 may be sufficiently wide so as not to bend or break. One will appreciate that the thickness 18 of the hook 22 may taper from its hook spine 78 to its vine slide surface 28. Such taper may be utilized for the hook projection 68 and not for the rest of the hook 22.

In some embodiments, the hook projection 68 of the hook 22 may include one or more weight-reducing holes 72 (FIGS. 6 and 7) to facilitate a lighter weight for the vine removal device 20 and reduce the amount and cost of the materials used for its construction. The hook 22 may be attached to the shaft 44 by any conventional means. A tang 74 or shank (FIG. 10) of the hook 22 may be (but need not be) aligned with the proximal hook base 16 (and/or the shaft major axis 38) and may be directly or indirectly connected to the shaft 44, closer to a shaft hook end 44a than to a shaft operator end 44b. The tang 74 of the hook 22 may extend a few inches into an aluminum extrusion portion of the shaft 44. The tang 74 may be connected to the shaft 44 by screws and/or epoxy, preferably both. In one embodiment, the hook 22 includes a 3-inch tang 74 that is inserted, and securely fastened into the shaft segment 36a of the shaft 44. One will appreciate that the tang 74 can be of any suitable length.

The vine slide surface 28 may be positioned opposite at least a portion of hook spine 78 that runs along the back of the hook 22. As noted previously, the hook 22 at the end of the shaft 44 has a vine slide surface 28 that is configured to gather vines into the vine collection area 14 (which may include a pocket 30) at the root of the hook 22. The vine slide surface 28 is long enough to reach underground to pull out roots of the vines. The vine slide surface 28 of the hook projection 68 has a vine slide length 76 (along a vine slide axis 80) that may be shorter than or equal to 14", shorter than or equal to 12", shorter than or equal to 10", or shorter than or equal to 8". Additionally, the vine slide length 76 may be longer than or equal to 4", longer than or equal to 6", or longer than or equal to 8". One will appreciate that the vine slide length 76 may, however, be shorter than 4" or longer than 14".

The vine slide length 76 may be longer than or equal to any dimension of the jaw projection 42 as later described in greater detail. Additionally, the vine slide length 76 may be longer than or equal to two times any dimension of the jaw projection 42. The jaw projection 42 may have a major jaw projection dimension, and the vine slide length may be longer than the major jaw projection dimension of the jaw projection or longer than two times the major jaw projection dimension of the jaw projection. Moreover, the vine slide length 76 may be longer than or equal to a jaw projection length 346 (FIG. 11) (or greater than or equal to 1.5 times the jaw projection length 346 of the jaw projection 42. The vine slide length 76 may be longer than or equal to a pocket length 120 as later described in greater detail. Additionally, the vine slide length 76 may be longer than or equal to two times the pocket length 120 or longer than or equal to three times the pocket length 120.

The vine slide surface 28 may have a slide surface width that is about the same width as that of the hook spine 78, or the slide surface width may be wider or narrower than the width of the hook spine 78. The vine slide surface 28 may be flat, rounded, flat with rounded edges, or have some other cross-sectional shape so as not to cut the vine roots underground, but to lift them above the ground surface 84. The vine slide surface 28 may be smooth to promote easy sliding of vines; however, the vine slide surface 28 could have some texture.

Figure 22:
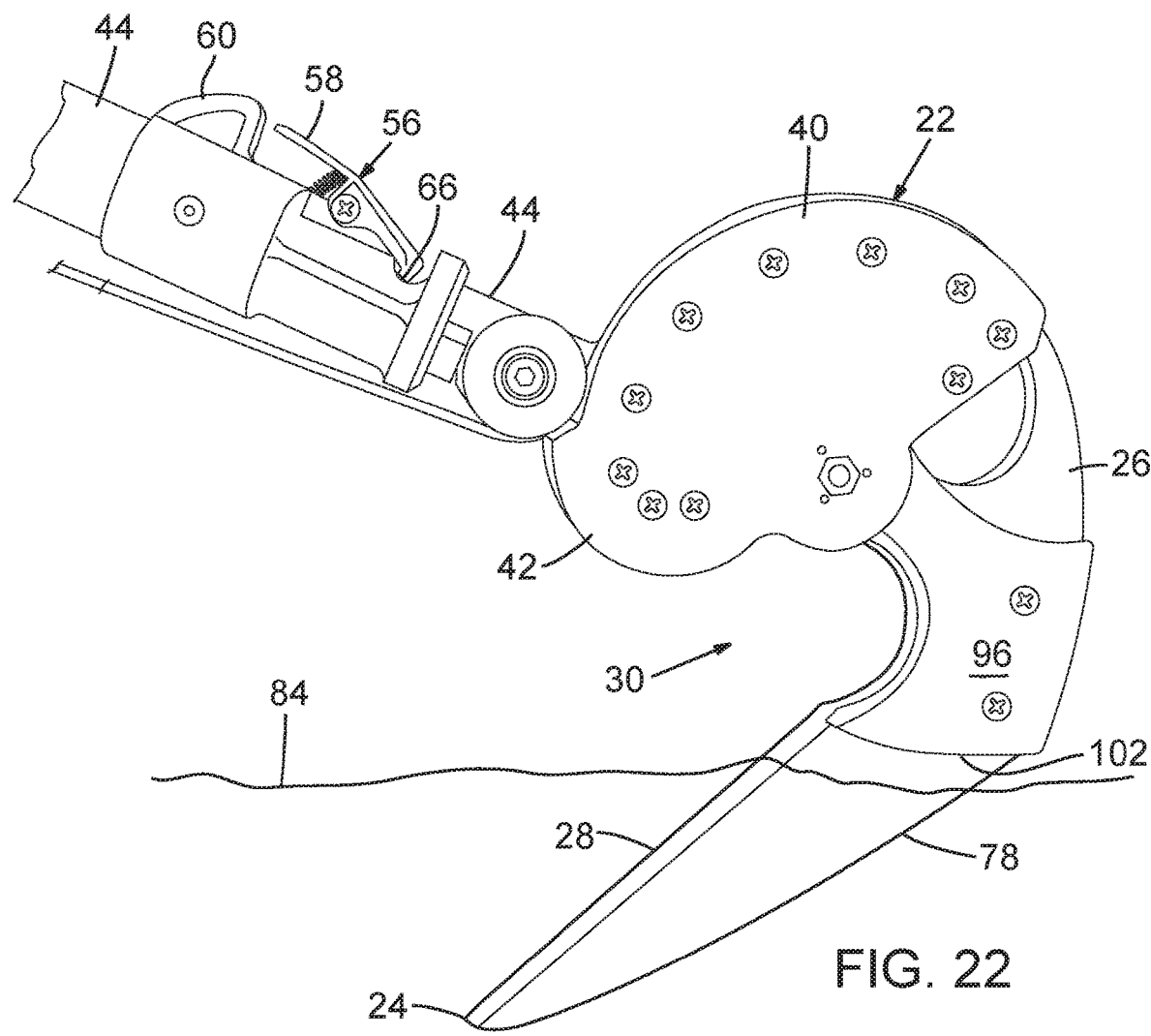
FIG. 22 is a right side elevation view of an embodiment of the vine removal tool, showing the vine removal tool as it would be used with a portion of its hook projection positioned beneath the surface of the ground.

A desirable orientation of the hook 22, when the shaft 44 is extended to a desirable length for a person 34 operating the vine removal tool 20, may put the vine slide surface 28 at the distal hook end 24 at an operating angle 82 of about 45 degrees with reference to a flat ground surface 84 (See FIG. 22) (or an operating angle 82 that when the tool 20 is pulled the hook 22 can be driven into the ground, but not so steep an operating angle that when the shaft 44 is retracted that would prevent being able to hook under vines that are on the surface 84 at the feet of the operator 34). In some embodiments, in order to allow the operator 34 to hook a vine at his/her feet, the distal hook end 24 may have less sharp of an angle (tip angle 88, as later described), and a spine base 26 of the hook 22 (from the pocket 30 to the hook spine 78) can be less wide. One will appreciate that the distal hook end 24 can be rounded or pointed and that its spine portion can be curved or straight.

For convenience, the operating angle 82 may be defined as the acute angle formed between the vine slide axis 80 and the flat ground surface 84. The hook 22 can also be shaped so the when the shaft 44 is partly or fully retracted, a vine at (or slightly below or above) the ground surface 84 can easily be snagged by the hook 22. In some embodiments, an optimum operating angle 82 may be from 25 degrees to 65 degrees and may depend on how far away the hook 22 is from the user 34.

For convenience, a hook angle 86 may be defined as the acute angle between the shaft major axis 38 and the vine slide axis 80. The hook angle 86 may be shorter than or equal to 90 degrees, 85 degrees, 80 degrees, 75 degrees, 70 degrees, or 60 degrees. Additionally, the hook angle 86 may be greater than or equal to 45 degrees, 50 degrees, 55 degrees, 60 degrees, or 65 degrees. One will appreciate that the hook angle 86 may, however, be greater than 90 degrees or less than 45 degrees. One will also appreciate that the tang 74 of the hook 22 can be oriented at an angle with respect to the shaft major axis 38 to alter the angle of the vine slide axis 80 with respect to the shaft major axis 38.

The hook angle 86 and/or the operating angle 82 can be configured so that the hook 22 can extend 2-12", 3-8" or 4-6" below the ground surface 84. The hook 22 can be pulled through the soil to pull vine shoots and roots above ground so that they can be grabbed by the jaw projection 42 and pulled out. The hook 22 and/or its hook projection 68 may be configured to reach a minimum of 3.5", 4", 4.5", or 5" underground. However, in some embodiments, the hook 22, the hook projection 68, and/or the vine slide surface 28 may have an adjustable angle in relation to the ground surface. Adjustment capability for shallower angles can be useful when the vines are very thick. For example, the hook angle 86 or the operating angle 82 can be adjustable so that in particularly heavy root systems, the hook 22 may be provided with a lower profile so it can take a shallower bite and move through the vines more easily (to reduce pulling effort); yet in softer soil, the hook can be adjusted to extend down deeper if desired. In some embodiments, the hook 22 and/or hook projection 68 may be configured to employ a drop point design to allow for a shorter hook projection 68 that extends to the equivalent depth. Moreover, the hook projection 68 may have a rounded leading edge for less resistance when pulling through to soil.

As mentioned previously, the tip angle 88 or upward bend of the distal hook end 24 may be different than the majority of the hook angle 86 and may be configured to facilitate hooking vines that may be close to the foot of an operator 34. For convenience, the tip angle 88 may be defined as an angle between the vine slide axis 80 and an average spine tip axis 90 that runs along an average tangent to the curve of the hook spine 78 at the base of the distal hook end 24. The tip angle 88 may be shorter than or equal to 90 degrees, 85 degrees, 80 degrees, 75 degrees, 70 degrees, or 60 degrees. Additionally, the tip angle 88 may be greater than or equal to 20 degrees, 30 degrees, 40 degrees, 45 degrees, 50 degrees, 55 degrees, 60 degrees, or 65 degrees. One will appreciate that the tip angle 88 may, however, be greater than 90 degrees or less than 45 degrees.

Similarly, as mentioned previously, the width and taper of the hook projection 68 from the pocket 30 to the hook spine 78 may be configured to facilitate hooking vines that may be close to the foot of an operator 34. In this regard, a general hook projection angle 92 (or medial slide angle) may be configured to facilitate such operation. The portion of the hook spine 78 opposite the vine slide surface may be curved, so an average spine axis 94 may be determined. For convenience, the hook projection angle 92 may be defined as the acute angle between the vine slide axis 80 and the average spine axis 94, and a medial spine angle 204 may be defined as the acute angle between the shaft major axis 38 and the average spine axis 94. The hook projection angle 92 may be shorter than or equal to 45 degrees, 40 degrees, 35 degrees, 30 degrees, 25 degrees, or 20 degrees. Additionally, the hook projection angle 92 may be greater than or equal to 5 degrees, 10 degrees, 15 degrees, 20 degrees, or 25 degrees. One will appreciate that the hook projection angle 92 may, however, be greater than 45 degrees or less than 5 degrees. In some embodiments, the hook projection angle 92 may be less than the tip angle 88.

Some embodiments of the hook 22 employ a narrow hook projection angle 92 (resulting in a narrow blade width between the hook spine 78 and the vine slide surface 28), so as to require less force to pull the hook projection 68 through dense root systems. The larger the wedge width, the more effort it might take to pull through dense roots and lift them to the ground surface 84. The hook angle 86 can also be adjustable so that the sharp distal hook end 24 of the hook 22 can lie against the lower shaft segment 36a of the shaft 44 in embodiments that are collapsible such as shown and described in U.S. Provisional Application No. 62/772,616, which was filed on Nov. 28, 2018, the contents of which are herein incorporated by reference.

Larger hook angles 86 can however be advantageous for providing a greater acceptance angle for vines. Larger hook angles 86 can drive the hook projection 68 deeper when the vine removal device 20 is pulled toward the operator 34. However, the hook head assembly 98 can include a surface skimmer 96 that may be connected to one or both sides of the hook 22 to stick out from the hook projection 68 in proximity to its hook projection base 100 (FIG. 11) help prevent the hook 22 from going too deep below the ground surface 84, i.e., to limit depth penetration of the hook projection 68 into the ground. In particular, the surface skimmer 96 may have a skimmer edge that substantially extends from the vine collection area 14 or the vine slide surface 28 toward the hook spine 78. This skimmer edge may be operable to resist sinking below a soil surface 84 as the distal hook end 24 is below the soil surface 84 and pulled toward a person 34 operating the vine removal tool 20.

The surface skimmers 96 may be attached to the hook 22 by any conventional means. For example, fasteners 144*b* may be employed to engage the apertures 194 in the surface skimmers 96 to secure the surface skimmers 96 to threaded standoffs 176 (FIG. 10A) that may be held in place by grommets 178 (which may be plastic pieces) that may fit into some of the holes 70 in the hook 22. The threaded standoffs 176 may extend beyond the exterior planes of the hook surfaces to provide some additional support against shear forces on the surface skimmers 96. Each surface skimmer 96 may be configured to project greater than or equal to 0.25", 0.5", 1", 1.5", or 2" from the hook projection surface 70. The skimmer surface 96 may be wider than or equal to the width of the vine slide surface 28.

A bottom edge 102 of the surface skimmer 96 may lie partly along a virtual ground axis 104 that could be colinear with the flat ground surface 84 when the vine slide surface 28 is oriented at an operating angle 82. For convenience, the angle between virtual ground axis 104 and the vine slide axis 80 is labeled as operating angle 82*a*. The bottom edge 102 may be curved or have rounded ends at the corners, especially its front corner 106 to help keep the surface skimmer 96 above the ground surface 84.

The surface skimmer 96 may be configured to extend from the hook spine 78 to the pocket 30 to form a pocket extender 108 to provide a wider pocket surface area for gripping vines. A surface 110 of the pocket extender 108 may match the level of a surface 112 of the pocket 30 or it may be positioned to be higher or lower than the pocket surface 112. Moreover, the pocket extender surface 110 may match the surface texture or pattern of that of the pocket surface 112, as described later in detail.

Figure 8:
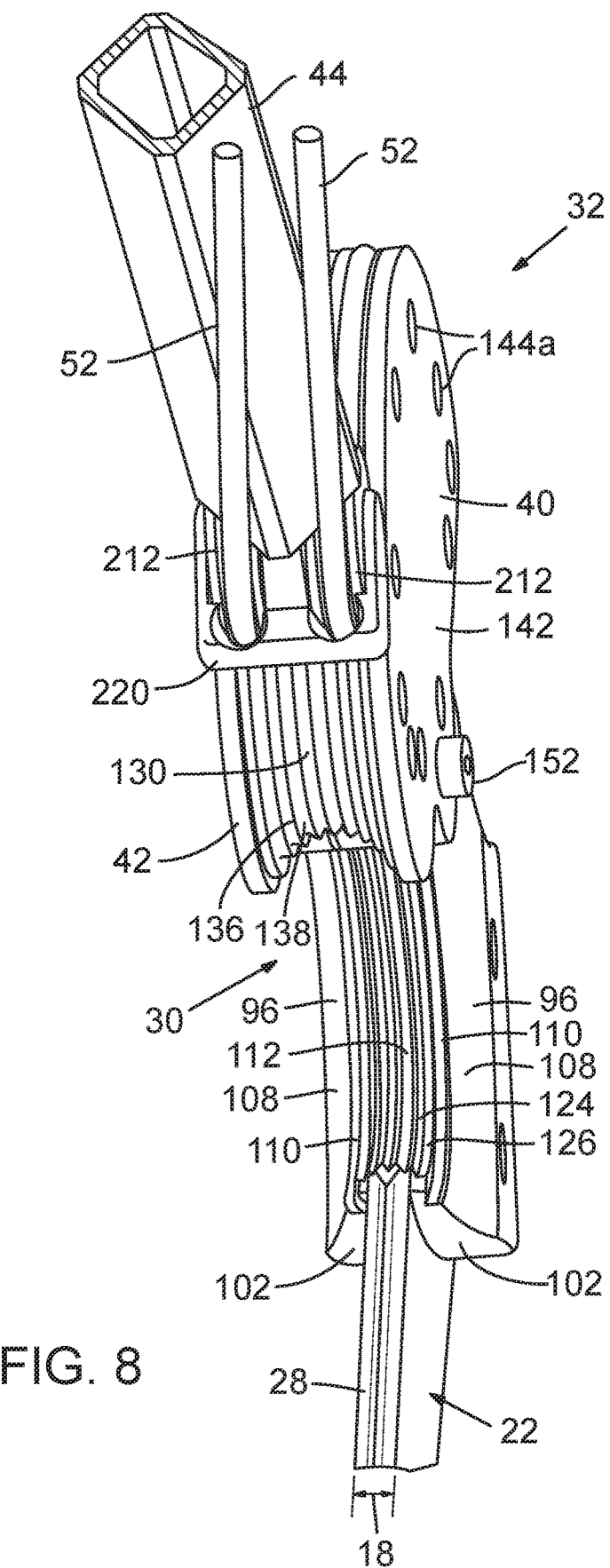
FIG. 8 is a right rear perspective view of the hook-end portion, showing a hook pocket with the movable jaw in the fully open position.
Figure 8A:
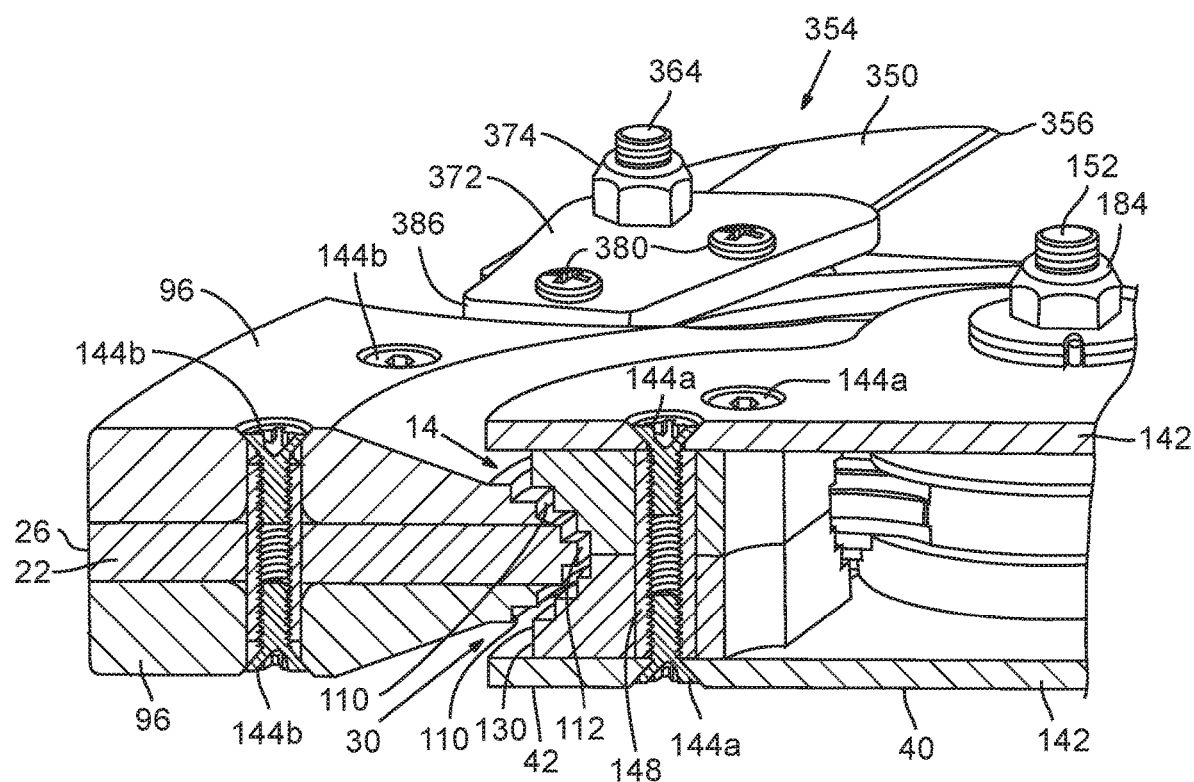
FIG. 8A is a cross-sectional view of a portion of a hook head assembly, depicting mated stepped surfaces for a pocket and a jaw projection.
Figure 9:
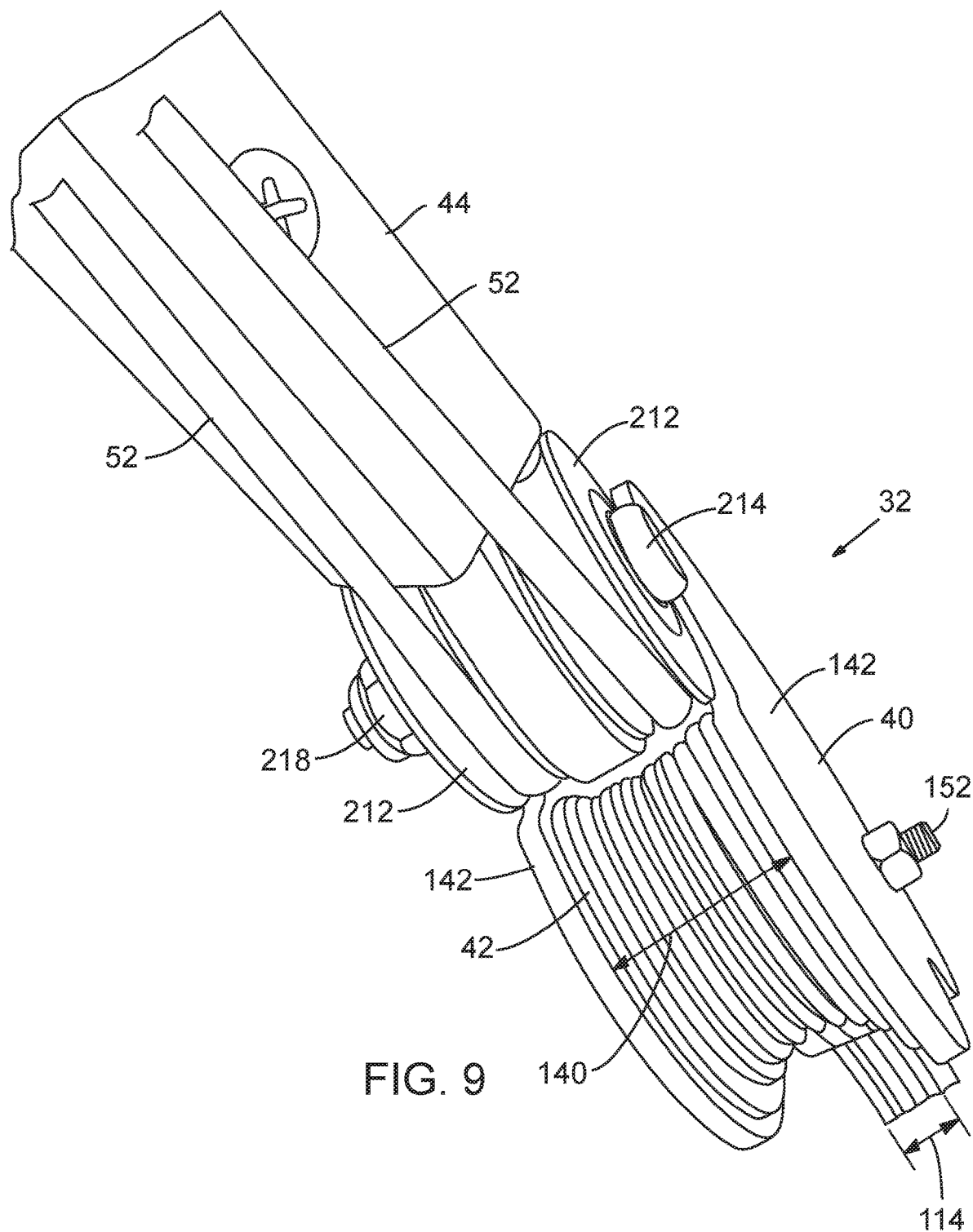
FIG. 9 is a right rear perspective view of the hook-end portion, showing optional grooves of a jaw projection of the movable jaw in the fully open position.
Figure 10A:
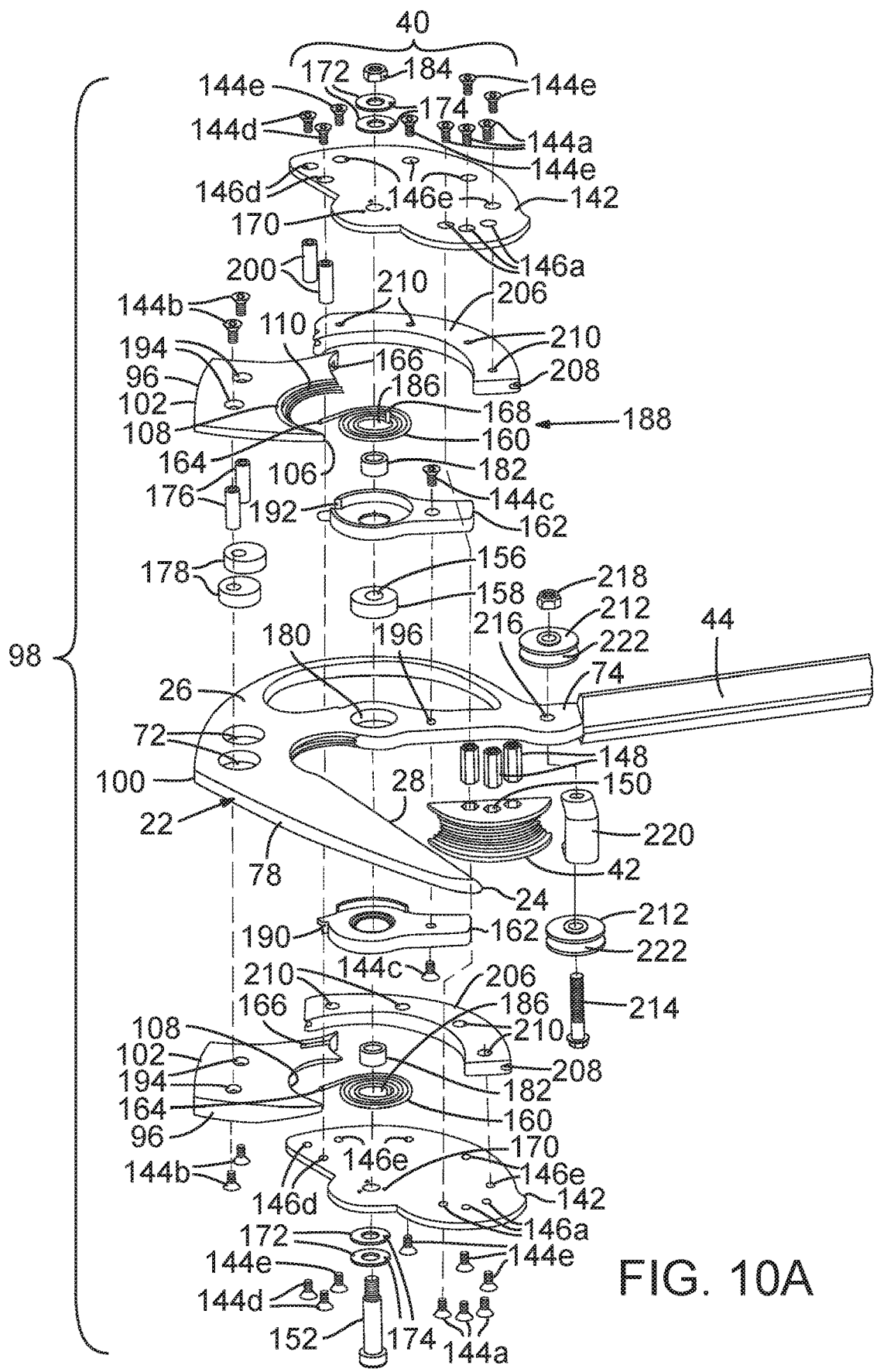
FIG. 10A is a left rear exploded view of the hook-end portion, showing components employed in one embodiment of the hook-end portion of the vine removal tool.
Figure 10B:
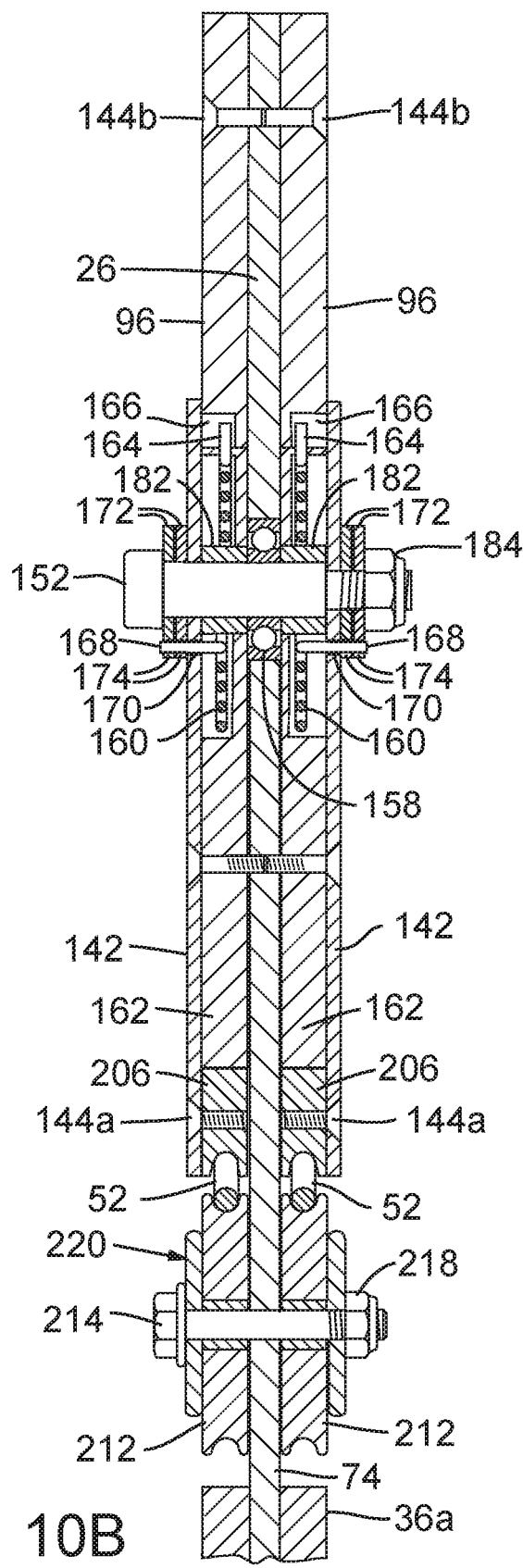
FIG. 10B is a cross-sectional view of the hook head assembly taken along a view plane 10B-10B shown in FIG. 5.
Figure 10C:
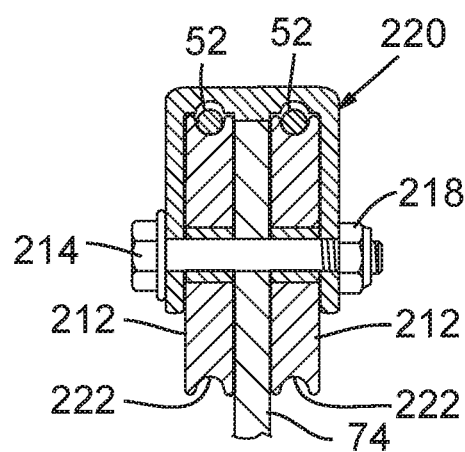
FIG. 10C is a cross-sectional view of the hook head assembly taken along a view plane 10C-10C shown in FIG. 5.
Figure 11:
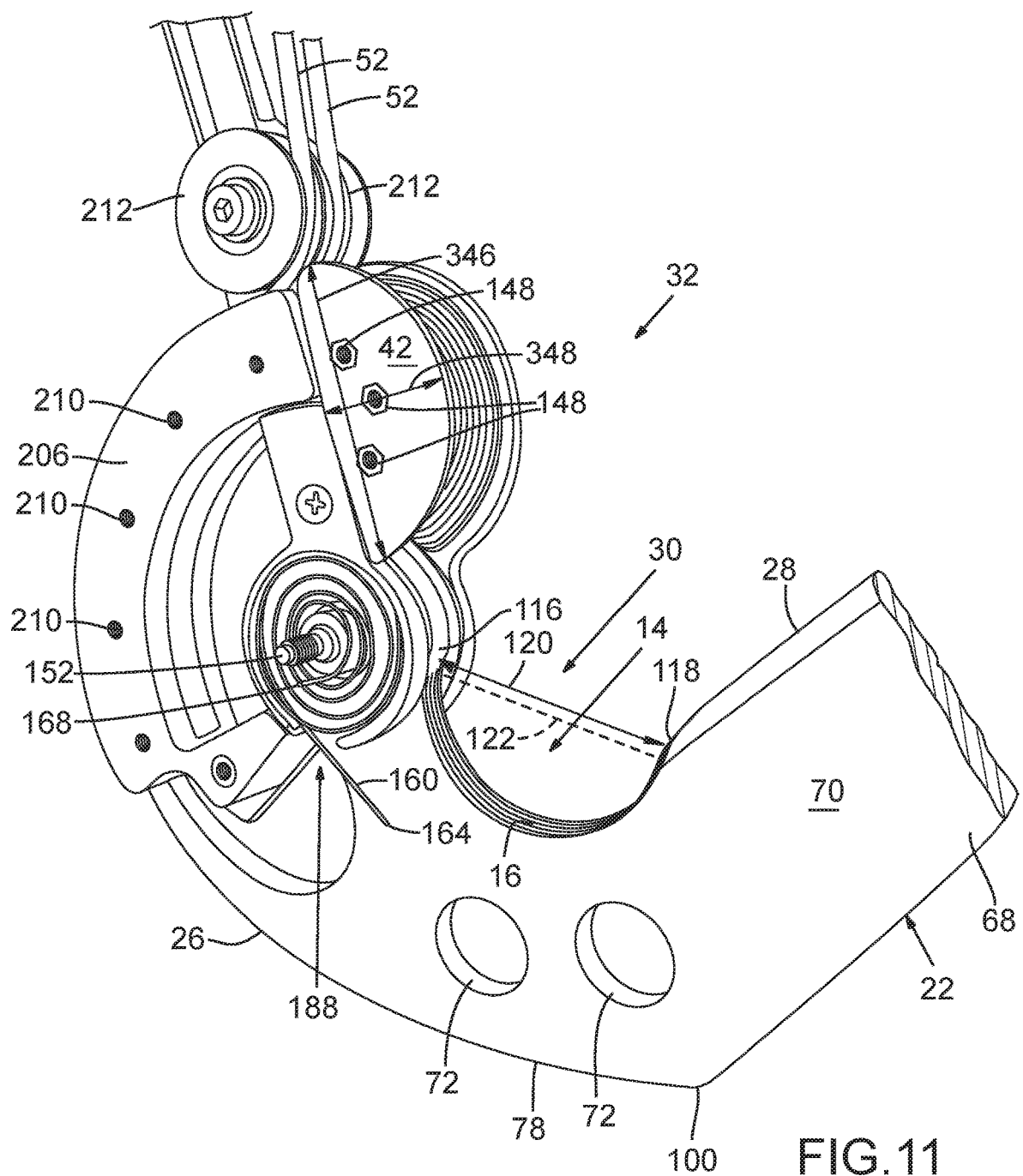
FIG. 11 is a bottom left side view of the hook-end portion with some components removed to expose other components employed in an embodiment of a jaw actuation mechanism of the vine removal tool.

FIG. 8 is a front and right side perspective view of the hook-end portion 32 including the hook head assembly 98, showing the hook pocket 30 with the movable jaw 40 in an open position; FIG. 8A is a cross-sectional view of a portion of the hook head assembly 98, depicting mated stepped surfaces for the pocket 30 and the jaw projection 42; FIG. 9 is a right-rear perspective view of the hook-end portion 32, showing optional grooves 124 or serrations of the jaw projection 42 of the movable jaw 40 in an open position; FIG. 10A is a left-rear perspective exploded view of the hook-end portion 32, showing components employed in one embodiment of the hook head assembly 98; FIG. 10B is a cross-sectional view of the hook head assembly 98 taken along a view plane 10B-10B shown in FIG. 5; FIG. 10C is a cross-sectional view of the hook head assembly 98 taken along a view plane 10C-10C shown in FIG. 5; and FIG. 11 is a front and right side view of the hook-end portion 32 with some components removed to expose other components employed in an embodiment of a jaw actuation mechanism 50 of the vine removal tool 20.

With reference to FIGS. 1-11, the pocket 30 may have a proximal pocket edge 116 that is closer to the shaft 44 than is a distal pocket edge 118 that is closer to the vine slide surface 28. The pocket 30 may have a pocket length 120 between the proximal pocket edge 116 and the distal pocket edge 118. The pocket length 120 may be shorter than or equal to 5", 4", 3", or 2". The pocket length 120 may be longer than or equal to 1", 2", or 3". One will appreciate that the pocket length 120 can be greater than 5" or shorter than 1". The pocket surface 112 may have a pocket surface width 114 between hook sides 128 that is generally perpendicular to the vine slide axis 80. The pocket width 114 may be greater than or equal to the hook thickness 18 of the hook projection 68. The pocket surface width 114 may be greater than or equal to 0.15", 0.20", 0.25", 0.30", 0.35", 0.40", 0.45", or 0.50". One will appreciate that the pocket width can be shorter than 0.15". The pocket 30 may have a pocket depth that is the shortest length from the deepest point in the pocket 30 to a midpoint of a geometric line 122 (FIG. 11) connecting the proximal pocket edge 116 to the distal pocket edge 118. The pocket depth may be shorter than or equal to 5", 4", 3", or 2". The pocket depth may be deeper than or equal to 1", 2", or 3". One will appreciate that the pocket depth can be greater than 5" or shorter than 1".

Figure 12:
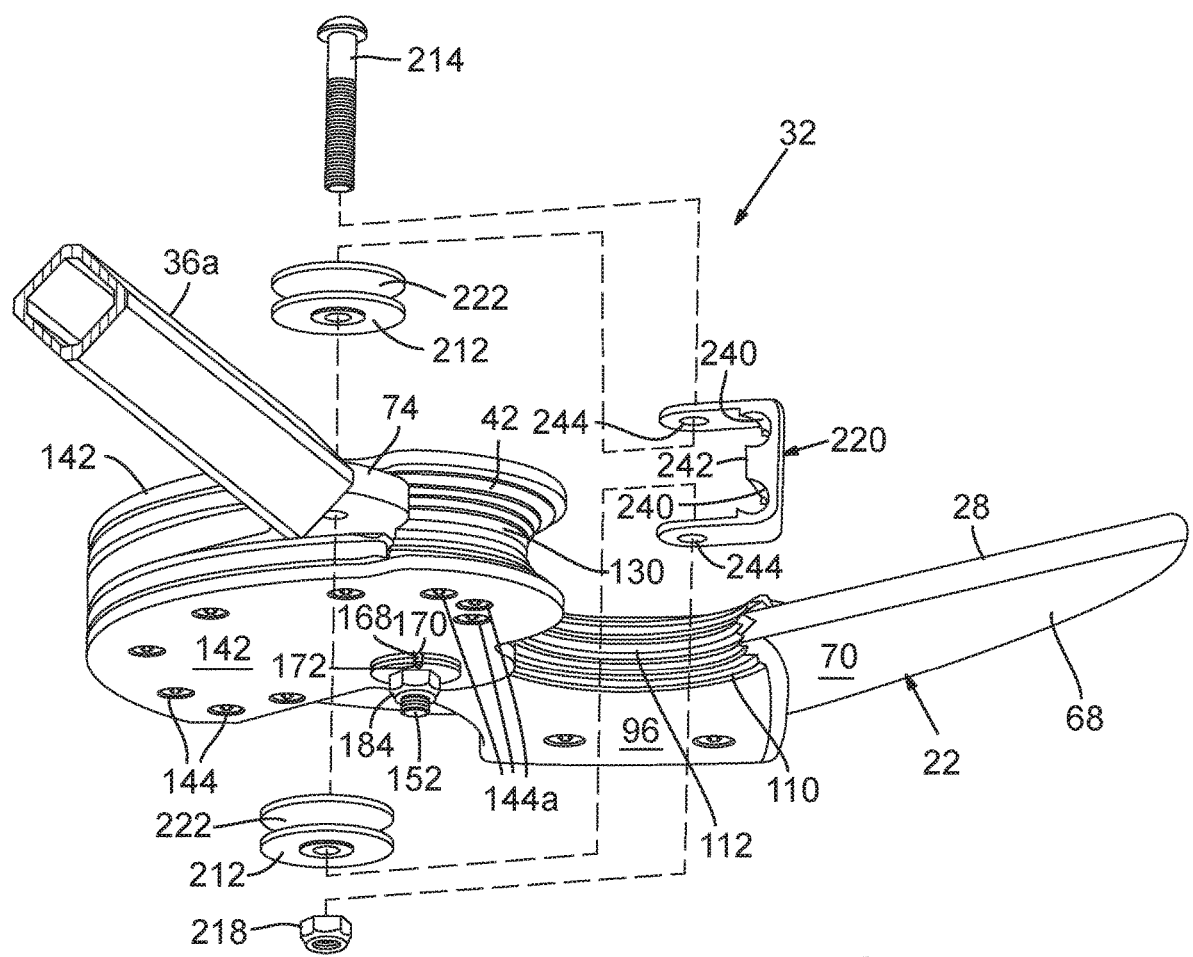
FIG. 12 is a left rear partly exploded view of the hook-end portion, showing an embodiment of a pulley bracket and mud scraper employed in one embodiment of the hook-end portion of the vine removal tool.

A side profile of the pocket 30 from the proximal pocket edge 116 to the distal pocket edge 118 can be of any shape. For example, the pocket profile may comprise one or more curves, or one or more linear segments, or both curves and linear segments. The pocket profile may exhibit a simple curve or a complex curve. The pocket profile may be concave with respect to the vine slide axis 80. The pocket profile may have a partly circular, partly oblong, or partly parabolic curvature. The cross-sectional profile of the pocket surface 122 between the hook sides 128 can also be any shape. For example, any of the shapes discussed above can be used. In some embodiments, a generally convex or a generally concave shape between the hook sides 128 may be used for the pocket surface 112. FIG. 12 shows a pocket surface 112 having a generally convex shape between the hook sides 128. One will appreciate that the pocket extender surface 110 of the surface skimmers 96 may be an extension of the shape of the pocket surface 112 or may have a separate shape.

The vine collection area 14 may have a vine collection surface having multiple surface features with different respective elevations. The multiple surface features may be configured to minimize severing a vine while gripping it between the jaw projection and the vine collection area. The vine collection surface may be presented herein by way of example to a pocket surface 112, which may constitute an embodiment of an entire vine collection surface or only a portion of the vine collection surface. Any of the disclosure herein with respect to the pocket surface 112 may be applied to the vine collection surface irrespective of whether the vine collection surface includes a pocket 30 unless such disclosure is mutually exclusive to a pocket 30.

The pocket surface 112 may have any type of texture or may be smooth. The pocket surface 112 may have a rough texture. The pocket surface 112 may include a gripping feature. The pocket surface 112 may include one or more grooves 124 or ridges 126. One or more of the grooves 124 or ridges 126 may lie in a respective ridge plane or groove plane that is parallel to the vine slide axis 80 or in respective planes that are transverse to the vine slide axis 80. The grooves 124 or ridges 126 may lie in a respective ridge plane or groove plane that forms a groove angle with the vine slide axis 80 form a groove angle that is less than or equal to 45 degrees, 30 degrees, 15 degrees, or 7.5 degrees. One will appreciate that the groove angle can be greater than 45 degrees. One will also appreciate that grooves 124 (or ridges 126) may be oriented in nonparallel planes, i.e., they may be transverse to each other. For example, the ridges 126 may be oriented in a chevron-like pattern or may be cross-hatched at perpendicular or non-perpendicular angles. The ridges 126 and/or the grooves 124 may linear or may be curved.

The ridges 126 or grooves 124 may have an elevation difference with respect to an average elevation of the pocket surface 112 that is less than or equal to 0.15", 0.125", 0.10", or 0.075". The ridges 126 or grooves 124 may have an elevation difference with respect to the average elevation of the pocket surface 112 that is greater than or equal to 0.02", 0.04", 0.06", or 0.08". One will appreciate that the groove or ridge elevation difference with respect to an average elevation of the pocket surface 112 that may be less than 0.02" or greater than 0.15". Each ridge 126 or groove 124 may have a uniform elevation difference with respect to the average elevation of the pocket surface 112 along the length of the ridge 126 or groove 124, or the elevation difference along any ridge 126 or groove 124 can be varied.

The ridges 126 may all have the same elevation difference with respect to the average elevation of the pocket surface 112 and/or the grooves 124 may all have the same elevation difference with respect to the average elevation of the pocket surface 112. Alternatively, one or more of the ridges 126 may have a different elevation than the other ridges 126, and/or one or more of the grooves 124 may have a different elevation dimension than the other grooves 124. One will appreciate that the ridges 126 and/or the grooves 124 may be effectively superimposed a more general shape or contour of the pocket surface 112.

The ridges 126 and/or grooves 124 may be spaced apart by a spacing dimension that is greater than or equal to 0.04", 0.06", 0.08", 0.1", or 0.12". The ridges 126 and/or grooves 124 may be spaced apart by a spacing dimension that is less than or equal to 0.15", 0.13", 0.11", or 0.09". One will appreciate that the spacing can be less than 0.04" or greater than 0.15". One or more ridges 126 may have an edge radius of less than 0.002", 0.001", or 0.0005". The ridges 126 and/or the grooves 124 may be sufficiently sharp to bite into a vine without severing it.

As mentioned previously, the pocket surface 112 and the jaw projection surface 130 may have any type of texture or formation. The jaw projection surface 130 may have multiple surface features with different respective elevations. The multiple surface features may be configured to minimize severing a vine while gripping it between the jaw projection and the vine collection area. The multiple jaw projection surface features may be configured to mesh with the multiple vine collection surface features. FIG. 8A is a cross-sectional view of a portion of the hook head assembly 98 that depicts the pocket surface 112 and the jaw projection surface 130 as mated stepped surfaces. The steps may have widths and depths that are the same or similar to those of the grooves 124 and ridges 126 that were previously discussed, or the step may have greater dimensions.

The jaw projection 42 may have a jaw projection surface 130 with any of the measurements or features listed for the pocket surface 112, such as jaw grooves 136 and jaw ridges 138 that may resemble or be different from opposing pocket grooves 124 or pocket ridges 126. Any features on or in the jaw projection surface 130 may be mated to opposing features on or in pocket surface 112, i.e., these features may be complementary.

In general, the shape of the jaw projection 42 may be mated to the shape of the pocket 30. More specifically, the jaw projection 42 may have a side profile between a projection proximal end 132 and a projection distal end 134. One will appreciate that one or more features on the jaw projection surface 130 may be unmatched to one or more contours on the pocket surface 112.

The jaw projection 42 may have a jaw surface width 140 (FIG. 9) that is transverse or perpendicular to the vine slide axis 80. The jaw surface width 140 may be greater than or equal to the pocket surface width 114 or greater than or equal to twice the pocket width 114. Moreover, the jaw surface width 140 may extend to cover the full width of the pocket extender surfaces, as well. The jaw surface width 140 may be greater than or equal to 0.25", 0.33", 0.5", 0.66", 0.75", or 1". One will appreciate that the pocket width can be shorter than 0.25". One will also appreciate that either the outside edges of the jaw projection 42 or the outside edges of the pocket extenders 110 of the surface skimmers 96 may be configured to slide past the respective pocket surface 112 or jaw projection surface 130 to provide extra clamping potential. The jaw projection 42 may have a jaw projection length 346 (FIG. 11) and a jaw projection height 348 (FIG. 11). Although the jaw projection length 346 is the major jaw projection dimension as shown in FIG. 11, one will appreciate that either of the jaw projection length 346 or the jaw projection height 348 could be the major jaw projection dimension.

The jaw projection 42 may be in a fully closed position whenever the jaw actuation mechanism 50 has extended the jaw projection 42 as far into the pocket 30 as the jaw actuation mechanism 50 is preset to allow, such that the jaw projection 42 is fully extended into the pocket 30. FIG. 7 depicts one embodiment of the hook head assembly 98 with the jaw projection 42 in a fully closed position. In some embodiments, at least a portion of the jaw projection surface 130 may be in contact with at least a portion of the pocket surface 112 when the jaw projection 42 is fully closed position. However, in some embodiments, at least a portion of the jaw projection surface 130 may be spaced apart from a portion of the pocket surface 112 when the jaw projection 42 is in the closed position. Moreover, the entire the jaw projection surface 130 may be spaced apart from the pocket surface 112 when the jaw projection 42 is in the closed position.

The entire the jaw projection surface 130, or at least a portion of the jaw projection surface 130, may be spaced apart from the pocket surface 112 by less than or equal to 0.2", 0.15", 0.12", or 0.1" when the jaw projection 42 is in the closed position. The entire the jaw projection surface 130, or at least a portion of the jaw projection surface 130, may be spaced apart from the pocket surface 112 by greater than or equal to 0.004", 0.01", 0.1" 0.2", 0.4", 0.6" or 0.8" when the jaw projection 42 is in the closed position. One will appreciate that the closed position spacing can be less than 0.004".

With particular reference to FIG. 10, the jaw projection 42 may be an integrally formed part of the movable jaw 40 (or jaw assembly 40) or it may be formed separately. For example, the jaw projection 42 may be positioned between opposing jaw side plates 142 and attached by any conventional attachment mechanism. In one embodiment, the attachment mechanism employs fasteners 144a (e.g., machine screws) that pass through (or are threaded through) plate apertures 146a in the jaw side plates 142 and connect to threads of threaded standoffs 148 that are configured to insert into jaw apertures 150. The exterior of the threaded standoffs 148 and the interior of the jaws apertures 150 may employ a multisided shape, such as hexagonal to prohibit rotation of the threaded standoffs 148. The jaw side plates 142, as well as the respective attachment mechanisms, may be symmetrical to each other or they may be different.

In addition, some embodiments of the movable jaw 40 may include a pivot or oscillation feature including a jaw axle 152 (e.g., a shoulder bolt or any suitable pivot structure) that passes through an axle hole 154 or slot in each of the jaw side plates 142 and passes through a bearing aperture 156 of an axle bearing 158 that may be attached to a bearing hole 180 near the center of the hook 22. The jaw axle 152 may also pass through one or more spacers 182 on each side of the axle bearing 158 to provide a desired distance between the side plates 142. One or more washers 172 may be employed around the jaw axle 152 on the outside of the jaw side plates 142 to spread the clamping load on the jaw side plates 142. A nut 184 may be employed on one or both sides of the jaw axle 152 (or on a threaded side of a shoulder bolt, for example) to clamp together the assembly of the movable jaw 40. One will appreciate that numerous other conventional means can be used for implementing jaw movement or rotation.

The pivot or oscillating feature may permit the movable jaw 40 to rotate in a jaw rotation direction 344 so that the jaw projection 42 can be in a fully closed position, a fully open position, or an infinite number of partly open positions. FIG. 7 depicts one embodiment of the hook head assembly 98 with the jaw projection 42 in a fully closed position. FIGS. 1A-6, 8, 9, 11, 12, 14, and 22 depict different embodiments of the hook head assembly 98 with the jaw projection 42 in a fully open position.

The movable jaw 40 may also include a jaw retraction mechanism 188 (FIG. 11) that is operable to cause the jaw projection 42 to move away from the vine collection area 14. Moreover, the jaw retraction mechanism 188 may retract the movable jaw 40 so that the jaw projection 42 can be in, and biased toward, a fully open position. The jaw retraction mechanism 188 may include one or more pre-tensioned flat spiral torsion springs 160 that are enclosed in spring covers 162. The jaw axle 152 may pass through a center opening 186 in the coil of the torsion spring 160 and through an aperture 190 in the spring cover 162. One end 164 of the torsion spring 160 can extend through a slot 192 in the spring cover 162 and can be fixed in a slot 166 on the inside of the surface skimmer 96. The other end 168 of the spring can bend out and go through a spring end aperture 170 in the jaw side plate 142. In one design iteration, one or more washers 172 that can be placed around the jaw axle 152 can have a notch cut out 174 for clearance of the end 168 of the torsion spring 160 if the end 168 sticks through the jaw side plate 142. Fasteners 144c may be employed to connect the spring cover 162 to the hook 22 by engaging a threaded aperture 196 in the hook 22. One will appreciate that alternative conventional biasing force-applying mechanism are known and can be substitutes for the jaw retraction mechanism 188 shown in the figures. The jaw retraction mechanism may provide a minimum of 4'/pounds, 5'/pounds, 6'/pounds, 7'/pounds, or 8'/pounds of torque.

With reference again to the jaw actuation mechanism 50, it may utilize any conventional assembly that is operable to move the jaw projection 42 into the pocket 30 to achieve a fully closed position. For example, jaw movement can be effected by a motor controlled by a switch on the shaft 44. However, many embodiments employ a jaw actuation line 48 configured to close the movable jaw in response to force on the line 48 in a direction away from the hook end portion (and typically toward the operator 34). The actuation line 48 may include one or more primary actuation lines 52 that are directly or indirectly connected to the movable jaw 40. In some embodiments, two primary actuation lines 52 are employed on different sides of the hook 22. An end of each primary actuation line 52 can be connected in any conventional manner to a line anchor 200, such as a threaded spacer between the jaw side plates 142. For example, the end the primary actuation line 52 can be sewn into a line loop 198 that attaches around the cord anchor 200. The line anchor(s) 200 can be connected directly or indirectly to the jaw side plates 142 by any conventional means. For example, fasteners 144d may be employed to connect to the line anchors 200 through apertures 146d in the jaw side plates 142. The line anchors 200 in the embodiments shown in FIGS. 6 and 7 constitute pulley assemblies that are more externally positioned than the threaded spacers shown in FIG. 10A.

The primary actuation lines 52 can employ any conventional line material including, but not limited to, string, cord, rope, and cable, and these can be synthetic, non-synthetic, or metallic. The primary actuations lines 52 can be firm or flexible. The line may have a line diameter in a range of 2 mm to 51 mm, 3.175 mm to 51 mm, or 3.175 mm to 10 mm, or any cross sectional area that can support the expected load.

In one example, the primary actuations lines 52 employ a 1600-pound breaking strength Dyneema™ cord. Some embodiments employ a little bit of stretch in the primary actuations lines 52 to greatly reduce peak stress that could result during use of the vine removal device 20. If the user 34 leans in and locks a later-described reel 202 (that may function as a line adjustment mechanism and/or a detensioning mechanism), and then jerks backward quickly, there could be quite a bit of momentum built up, which could put a lot of stress on the reel 202, the tether 54, and the movable jaw 40 as the jaw projection 42 hits the closed position.

So, in some embodiments, the primary actuations lines 52 employ a tubular strand of braided cord with a foam core between the movable jaw 40 and the reel 202. The braiding makes the cord hollow (until it's tightened). As the cord is tightened, it will compress the foam as it's put under tension, and thus provide some cushioning. For example, a ⅛" diameter synthetic, 12 strand, braided cord can be employed between the movable jaw 40 and the reel 202. By inserting a 1" long, ⅛" diameter, closed cell foam core inside the synthetic cord, the peak stress can be greatly reduced. This cord construction concept is general-purpose and could be employed in climbing ropes or the like, where the lack of stretch is a big disadvantage in drop-load testing.

One or more guide sheaves 206 with line furrows 208 can be configured to keep the primary actuations line 52 at a uniform distance from the jaw axle 152 to maintain a consistent amount of torque on the movable jaw 40 as the jaw projection 42 transitions from an open to a closed position. The guide sheave 206 can be connected directly or indirectly to the jaw side plates 142 by any conventional means. For example, fasteners 144e may be employed to connect to threaded apertures 210 in the guide sheaves 206 by way of apertures 146e in the jaw side plates 142.

The guide sheaves 206 may facilitate uniform mechanical leverage throughout full rotation of the movable jaw 40 from a fully open position to a fully closed position of the jaw projection 42. Full rotation of the movable jaw 40 may be greater than or equal to 80 degrees, 90 degrees, 100 degrees, or 110 degrees. Full rotation of the movable jaw 40 may be less than or equal to 180 degrees, 150 degrees, 130 degrees, 120 degrees, or 110 degrees. One will appreciate that full rotation of the movable jaw 40 may be less than 80 degrees or greater than 130 degrees. One will also appreciate that the guide sheaves 206 may facilitate uniform mechanical leverage through only part of the rotation of the movable jaw 40 from a fully open position to a fully closed position of the jaw projection 42. Uniform mechanical leverage of the movable jaw 40 may cover rotation of greater than or equal to 80 degrees, 90 degrees, 100 degrees, or 110 degrees. Uniform mechanical leverage of the movable jaw 40 may cover rotation of less than or equal to 130 degrees, 120 degrees, or 110 degrees. One will appreciate that uniform mechanical leverage of the movable jaw 40 may cover rotation of the movable jaw 40 may be less than 80 degrees or greater than 130 degrees.

Figure 13A:
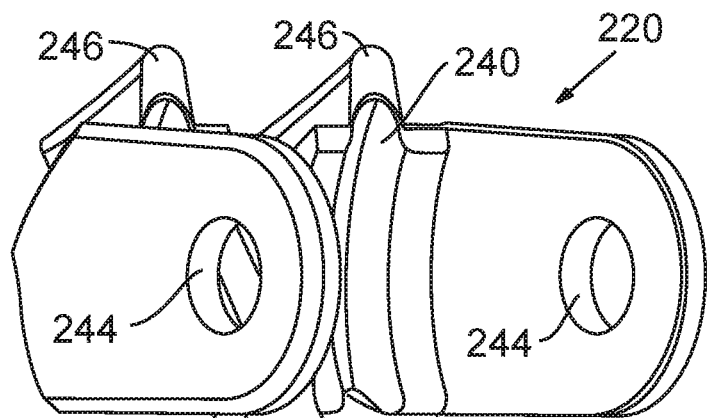
FIG. 13A is a left rear view of an alternative embodiment of a pulley bracket and mud scraper.
Figure 13B:
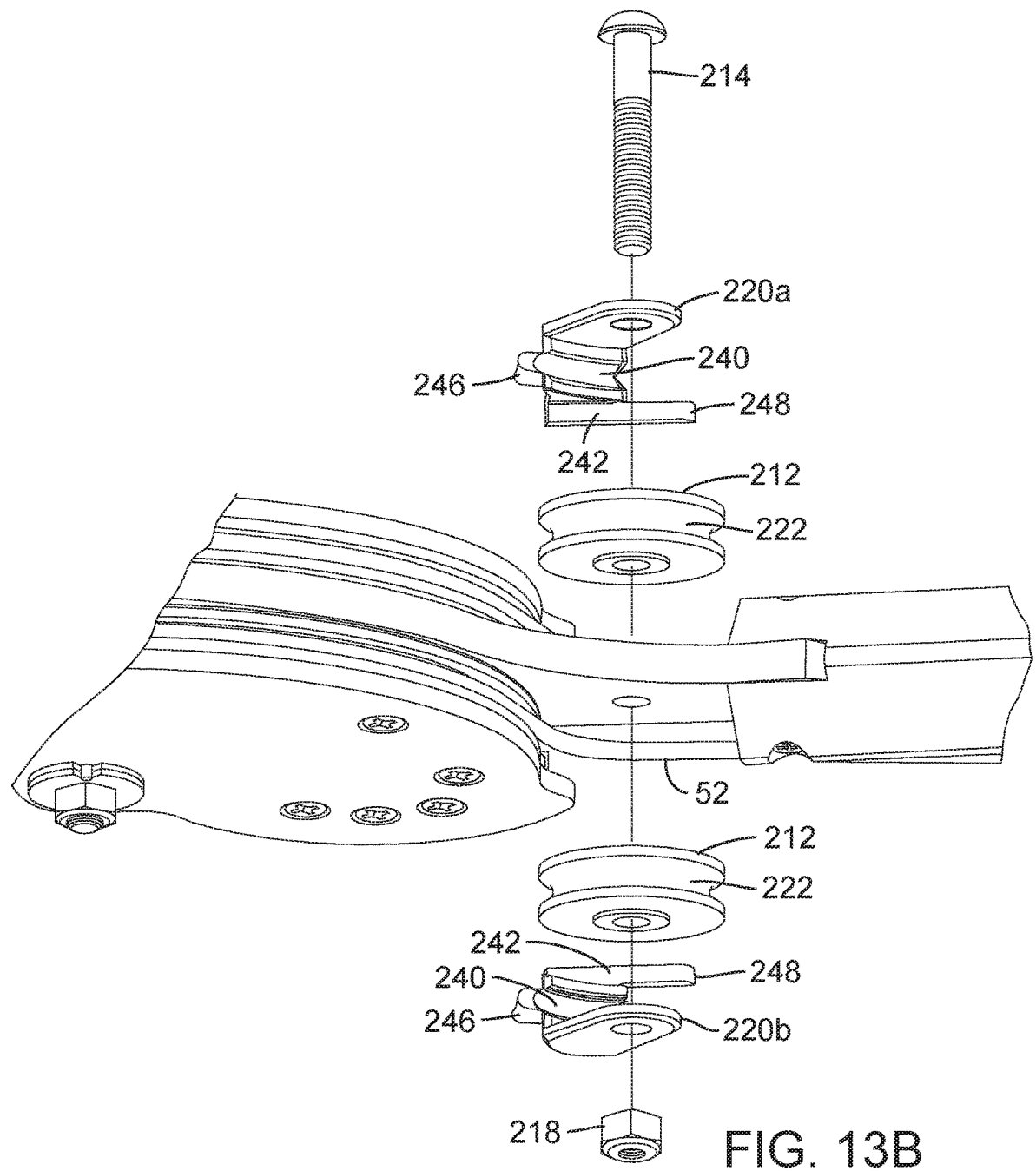
FIG. 13B is an exploded view of a portion of the hook head assembly showing a two-piece version of the pulley bracket and mud scraper.

FIG. 12 is a left-rear partly exploded view of the hook-end portion 32, showing an embodiment of a protrusion 242 of a pulley bracket 220 that the line 52 cannot come out of the pulley furrows 222; FIG. 13A is a left-rear view of an alternative embodiment of the pulley bracket 220 with a mud blocker 246 that fits in the sheave furrow 208; and FIG. 13B is an exploded view of a portion of the hook head assembly 98 showing a two-piece version of the pulley bracket 220 and the mud blocker 246. Projection 248 lies against the hook tang 74 bottom and ensures that the pulley bracket 220 doesn't rotate.

With particular reference to FIGS. 12, 13A, and 13B, as well as previous figures, the primary actuations lines 52 can be directed to one or more respective alignment or redirecting pulleys 212, which redirect the lines 52 into the sheave furrows 208. These alignment pulleys 212 may be are mounted near the tang 74 of the hook 22. The alignment pulleys 212 can be supported by the same or different pulley axles 214, such as a partly threaded bolt that passes through an aperture 216 in the hook 22 and is capped by a nut 218. The pulley axle 214 may also pass through bracket apertures 244 in a pulley bracket 220 that has a protrusion 242 that separates recesses 240. The recesses 240 may be aligned with the pulley furrows 222 and the sheave furrows 208 to help prevent the lines 52 from slipping out of the furrows 222 of the alignment pulleys 212 or the sheave furrows 208. The pulley bracket 220 can be made from any suitable material, such as plastic, fiberglass, or metal.

In some embodiments, the pulley bracket 220 may employ two half bracket pieces 220a and 220b that fit on the pulley axle 214 exterior to the alignment pulleys 212. The protrusion 242 prevents the pulley bracket 220 from rotating. The half bracket pieces 220a and 220b may each also have a mud scraper projection 246 that fits into the sheave furrows 208 on the guide sheaves 206 of the movable jaw 40. The mud scraper projections 246 may be configured to prevent mud from building up in the sheave furrows 208. A small amount of mud does not significantly hamper operation of the movable jaw 40; however, too much accumulated mud could potentially fill up the sheave furrows 208 and potentially jam the line 52 into the alignment pulley 212 to inhibit rotation of the movable jaw 40.

The primary actuations lines 52 can be connected directly or indirectly to the belt 46 by any conventional connection method. Alternatively, the line 48 may also include a tether 54, which can be connected directly or indirectly to the belt 46 by any conventional connection method. In one example, the primary actuations lines 52 or the tether is attached by a carabiner 224 to a D-Ring 226 on the belt 46.

Figure 19:
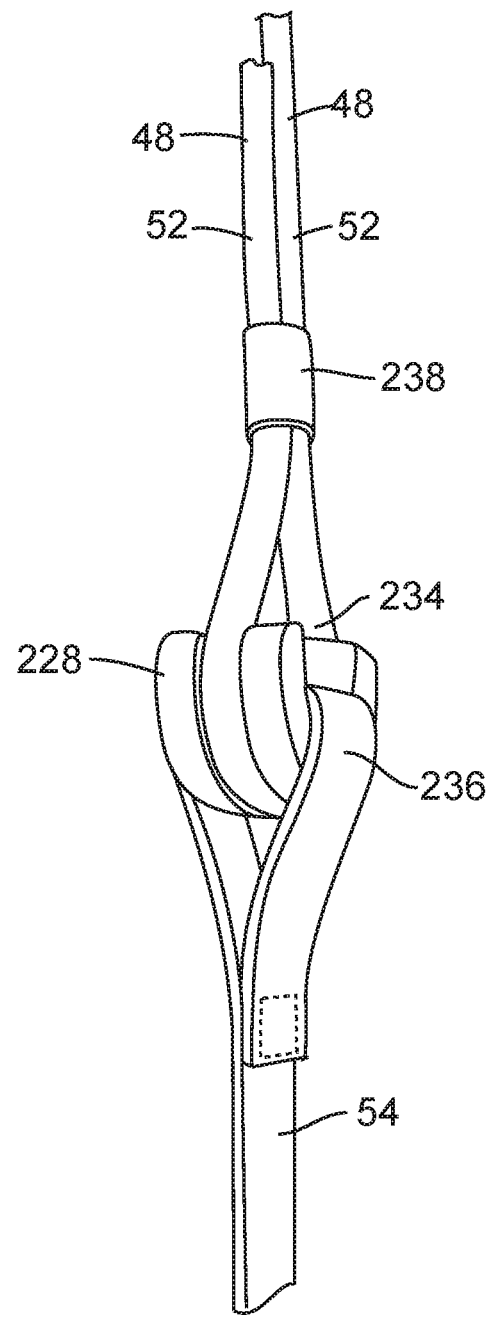
FIG. 19 is a right side perspective view showing an embodiment of a clip connector and lines of the reel and the projection actuation mechanism.
Figure 20:
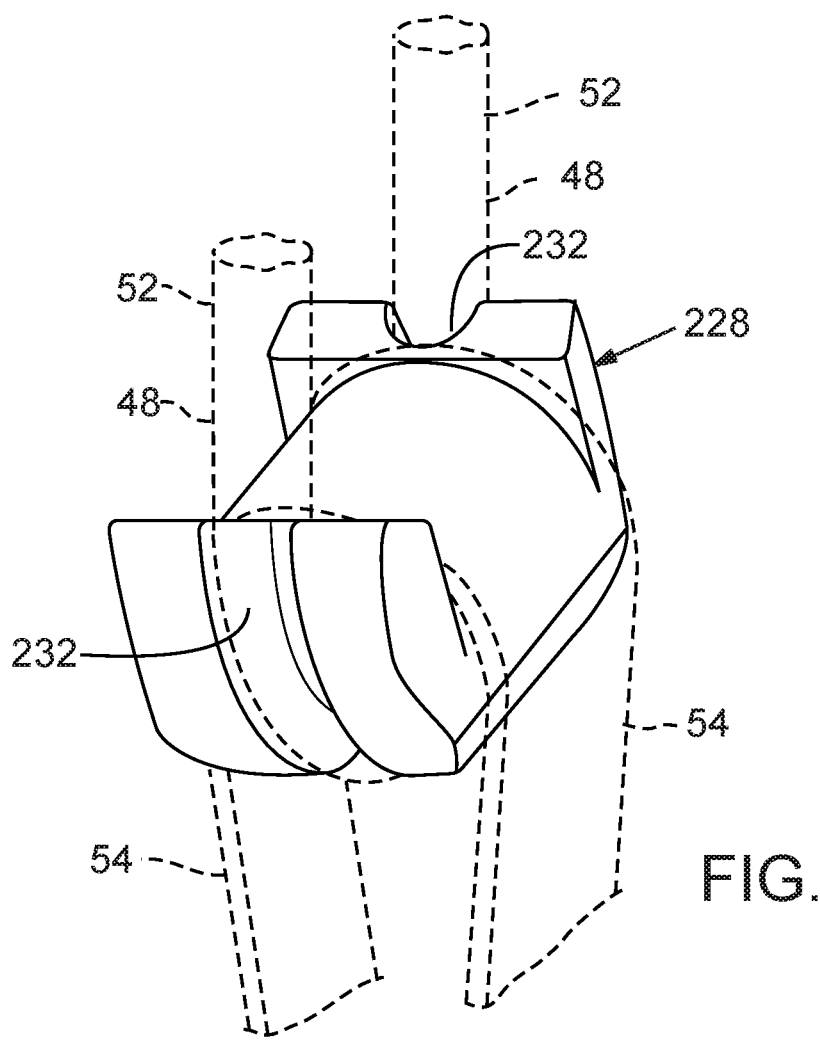
FIG. 20 is a front and right side perspective view showing an embodiment of a clip connector that facilitates connection between lines of the reel and the projection actuation mechanism, with the lines and tether shown in broken lines.
Figure 21:
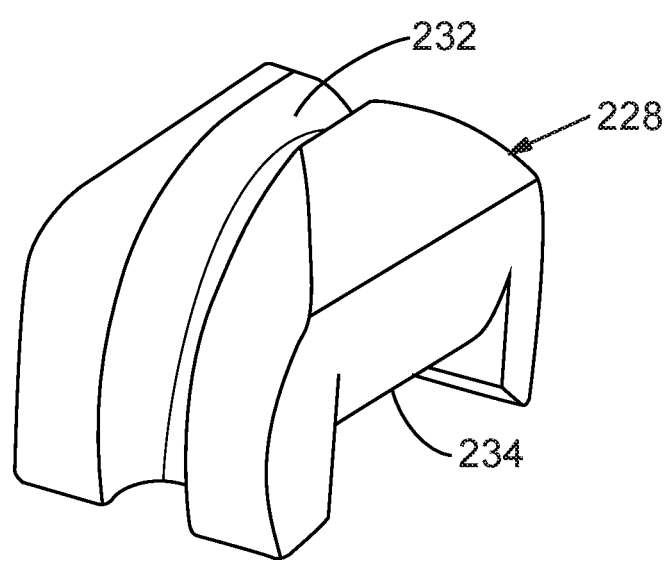
FIG. 21 is a rear and left side perspective view showing an embodiment of a clip connector that facilitates connection between lines of the reel and the projection actuation mechanism.

FIG. 19 is a right side perspective view, showing an embodiment of a line clip connector 228 that may be employed to connect the primary actuations lines 52 to the tether 54; FIG. 20 is a front and right side perspective view of the line clip connector 228 with the lines 52 and tether 54 shown in broken lines; and FIG. 21 is a rear and left side perspective view showing the clip connector 228 that facilitates connection between lines of the reel and the projection actuation mechanism. With particular reference to FIGS. 19-21, the tether 54 may different properties than the primary actuation lines 52. Generally, the tether 54 may be wider and flatter than the primary actuation lines. For example, the tether 54 may employ nylon or high strength synthetic fiber webbing because thin flat webbing may be better to wind around a spool. The tether 54 may be wider than ⅛" and may be as wide as ½" or wider. Accordingly, the line clip connector 228 may be configured to connect one or more primary actuation lines 54 and a tether 54 having disparate shapes and sizes. The strength of some synthetic fibers are greatly reduced by tight bends or knots. The line clip connector 228 maintains a large enough bend radius. In one example, the line clip connector 228 is configured to a tether 54 of ½"-webbing to a line 52 of ⅛"-cord. One will appreciate that the line clip connector 228 can be configured to connect other shape and/or size combinations of tether 54 and line 52.

The line clip connector 228 may have an outer furrow 232 and an inner furrow 234. The outer furrow 232 may have a more rounded or curves profile with a thinner width to accommodate a loop 234 of the primary actuation lines 52. One will appreciate that the primary actuation lines 52 may be formed of single line that runs from the line anchor 200 on a first side of the hook, around the guide sheave 206 on the first side of the hook 22, runs to and loops around the line clip connector 228, runs back to and around the guide sheave 206 on the second side of the hook 22, and attaches the line anchor 200 on the second side of the hook. Each side of the line 52 may be as long as 2' long or greater.

A ferrule 238 may be employed to determine the size of the loop 234. The tether 54 may also form a loop 236 around the inner furrow 232 with the end of the tether 54 being sewn to the tether on the other side of the clip connector 228. The clip connector 228 may be made from any strong suitable material, such as plastic, fiberglass, or metal such as stainless steel. The loops 234 and 236 need not be too tight. The divergent angle of the loops 234 and 236 may be less than about 45 degrees, so the tether 54 and the line 52 may bend around the clip connector 228 in a gentle bend. The loop 234 of the line 52 and the loop 236 of the tether 54 can be at right angles to each other; and, any tension would compress the fitting.

The lengths of the primary actuation lines 52 and tether 54 may be adjustable or nonadjustable. The lines 52 and/or the tether 54 may be alternatively or additionally equipped with length adjustment features (not shown), such as loops, knots, clips, or buckles. These features can be spaced-apart at irregular or regular intervals that may be less than or equal to 12" or 6" apart. The tether 54 and primary actuation line 52 may be operable to connect directly or indirectly to each other through one respective ones of these features. The features on either the tether 54 or the line 52 can be clipped together to shorten the respective line 52 or tether 54, or one feature from each can be connected to adjust the total length of the line 48. Similarly, the total length of the line 48 from the line anchor 200 to the belt 46 can also be adjusted by attaching the belt 46 to a length adjustment feature on the tether 54. These length adjustment features facilitate length adjustments of the line 48 to accommodate extensions and contractions of the shaft 44 and other adjustments for preferences of the user 34.

One will appreciate that unless the shaft 44 is extended to its maximum length, length adjustment features will not be at the very ends, so there may be extra loose line 48 that could pose a tripping hazard or a snag hazard. To keep the loose line 48 out of the way, a ⅛" diameter elastic auxiliary cord may be connected to multiple adjustment features (or every adjustment feature) and attached to the feature closest to the hook 22 and/or the belt 46. The elastic cord can also be threaded through a clam cleat, attached to the shaft 44. The clam cleat could facilitate easy tightening and loosening of the elastic cord 62 as needed. Because the cord is elastic, normal pulling wouldn't be impeded as pull angles and positions change. The free end of the cord can be then wound around the shaft 44. This elastic cord could also be used to attach the belt 46 and tether 54 to the shaft 44.

The jaw actuation mechanism 50 may be configured to reduce tension on the line 48 before the vines are hooked and positioned into the pocket 30. In this regard, the jaw actuation mechanism 50 may include a detensioning and/or length-adjusting mechanism that can be inserted into the line 48. The detensioning and/or length-adjusting mechanism may employ a compact and light-weight retractable locking tether mechanism, similar to a seatbelt roller or the LeashLocket™ described in U.S. Pat. No. 8,347,824, which is herein incorporated by reference.

Figure 15A:
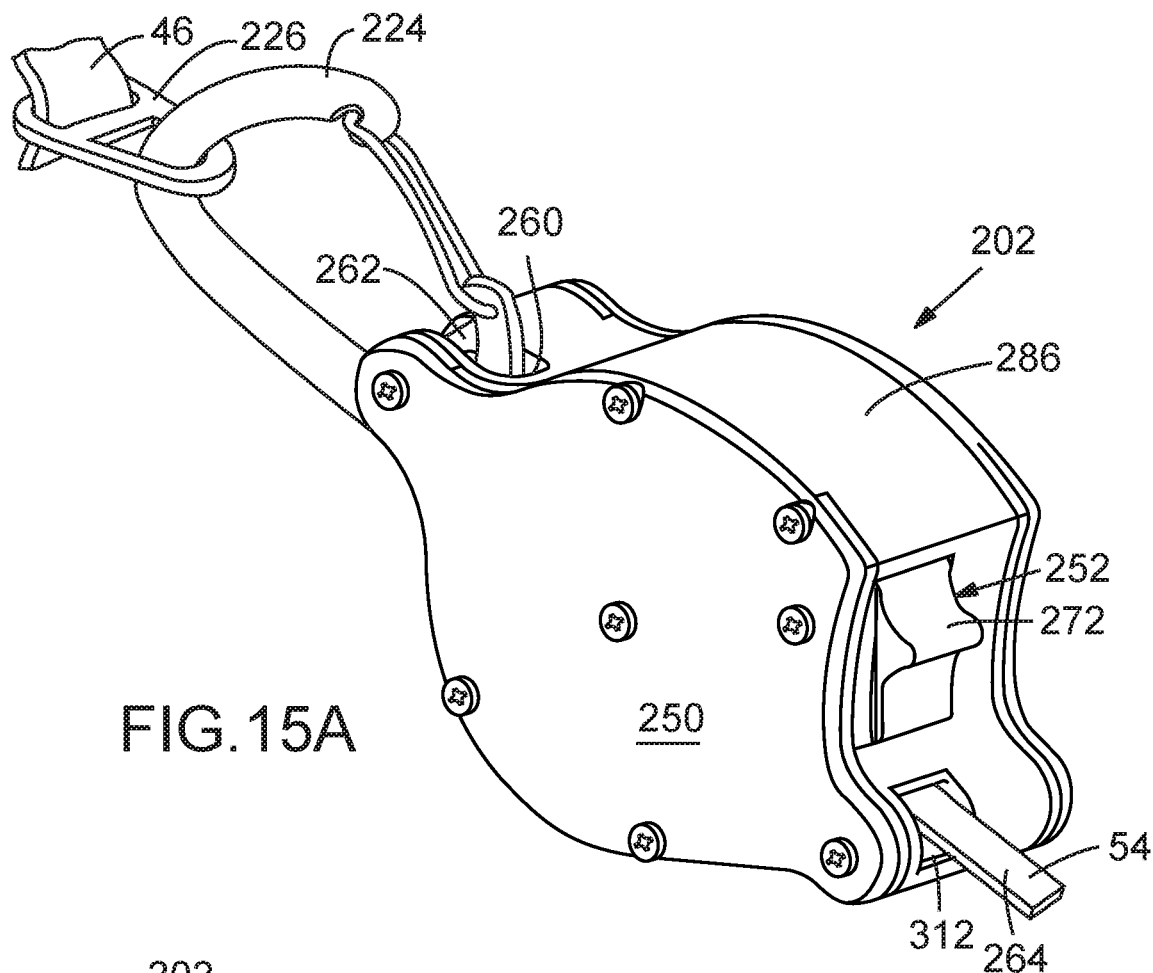
FIG. 15A is a right front perspective view of a reel associated with the jaw actuation mechanism of an embodiment of the vine removal tool.
Figure 15B:
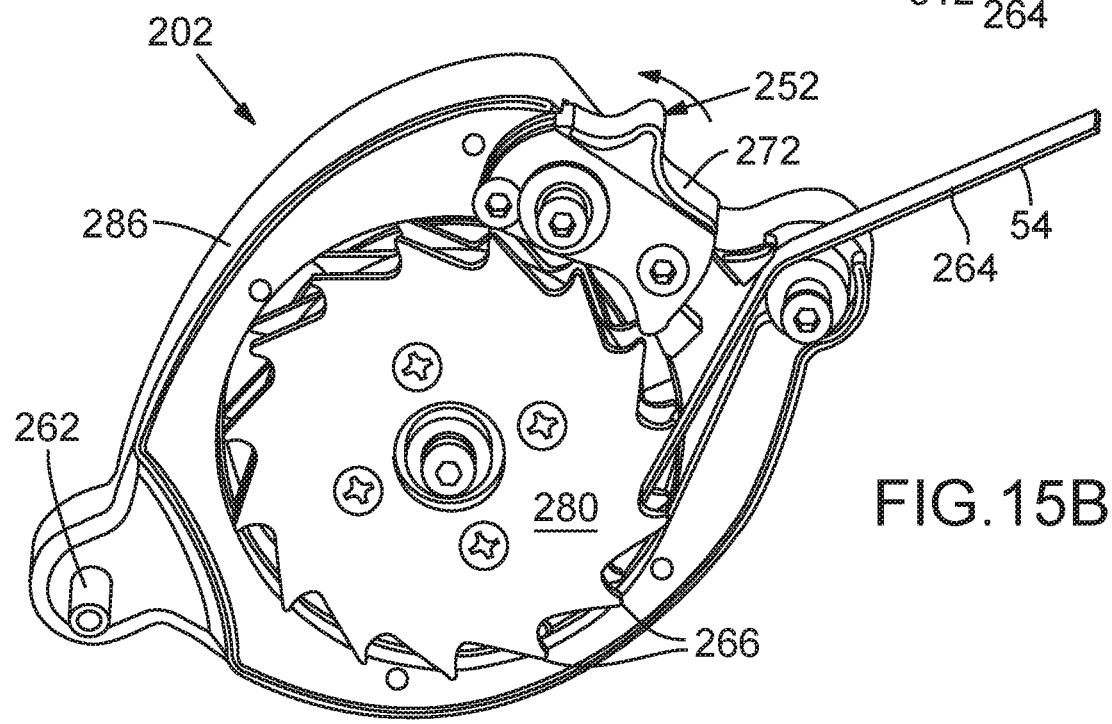
FIG. 15B is a rear and right side perspective view of the reel with its right reel cover removed.
Figure 15C:
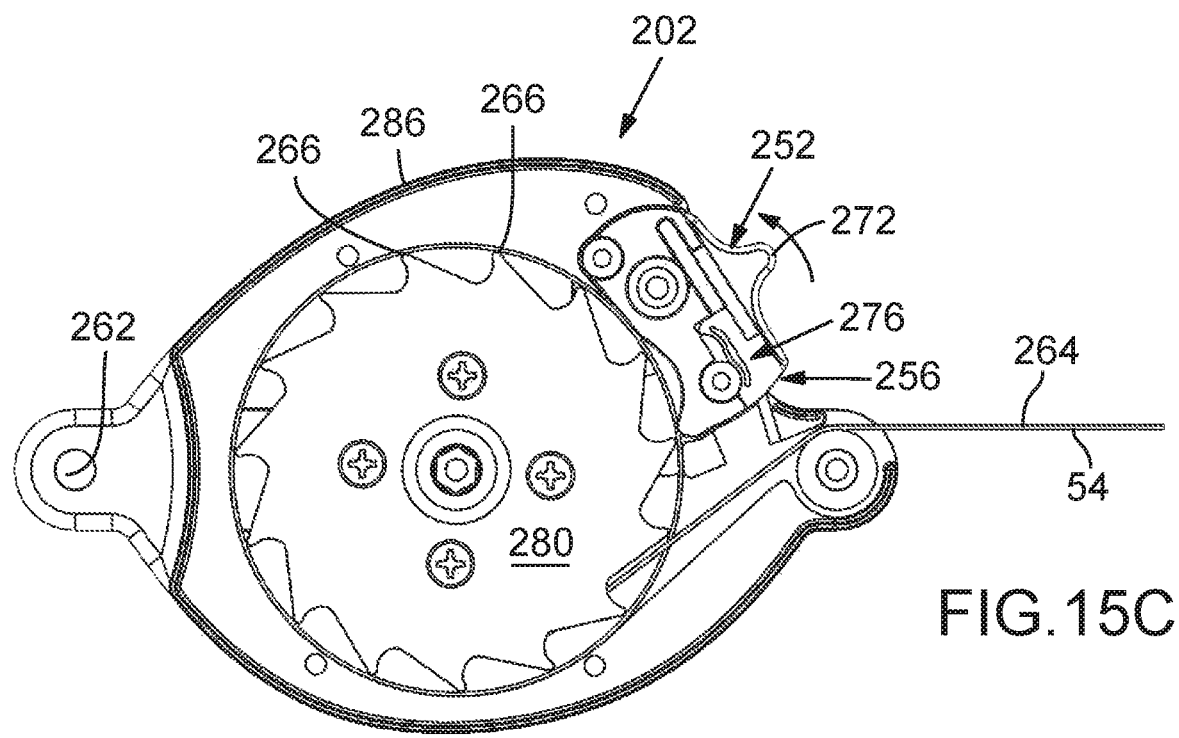
FIG. 15C is a side view of the reel with its right reel cover removed, wherein a reel switch is in an open position.
Figure 15D:
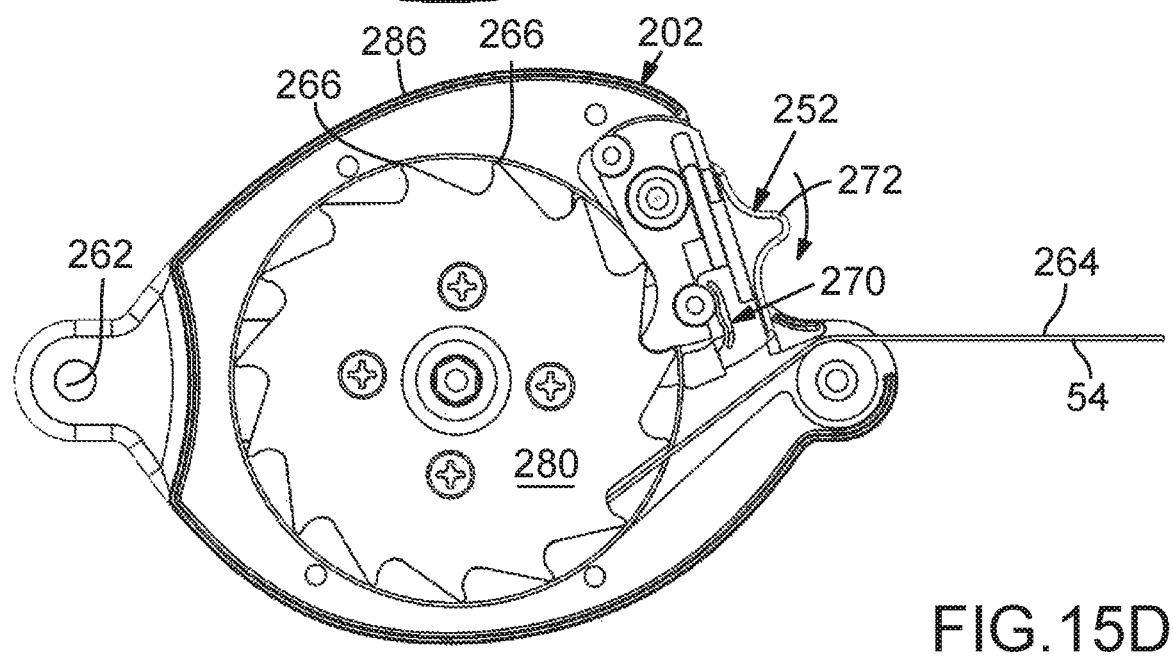
FIG. 15D is a side view of the reel with its right reel cover removed wherein the reel switch is in a closed position.
Figure 16A:
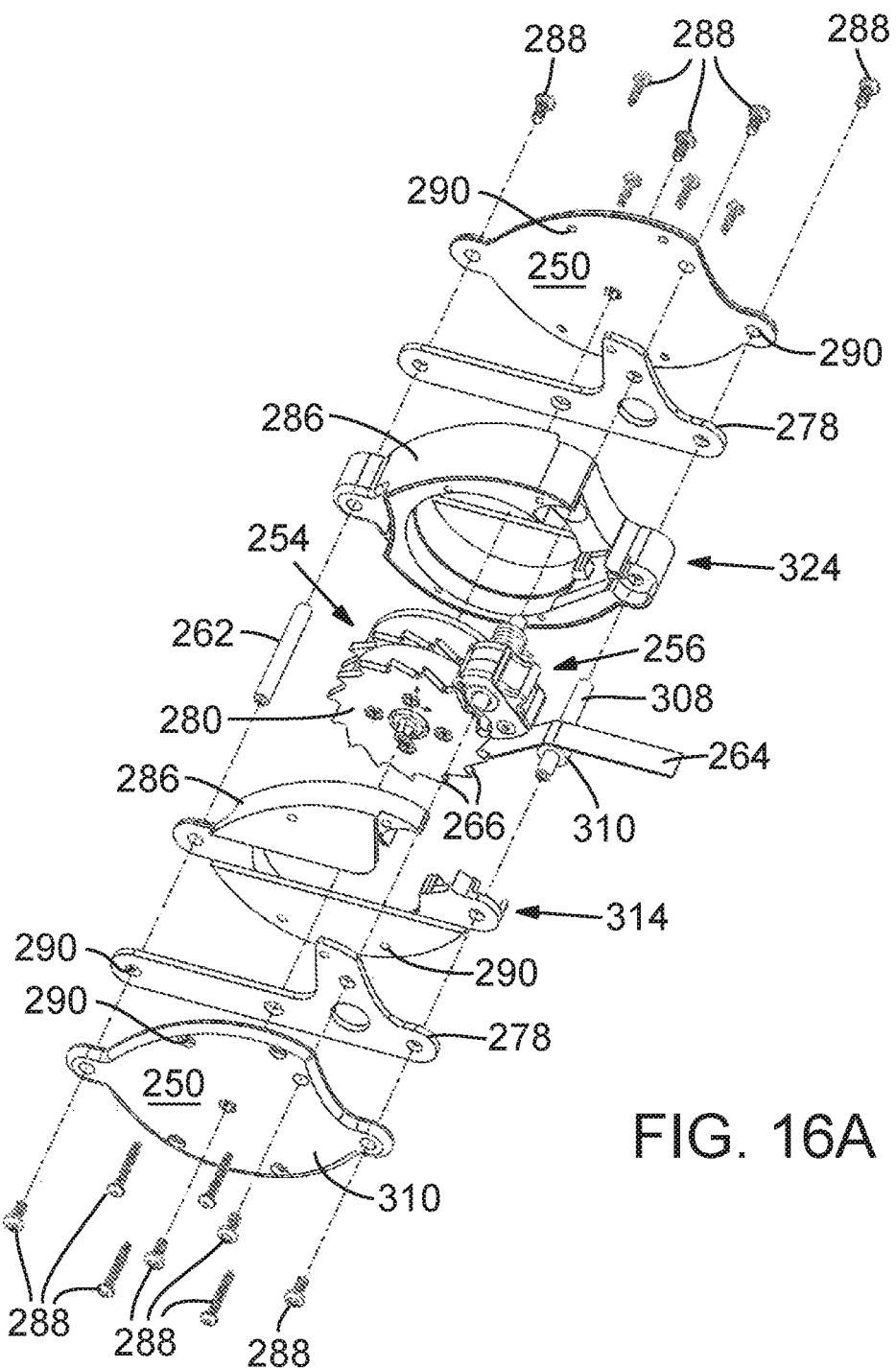
FIG. 16A is an exploded view of an embodiment of the reel, showing some components employed in an embodiment of the reel.
Figure 16B:
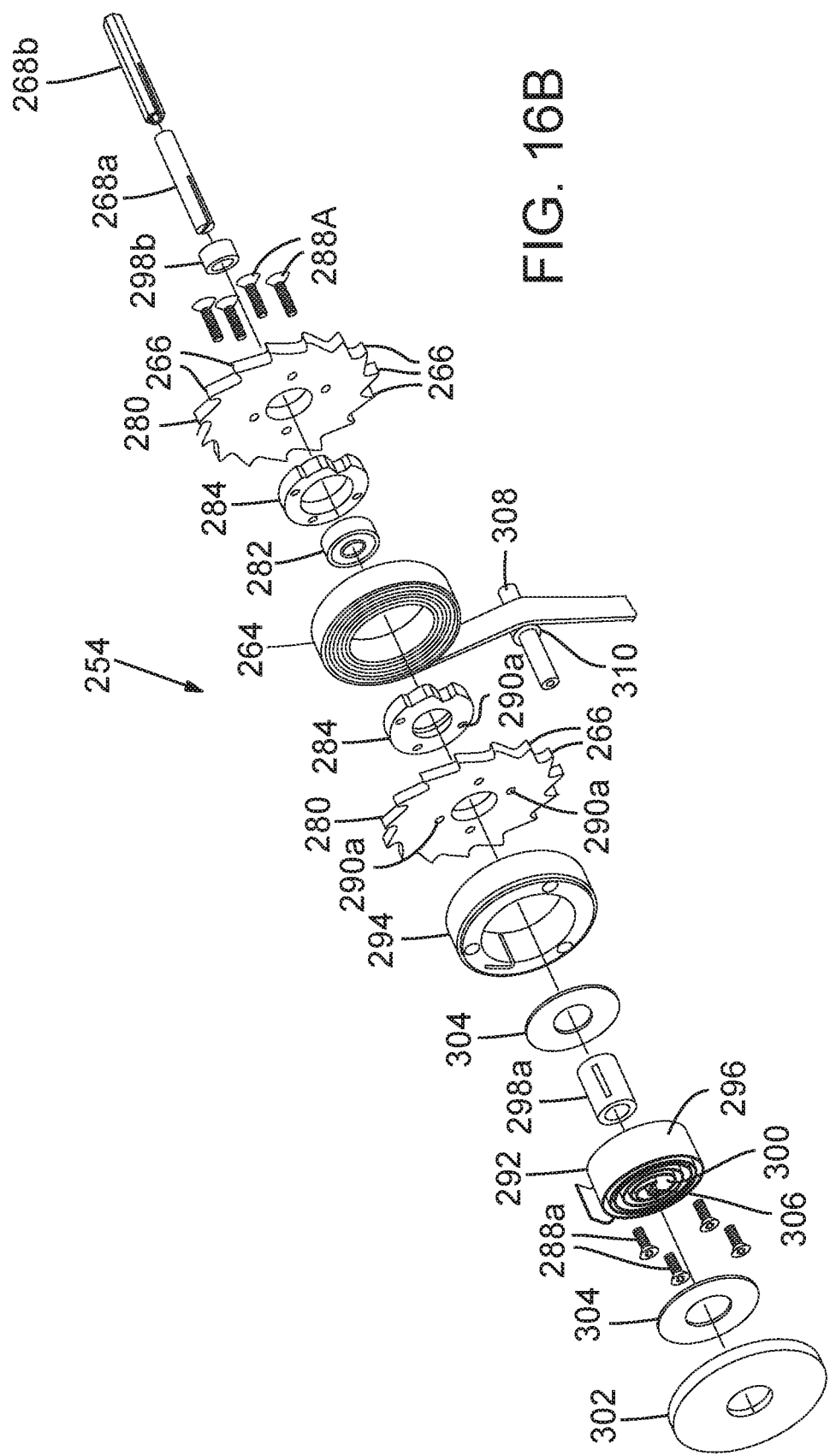
FIG. 16B is an exploded view of an embodiment of the reel, showing some components employed in its retraction mechanism.
Figure 16C:
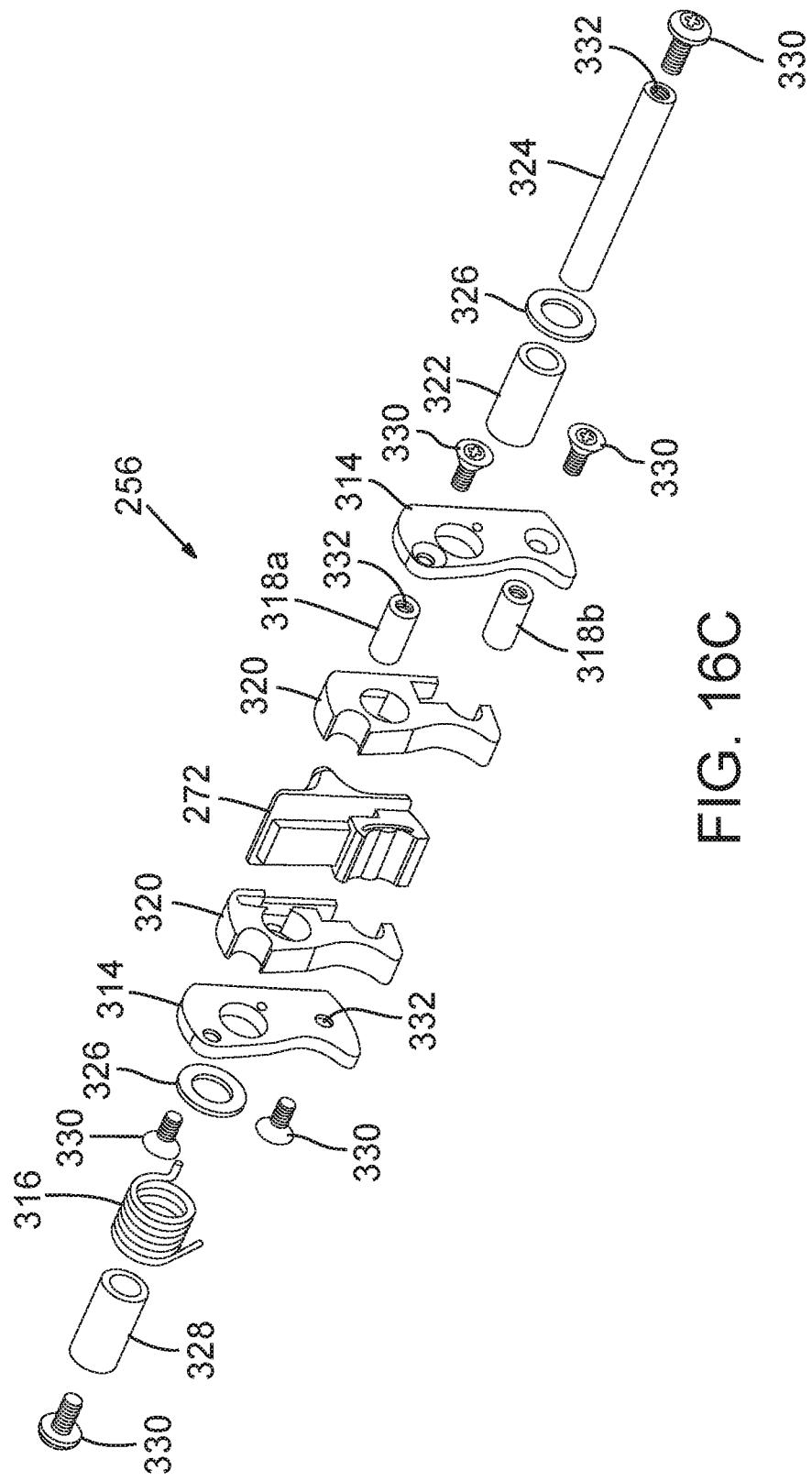
FIG. 16C is an exploded view of an embodiment of the reel, showing some components employed in its switch.

The retractable locking tether mechanism may utilize a retracting reel 202 that directly or indirectly connects the line 48 between the belt 46 and the line anchor 200. More generally, the reel 202 may employ a retractable tether 54 that directly or indirectly connects the movable jaw 40 to the belt 46. FIG. 15A is a front-right perspective view of an embodiment of the reel 202; FIG. 15B is a rear and right side perspective view of the reel 202 with its right reel cover 250 removed; and FIG. 15C is a side view of the reel 202 with its right reel cover 250 removed to show a reel switch 252 in an unlocked open position 276. In this position 276, the spring tension will gently take up any slack, but will still allow for unrestricted movement of the operator 34. FIG. 15D is a side view of the reel 202 with its right reel cover 250 removed to show the reel switch 252 in a closed locked position 270, where the pawl engages the teeth 266 on the spool 280, and keeps it from rotating. FIG. 16A is an exploded view of an embodiment of the reel 202, showing some components employed in an embodiment of the reel; FIG. 16B is an exploded view of an embodiment of a retraction mechanism such as a spool assembly 254 of the reel 202; and FIG. 16C is an exploded view of an embodiment of a pawl assembly of the reel 202.

With particular reference to FIGS. 15-16 as well as previous figures, the length of the line 48 may warrant adjustment for a variety of reasons. For example, the line length may be adjusted to compensate for adjustments to the length of the shaft 44 and to compensate for operator footing, which may be better closer to or farther from the hook 22. The reel 202 can operate as a line adjustment mechanism, potentially substituting for the line adjustment features previously mentioned, that permits quick and easy adjustment to the length of the line 48 between the belt 48 and the hook head assembly 98 by adjusting the length of the tether 46. More particularly, the reel 202 can be operable to re-adjust the line length and operable to maintain the line at a re-adjusted line length.

The reel 202 may be attached directly or indirectly to the belt 46. The reel 202 may have a reel casing 286 that provides a recess 260 and threaded standoff 262 (or bar) configured for connection by a carabiner 224. The carabiner 224 may be attached directly or indirectly to the belt 46, such as to a D-ring 226 (or other connector) sewn into the belt 46 like shown in FIGS. 1A and 1B. FIG. 1C shows an embodiment where the reel 202 is connected through the carabiner 224 to an auxiliary tether 258 between the belt 46 and the reel 202, with the reel also connected to the upper shaft segment 36b of the shaft 44.

The reel 202 may function in manner similar to the way a retractable dog leash functions; however, the reel 202 may be configured to be much more robust in order to handle potentially much greater forces. The tether 54 may utilize high-strength webbing 264, such as made from UHMW Polyethylene, a spool assembly 254 with metal ratchet teeth 266, and a metal sided pawl assembly 256 that can lock rotation of a spool axle 268 in a closed position 270 to maintain a selected length of available tether 54. In particular, the reel switch 252 may employ a slide button 272 that can be pivoted toward the spool 280 to engage the teeth 266, after which can then be slid toward the webbing exit slit 312, to lock the webbing 264 in place in a closing direction 274 (a down direction down with respect to the FIG. 15C) in order to move the switch 252 from being locked in an open position 276 (wherein the tether 54 can be extended or retracted freely) to being in the locked closed position 270 (wherein the available tether length is not adjustable).

The reel casing 286 supports side covers 250, all of which may be made of the same or different tough plastics, like polycarbonate. One will appreciate, however, that the reel covers 250 need not be the same shape nor be made from the same material. The reel 202 may employ and aluminum frame 278 to support the metal axles 268a and 268b for the spool assembly 254 so that it can withstand hundreds of pounds of tension. Moreover, the spool assembly 254 uses metal ratchet teeth 266 extending from metal ratchet spool 280, the metal axles 268a and 268b, and a sealed ball bearing 282 clamped to spool hubs 284 to support the extreme forces on the webbing 264. Apertures 290 in the various components can be aligned so that they can be connected by a variety of fasteners 288, such as screws.

The spool assembly 254 also employs a reel retraction spring 292 that attaches to a retraction spring enclosure 294 on its outer side 296 and to a left spacer 298a as well as slots in the axle assembly on its inner side 300. The retraction spring enclosure 294 may have a snap-on retracting spring cover 302 and may be framed by low friction washers 304 to facilitate smooth winding and unwinding of the reel retraction spring 292. The inside axle 268b can be hexagonally shaped to prevent it from turning once the sides are screwed on. A tube-like outer axle 268a may slide onto the hexagonal axle 268b to provide a close fit into the spacers 298a and 298b and the ball bearing 282. Both axles 268a and 268b may have slits on one end that may be configured to receive the inside end 306 of the reel retraction spring 292. A webbing roller axle 308 may support a roller 310 to redirect the webbing 264 out of a small reel slit 312 in the reel casing 286 to help prevent debris from entering the reel. The retraction mechanism may function to draw the available webbing 264 back into the reel 202.

The pawl assembly 256 may include aluminum side pieces 314 (which may contact the aluminum ratchet teeth 226 of the spool assembly 254), a pawl spring 316, and a slide button 272 (which may be employed to keep the pawl in a locked closed position when desired). Aluminum threaded spacers 318a and 318b and plastic button-support pieces may facilitate separation of the aluminum pawl sides 314 from the slide button 272, which may lock in an open position 276 or a closed position 270 based on which of the two flexible indents are against the lower spacer 318b.

A lubricated aluminum bearing 322 can be employed inside the pawl to direct the load from the aluminum pawl sides 314 to the metal pawl or spool axle 324. This aluminum bearing 322 may be held in place by low friction washers 326. The torsion pawl spring 316 may force the pawl open when it's not locked closed. A pawl end spacer 328 may facilitate positioning the pawl assembly 256 in relation to the aluminum frame pieces 278. A variety of fasteners 330 may be employed to connect the various components via threaded or unthreaded aligned apertures 332.

In some embodiments, the retraction reel sets horizontally instead of vertically (the logo is facing up). In some embodiments, the "leash" lock button 272 can be positioned very closely to where the webbing 264 spools out (opposite of the attachment point where a carabiner 224 (or other connector) attaches between the reel 202 and the belt D-ring 226). With the lock button 272 positioned right next to where the webbing 264 comes out, the user 34, after positioning himself or herself where he or she wants to start pulling, could grab the webbing 264 about 5 inches out from the reel 202, pull it back (so as to close the jaw 40 in the hook 22), and lock the reel 202, all in one quick motion (as opposed to having to lean in 5 inches before locking the jaw 40).

Because the spool locking button 272 in the tether reel 202 can be up next where the webbing 264 spools out of the retraction reel 202, an operator 34 could use a method where he or she grabs the tether 54, about 5.5 inches forward of the spool assembly 254, and in one motion, pulls the tether 54 (to close the jaw 40), and then the other fingers of the hand can brush up against the locking button 272 and press it. Once the locking button 272 is pressed, a flick of the fingers can also optionally lock the button 272 in the depressed position.

Figure 17:
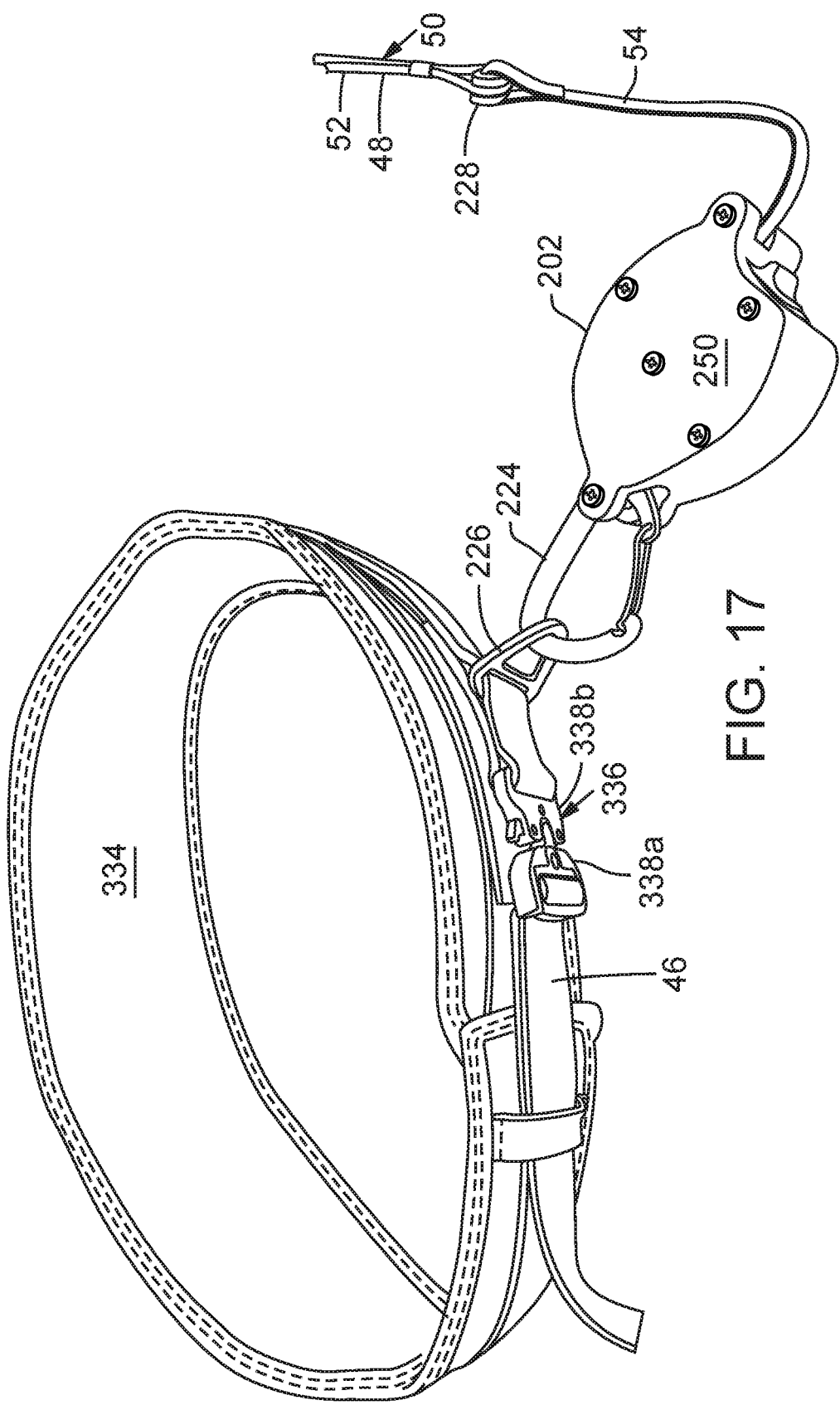
FIG. 17 is a top and rear view of a belt connected to a reel (shown in a front and right side perspective view) associated with the jaw actuation mechanism of an embodiment of the vine removal tool.
Figure 18:
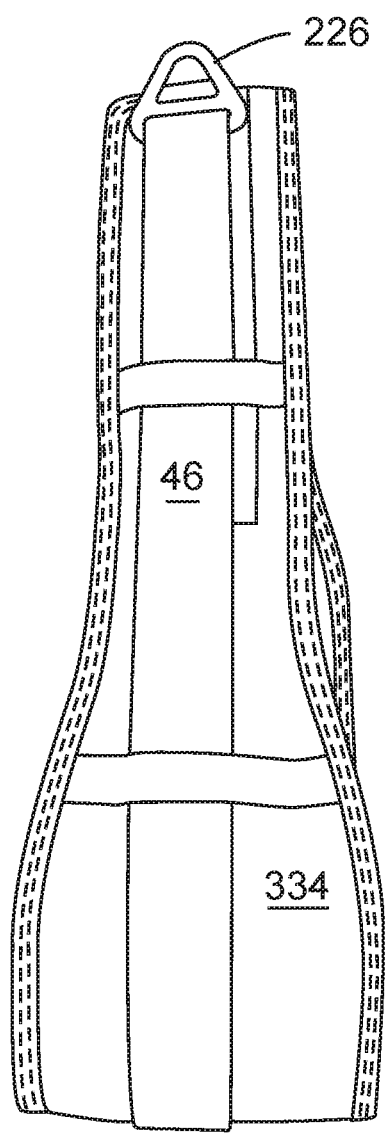
FIG. 18 is a right side elevation view the belt of an embodiment of the vine removal tool.

FIG. 17 is a top and rear view of a belt 46 connected to a reel 202 (shown in a front and right side perspective view) associated with the jaw actuation mechanism 50, and FIG. 18 is a right side elevation view the belt 46. With particular reference to FIGS. 17 and 18 as well as previous figures, the belt 46 operable for fastening about a person 34. For the purposes of this disclosure, anything wearable by a human operator 34 that can be connected directly or indirectly to a D-ring 226, carabiner 224, tether 54, or other connector may be considered to be a belt 46. Accordingly, a belt 46 may comprise a harness (or part of a harness), a sling, a sash, a cummerbund, or suspenders, for example. The belt 46 may be configured for fastening about a waist, hips, or torso of a person 34. The belt 46 may be padded or have a padded inner waistband 334. The belt 46 may be unpadded.

The belt 46 may be adjustable. For example, a padded belt 46 can be adjustable to fit a wide range of user's waist sizes, such as from 25" to 50". Suspenders can be included and attached to the belt 46 to keep it from slipping down. The belt 46 may include an attachment mechanism 336 for securing the belt 46 about a person 34. The belt 46 may employ mated end connectors mated end connectors 338a and 338b at opposite ends of the belt 46. Either or both of these end connectors 338a or 338b may allow for adjustment of the belt length. The attachment mechanism 336 and the adjustment mechanism may be configured to resist slippage during use of the vine removal tool 20. In particular, the attachment mechanism 336 and the adjustment mechanism may be configured to prevent or resist changes to the adjusted length of the belt 46.

As noted previously, the jaw actuation mechanism 50 may directly or indirectly operatively connects to the belt 46 and to the movable jaw 40. More particularly, the jaw actuation mechanism 50 may employ at least one line 48 that directly or indirectly operatively connects to the belt 46 and to the movable jaw 40. The line 48 may have a line length that is adjustable. The line 48 may include a primary actuation line 52 operatively connected directly or indirectly to the movable jaw and a tether 54 operatively connected directly or indirectly to the belt 46. The belt 46 may be operatively connected to the shaft 44 such as by one or more auxiliary lines 340.

Movement of the belt 46 in a belt movement direction 342 (which may be any direction away from the movable jaw 40) may be operable to move the jaw projection 42 toward the vine collection area 14 or the pocket 30. Similarly, force applied to belt 46 in a direction away from the hook 22 may be operable to engage the jaw actuation mechanism 50 to bring the jaw projection 42 into a closed position. The jaw projection 42 may be in a closed position whenever the jaw projection 42 is fully extended toward the vine collection area 14 or the pocket 30, or until stopped from closing further by a bundle of vines. The jaw projection 42 may thus clamp against the vines in the vine collection area 14 in response to pulling by the primary actuation line 52 connected to the tether 54 attached to the belt 46 that surrounds the operator's waist, so that the harder the operator 34 pulls, the harder the vines are clamped, preventing vine slippage, as the vines are pulled out of the ground. Moreover, the moveable jaw 40 rotates closed when the line is pulled against the tension of the spring of the jaw retraction mechanism 188 (while the hook 22 is resisting the pull). The operator 34 can use his, her, or their legs and body weight to generate more pull force than by only pulling on the shaft 44 using arms. The harder the operator pulls, the harder the movable jaw 40 grips.

The vine removal tool 20 allows a user 34 to pull ivy while stationary or moving in a comfortable standing position (as opposed to kneeling or bending or being hunched over), and by predominantly, or only, using body weight. The user 34 takes steps backward, or simply shifts weight from the front foot to the back foot, so the lines 48 do most of the work. This process takes less effort because it is much easier to pull the roots while standing up, than by pushing, kneeling, bending, or being hunched over.

Figure 14A:
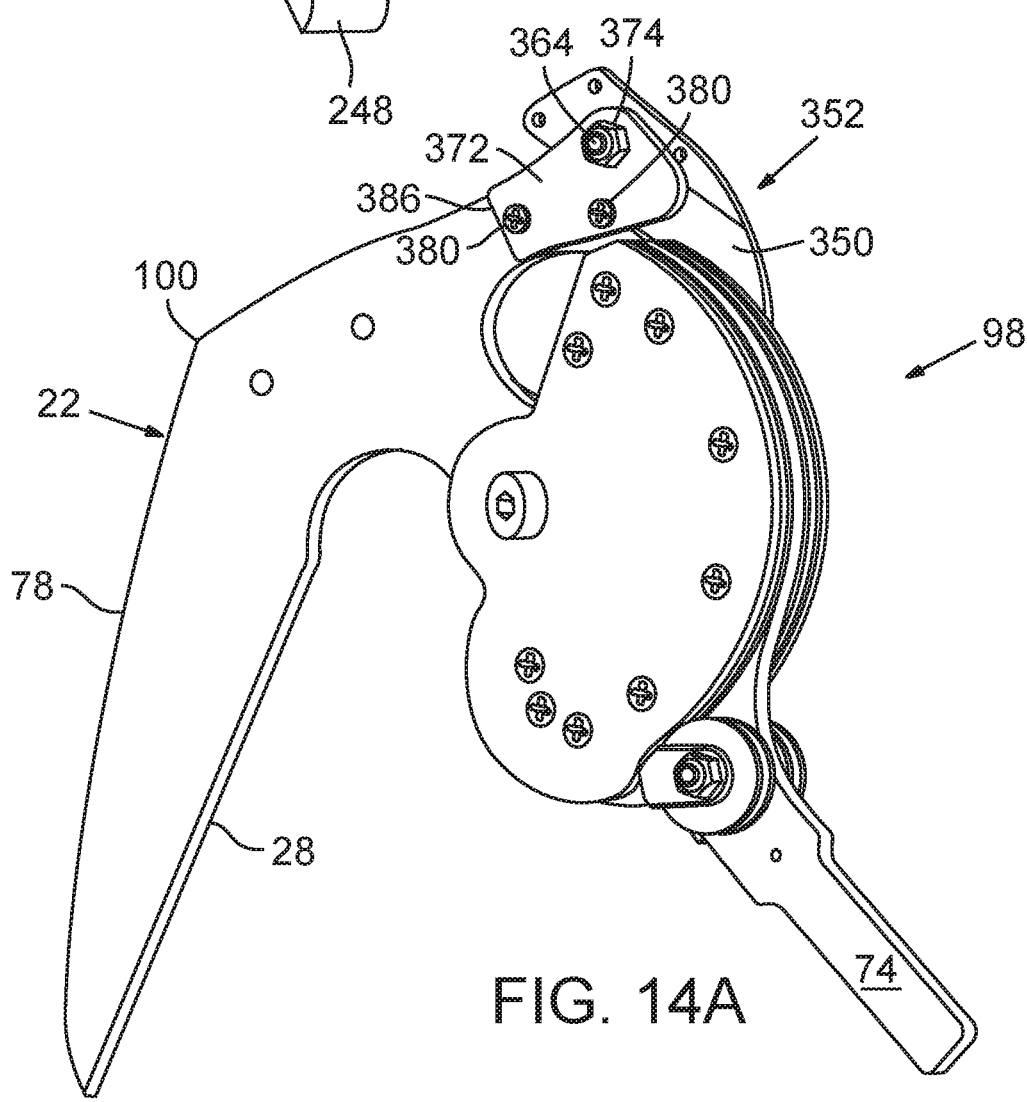
FIG. 14A is a left rear perspective view of the hook-end portion, showing an embodiment of an optional cutting blade employed in one embodiment of the hook-end portion of the vine removal tool.
Figure 14B:
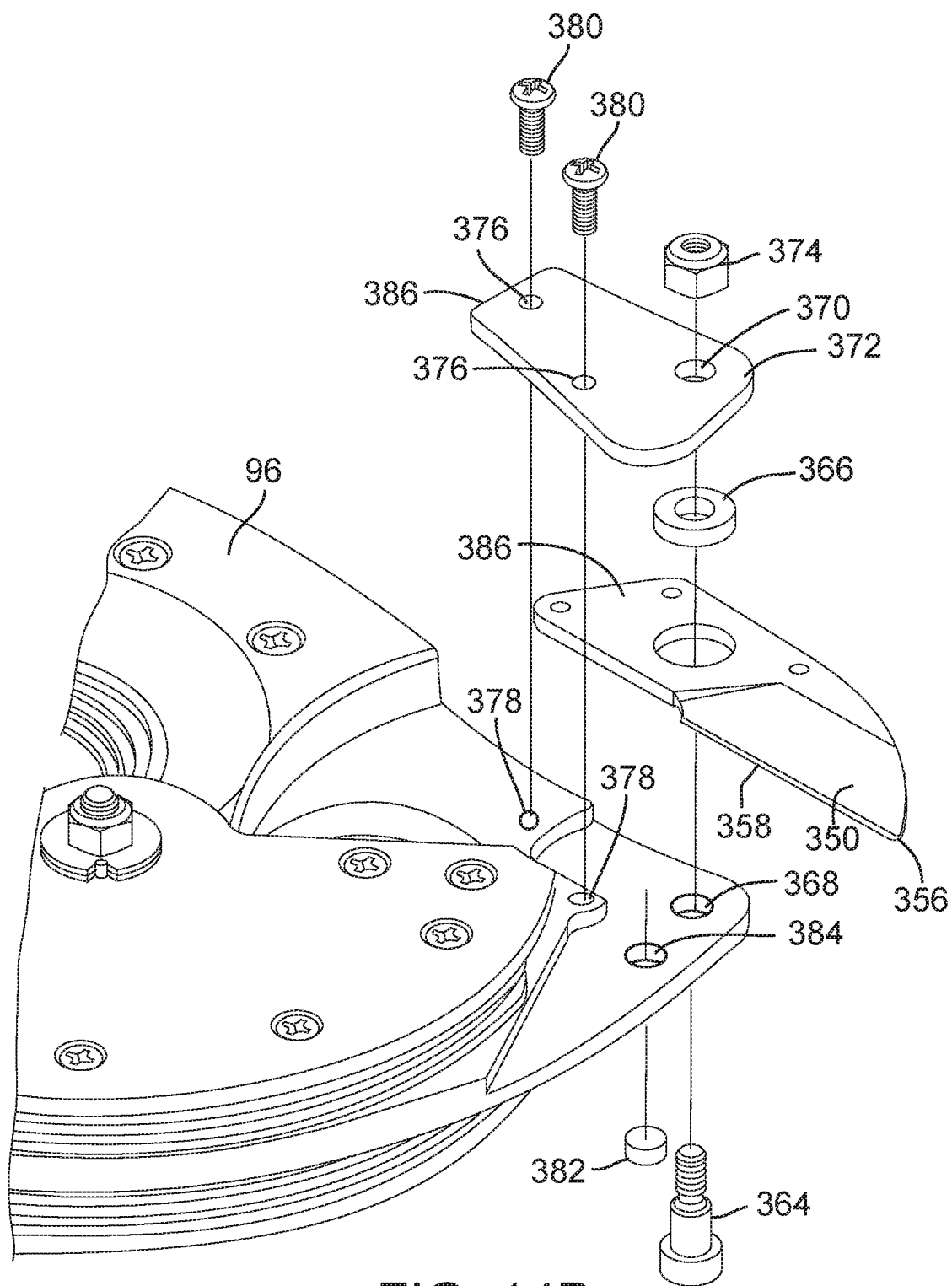
FIG. 14B is an exploded view of a portion of the hook head assembly, showing a possible attachment of the cutting blade.

FIG. 14A is a front and left side perspective view of the hook-end portion 32, showing an embodiment of an optional cutting blade 350 in a closed position 352; FIG. 14B is an exploded view of a portion of the hook head assembly 98, showing a possible attachment of the cutting blade 350; and FIG. 14C is a front and left side of the hook-end portion 32, showing the movable jaw 30 in a full closed position with the cutting blade 350 in an extended position 354. With particular reference to FIGS. 8A, 14A, 14B, and 14C as well as previous figures, although the movable jaw 40 is very effective for pulling and ripping out the vines, sometimes movement of the hook can be impeded by very large roots or mats and a saw might become useful. Accordingly, a hybrid gripping and cutting tool might be useful for the occasional root or vine or for cutting a swath through a mat of vines or through various debris on a forest floor, such as fallen branches. After cutting such vines, the shaft can then be rotated about 180 degrees to subsequently collect the vines in the vine collection area 14 where they can be grabbed by the moveable jaw 40 and then pulled out by backward force on the belt 46. Moreover, a combination gripping and cutting tool would be ideal for removing blackberry, for example, because the vines can be cut at a distance (such as several feet), and perhaps can be cut all the way down at their base. Then they could be grabbed in the vine collection area 14 and safely pulled onto a debris pile to be processed later. One can imagine the advantages of keeping one's hands at a distance from a blackberry vine.

The cutting blade 350 may be positioned on the spine side of the hook 22 so that its blade tip 356 extends in a somewhat opposite direction to that of the hook projection 68. The blade 350 may have a sharp blade edge 358 that lies along a general extended blade axis 360. The extended blade axis 360 may be oriented at an extended blade angle 362 to the shaft major axis 38 that may be similar to the hook angle 86 and may be within the same ranges that were provided earlier for the hook angle 86. Positioning the cutting blade on the spine side of the hook 22 provides advantages over a separate tool in the amount of force that can be generated for cutting by pulling very hard on the lines 48 via the belt 46. One will appreciate that force applied by a person 34 directly or indirectly to the jaw actuation mechanism 50, in a direction away from the hook 22, may be operable to enhance force applied by the cutting blade 350 against an object to be cut than by using the shaft 44 alone. The position of the cutting blade 350 at the back of the hook 22 can also maximize the potential reach for a user 34 when desired.

The cutting blade 350 may be mounted on a bearing 366 for rotation about a blade axle 364, which passes through an aperture 368 in the hook 22 and through an aperture 370 in a blade stabilizer 372, that may be secured by a nut 374. The blade stabilizer 372 may have additional apertures 376 that may be aligned with additional apertures 378 in the hook 22 to receive fasteners 380 to secure the blade stabilizer to the hook 22. The cutting blade 350 may be directly or indirectly mounted to the hook 22 in a manner that prevents the cutting blade 350 from entering the vine collection area 124.

The cutting blade 350 may be configured for convenient retractability. For example, the cutting blade 350 may be connected to a switch blade-like, spring-loaded mechanism that can extend the cutting blade 350 into an extended position 354 by push of a button on the hook 22 or the shaft 44, or by causing pressure to a particular area of the cutting blade spine. However, for safety and convenience purposes, the cutting blade 350 may be secured in a manner that permits the tip of the cutting blade 350 to be pulled against an object, such as on the ground, at a distance by use of pulling on the shaft 44 toward the user 34 to extend the cutting blade 350 away from the movable jaw 40 and into the extended position 354. The cutting blade securement mechanism may also be operable to secure the cutting blade 350 by pushing the spine of the cutting blade 350 near the tip so that the cutting blade 350 moves toward the movable jaw 40 and into a closed position 352. A disc magnet 382 can be secured in another aperture in the hook 22. The disc magnet 382 can be employed to help hold the cutting blade 350 in place, for safety reasons, when the cutting blade 350 is folded down in the closed position 352.

The nut 374 can be tightened to the appropriate tension so that when the cutting blade 350 is pulled open to the extended position 354, the cutting blade 350 will stay in place. The rear side 386 of the cutting blade 350 may be in proximity to one of the surface skimmers 96 when the cutting blade is in the extended position 354.

The cutting blade 350 may be selected as an off-the-shelf replacement blade for a hand pruner, but could be replaced by a variety of shapes and sizes. The cutting blade 350 may be smooth and uniform as shown. It can be curved or hooked. It may have teeth and be more like a saw blade. The teeth can be designed to cut both green ivy vines and woody debris found on the forest floor that may be at least 1" in diameter. The cutting blade 350 can be a thin, pull-saw type blade that cuts on the upward stroke or on the downward stroke or cuts on both upwards and downwards strokes.

An optional handle 390 (FIG. 1C), such as a D-handle, may be directly or indirectly connected to the shaft 44, such as to the upper shaft segment 36b, to add convenience for stabilizing or guiding the shaft 44. The handle 390 can be repositioned as needed, up and down the shaft 44, and/or at a different rotation angle. One will appreciate that use of the handle 38 to provide the pull on the shaft 44 to collect vines may cause accelerated user fatigue compared to using the waist to pull the hook 22.

The vine removal tool 20 can be rust proof and stand up to normal or demanding wear and tear.

The foregoing is illustrative of embodiments of the invention and is not to be construed as limiting thereof. Although a few specific example embodiments have been described, those skilled in the art will readily appreciate that many modifications to the disclosed exemplary embodiments, as well as other embodiments, are possible without materially departing from the novel teachings and advantages of the invention.

Accordingly, all such modifications are intended to be included within the scope of the invention as defined in the claims. For example, skilled persons will appreciate that the subject matter of any sentence or paragraph can be combined with subject matter of some or all of the other sentences or paragraphs, except where such combinations are mutually exclusive.

It will be obvious to those having skill in the art that many changes may be made to the details of the above-described embodiments without departing from the underlying principles of the invention. The scope of the present invention should, therefore, be determined by the following claims, with equivalents of the claims to be included therein.

The invention claimed is:

1. A vine removal tool, comprising:
   a hook having a distal hook end, a proximal hook base, and a vine slide surface positioned between the distal hook end and the proximal hook base;
   a vine collection area formed around the proximal hook base and in proximity to the vine slide surface, wherein the vine slide surface is configured to direct multiple vines into the vine collection area;
   a movable jaw having a jaw projection, wherein the moveable jaw is operable to move the jaw projection toward and away from the vine collection area, wherein the jaw projection has a jaw projection gripping surface that is configured more for gripping the multiple vines directed into the vine collection area than for severing the multiple vines directed into the vine collection area;
   a shaft that is directly or indirectly connected to the hook; and
   a jaw actuation mechanism operable to cause the jaw projection to move toward the vine collection area to predominantly grip the multiple vines in the vine collection area rather than sever the multiple vines in the vine collection area.

2. The vine removal tool of claim 1, wherein the jaw projection has a major jaw projection dimension, wherein the vine slide surface has a vine slide length, and wherein the vine slide length is longer than two times the major jaw projection dimension of the jaw projection.

3. The vine removal tool of claim 1, wherein the shaft has a shaft major axis, wherein the distal hook end is spaced apart from the shaft major axis, and wherein the vine slide surface has a vine slide length that is longer than or equal to 6 inches.

4. The vine removal tool of claim 1, wherein the moveable jaw is operable to move the jaw projection in a jaw-closing direction toward the vine collection area and in a jaw-opening direction away from the vine collection area, wherein the vine slide surface has a vine slide length axis, wherein the jaw projection has a jaw projection gripping surface having a gripping surface width that is transverse to the jaw-opening and jaw-closing directions and transverse to the vine slide length axis, wherein the jaw projection gripping surface comprises multiple surface features with different respective elevations along the gripping surface width.

5. The vine removal tool of claim 1, wherein the moveable jaw is operable to move the jaw projection in a jaw-closing direction toward the vine collection area and in a jaw-opening direction away from the vine collection area, wherein the vine slide surface has a vine slide length axis, wherein the jaw projection has a jaw projection gripping surface having a gripping surface width that is transverse to the jaw-opening and jaw-closing directions and transverse to the vine slide length axis, wherein the vine collection area comprises a vine collection surface having a collection surface width that is transverse to the jaw-opening and jaw-closing directions and having multiple surface features with different respective elevations along the collection surface width and wherein the jaw projection gripping surface comprises multiple surface features with different respective elevations along the gripping surface width.

6. The vine removal tool of claim 1, wherein the vine collection area comprises a vine collection surface having multiple surface features, wherein the jaw projection gripping surface has multiple surface features, and wherein the multiple surface features are configured to minimize severing a vine while gripping it between the jaw projection and the vine collection area.

7. The vine removal tool of claim 6, wherein the vine collection surface comprises multiple vine collection surface features, wherein the jaw projection gripping surface comprises multiple jaw projection surface features that are configured to mesh with the multiple vine collection surface features.

8. The vine removal tool of claim 1, wherein a portion of the vine slide surface lies along a vine slide axis, wherein the vine collection area has a vine collection surface with a vine collection surface width that is perpendicular to the vine slide axis, wherein the jaw projection comprises a jaw projection gripping surface having a gripping surface width that is perpendicular to the vine slide axis, wherein the gripping surface width is greater than the vine collection surface width.

9. The vine removal tool of claim 1, wherein a portion of the vine slide surface lies along a vine slide axis, wherein the jaw projection comprises a jaw projection gripping surface between two jaw projection side surfaces and having a gripping surface width between the two jaw projection side surfaces that is perpendicular to the vine slide axis, wherein the gripping surface width is greater than or equal to 0.5 inches.

10. The vine removal tool of claim 1, wherein the shaft has a shaft major axis, wherein a portion of the vine slide surface lies along a vine slide axis, wherein the vine slide axis and the shaft major axis form a hook angle that is greater than or equal to 60 degrees and less than or equal to 90 degrees, and wherein the distal hook end is spaced apart from the shaft major axis, and wherein the vine slide surface has a vine slide length that is longer than or equal to 4 inches.

11. The vine removal tool of claim 1, further comprising a belt operable for fastening about a person, wherein the jaw actuation mechanism is operatively connected to the belt and to the movable jaw.

12. The vine removal tool of claim 1, wherein the jaw actuation mechanism includes a line that is operable to connect, at an effective distance that is variable, the movable jaw to a belt operable for fastening about a person, and wherein the line has a line length from the movable jaw to the belt, and wherein the line length is re-adjustable to provide the effective distance.

13. The vine removal tool of claim 12, further comprising a lockable retraction reel for operable connection to the belt, wherein the retraction reel is operable to re-adjust the line length and operable to maintain the line at a re-adjusted line length.

14. The vine removal tool of claim 1, wherein the jaw actuation mechanism employs a line that is directly or indirectly connected to the movable jaw, wherein a pulley and a sheave are operable to guide the line, wherein the sheave is distinct from the pulley, and wherein a mud scraper is mounted in proximity to the pulley and is operable to block an amount of debris from entering a furrow on the sheave.

15. The vine removal tool of claim 1, further comprising a surface skimmer mounted directly or indirectly to the hook, wherein the hook has a hook spine opposite the vine slide surface, wherein the surface skimmer has a skimmer edge that substantially extends from the vine collection area or the vine slide surface toward the hook spine.

16. The vine removal tool of claim 15, wherein the skimmer edge is configured to resist sinking below a soil surface as the distal hook end is below the soil surface and pulled toward a person operating the vine removal tool.

17. The vine removal tool of claim 1, wherein the vine collection area comprises a pocket, wherein the jaw projection is configured to at least partly fit within pocket dimensions of the pocket, wherein the pocket has a pocket length, wherein the vine slide surface has a vine slide length, wherein the vine slide length is longer than 1.5 times the pocket length, and wherein the jaw actuation mechanism is operable to cause the jaw projection to enter, and/or to extend beside, the pocket.

18. The vine removal tool of claim 1, wherein the hook has a hook spine opposite the vine slide surface, wherein the hook spine extends from the distal hook end to a hook projection base, wherein the vine slide surface and the hook spine define a hook projection between the vine slide surface and the hook spine, and wherein the hook projection is configured for subterranean movement.

19. The vine removal tool of claim 1, wherein force applied by a person directly or indirectly to the jaw actuation mechanism, in a direction from the hook toward the shaft, is operable to pull one or more vines caught on the vine slide surface or in the vine collection area in a direction toward the person.

20. The vine removal tool of claim 1, wherein a portion of the vine slide surface lies along a vine slide axis, wherein the vine collection area has a pocket surface having a pocket surface width that is perpendicular to the vine slide axis, wherein the jaw projection comprises a jaw projection gripping surface having a gripping surface width that is perpendicular to the vine slide axis, wherein the jaw projection gripping surface faces toward the pocket surface whenever the jaw actuation mechanism is in a fully closed position toward the vine collection area, and wherein the jaw projection gripping surface is spaced apart from the pocket surface whenever the jaw projection is in the fully closed position toward the vine collection area.

21. The vine removal tool of claim 1, wherein a portion of the vine slide surface lies along a vine slide axis, wherein the moveable jaw is operable to move the jaw projection in a jaw-closing direction toward the vine collection area and in a jaw-opening direction away from the vine collection area, wherein the jaw projection has a jaw projection gripping surface having a gripping surface width that is transverse to the jaw-opening and jaw-closing directions or transverse to the vine slide axis, wherein the jaw projection gripping surface has multiple surface features with different respective elevations along the gripping surface width, wherein the jaw projection gripping surface has an average elevation across the gripping surface width, and wherein any surface feature on the jaw projection gripping surface has an elevation difference from the average elevation that is less than or equal to 0.15 inch.

22. The vine removal tool of claim 1, wherein the hook is configured to gather one or more vines as the vine removal tool is moved in a direction from the hook toward the shaft.

23. The vine removal tool of claim 1, wherein the jaw gripping surface is smooth.

24. A vine removal tool, comprising:
a hook having a distal hook end, a proximal hook base, and a vine slide surface positioned between the distal hook end and the proximal hook base;
a vine collection area formed around the proximal hook base and in proximity to the vine slide surface, wherein the vine slide surface is configured to direct one or more vines into the vine collection area;
a movable jaw having a jaw projection, wherein the moveable jaw is operable to move the jaw projection toward and away from the vine collection area, wherein the jaw projection has a jaw projection gripping surface that is configured more for gripping a vine than for severing a vine;
a shaft that is directly or indirectly connected to the hook;
a jaw actuation mechanism operable to cause the jaw projection to move toward the vine collection area to grip the one or more vines; and
a belt operable for fastening about a person, wherein the belt is connected indirectly to the shaft, hook, or jaw actuation mechanism such that force applied to the belt, in a direction away from the hook, is operable to pull the hook in a direction toward the person.

25. A vine removal tool, comprising:
a hook having a distal hook end, a proximal hook base, and a vine slide surface positioned between the distal hook end and the proximal hook base, wherein a portion of the vine slide surface lies along a vine slide axis, and wherein the vine slide surface has a vine slide length that is longer than or equal to 8 inches;
a vine collection area formed around the proximal hook base and in proximity to the vine slide surface, the vine collection area has a vine collection surface with a vine collection surface width that is perpendicular to the vine slide axis, and wherein the vine slide surface is operable to direct one or more vines into the vine collection area;
a movable jaw having a jaw projection, wherein the moveable jaw is operable to move the jaw projection toward and away from the vine collection area, wherein the jaw projection comprises a jaw projection gripping surface having a gripping surface width that is perpendicular to the vine slide axis, wherein the gripping surface width is greater than or equal to 0.5 inches;
a shaft that is directly or indirectly connected to the hook; and
a jaw actuation mechanism operable to cause the jaw projection to move toward the vine collection area to grip the one or more vines.

26. The vine removal tool of claim 25, wherein the jaw projection gripping surface lies between two jaw projection side surfaces and define the gripping surface width between the two jaw projection side surfaces, and wherein the jaw projection gripping surface is configured more for gripping a vine than for severing a vine.

27. The vine removal tool of claim 25, wherein a portion of the vine slide surface lies along a vine slide axis, wherein the vine collection area has a pocket surface having a pocket surface width that is perpendicular to the vine slide axis, wherein the jaw projection comprises a jaw projection gripping surface having a gripping surface width that is perpendicular to the vine slide axis, wherein the jaw projection gripping surface faces toward the pocket surface whenever the jaw actuation mechanism is in a fully closed position toward the vine collection area, and wherein the jaw projection gripping surface is spaced apart from the pocket surface whenever the jaw projection is in the fully closed position toward the vine collection area.

* * * * *